(12) United States Patent
Safranski et al.

(10) Patent No.: US 10,369,886 B2
(45) Date of Patent: Aug. 6, 2019

(54) SIDE-BY-SIDE VEHICLE

(71) Applicant: Polaris Industries Inc., Medina, MN (US)

(72) Inventors: Brian M. Safranski, Warroad, MN (US); Robbi L. Peterson, Middle River, MN (US); Richard L. Sunsdahl, Badger, MN (US); Aaron D. Deckard, Zionsville, IN (US); Louis J. Brady, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 93 days.

(21) Appl. No.: 15/790,691

(22) Filed: Oct. 23, 2017

(65) Prior Publication Data
US 2018/0056783 A1  Mar. 1, 2018

Related U.S. Application Data

(60) Continuation of application No. 15/159,561, filed on May 19, 2016, now Pat. No. 9,969,259, which is a
(Continued)

(51) Int. Cl.
*B60G 3/14* (2006.01)
*B60G 3/20* (2006.01)
(Continued)

(52) U.S. Cl.
CPC .............. *B60K 17/354* (2013.01); *B60G 3/14* (2013.01); *B60G 3/20* (2013.01); *B60G 3/202* (2013.01);
(Continued)

(58) Field of Classification Search
CPC .......... B60G 3/14; B60G 3/145; B60G 3/202; B60G 3/20; B60G 3/06; B60G 2200/144;
(Continued)

(56) References Cited

U.S. PATENT DOCUMENTS 1,031,497 A   7/1912  West
2,203,290 A   6/1940  Best
(Continued)

FOREIGN PATENT DOCUMENTS

CN   103249578   8/2013
DE   3827039 A1   2/1990
(Continued)

OTHER PUBLICATIONS

European Search Report issued by the European Patent Office, dated Jun. 3, 2016, for related European patent application No. 16156388.7; 6 pages.
(Continued)

*Primary Examiner* — Drew J Brown
(74) *Attorney, Agent, or Firm* — Faegre Baker Daniels LLP

(57) ABSTRACT

A vehicle may include a CVT unit or a power source which requires ambient air. An air inlet for an air intake system coupled to the CVT unit or the power source which requires ambient air may be provided in a side of a cargo carrying portion of the vehicle. The vehicle may include a rear radius arm suspension.

17 Claims, 49 Drawing Sheets

Related U.S. Application Data continuation of application No. 14/565,193, filed on Dec. 9, 2014, now Pat. No. 9,365,251, which is a continuation of application No. 14/225,208, filed on Mar. 25, 2014, now Pat. No. 9,211,924, which is a division of application No. 12/849,516, filed on Aug. 3, 2010, now Pat. No. 8,746,719.

(51) Int. Cl.

| | | |
|---|---|---|
| *B60G 7/00* | (2006.01) | |
| *B60K 5/00* | (2006.01) | |
| *B60K 11/06* | (2006.01) | |
| *B60K 13/02* | (2006.01) | |
| *B60K 17/00* | (2006.01) | |
| *B60K 17/16* | (2006.01) | |
| *B62D 21/18* | (2006.01) | |
| *B62D 63/04* | (2006.01) | |
| *B60K 17/348* | (2006.01) | |
| *B60K 17/354* | (2006.01) | |

(52) U.S. Cl.
CPC ............ *B60G 7/006* (2013.01); *B60G 7/008* (2013.01); *B60K 17/00* (2013.01); *B60K 17/165* (2013.01); *B60K 17/348* (2013.01); *B62D 63/04* (2013.01); *B60G 2200/144* (2013.01); *B60G 2200/1442* (2013.01); *B60G 2200/182* (2013.01); *B60G 2202/12* (2013.01); *B60G 2202/24* (2013.01); *B60G 2204/128* (2013.01); *B60G 2204/129* (2013.01); *B60G 2204/143* (2013.01); *B60G 2206/16* (2013.01); *B60G 2300/124* (2013.01); *B60G 2300/13* (2013.01); *B60K 11/06* (2013.01); *B60K 13/02* (2013.01); *B60K 2005/003* (2013.01); *B60Y 2200/124* (2013.01); *B60Y 2200/20* (2013.01); *B60Y 2400/72* (2013.01); *B60Y 2410/124* (2013.01); *B62D 21/183* (2013.01); *Y10T 29/49815* (2015.01); *Y10T 29/49826* (2015.01)

(58) Field of Classification Search
CPC ...... B60G 2200/1442; B60G 2200/182; B60G 2206/16; B60G 2300/13; B60G 7/006; B60G 7/008; B60G 2204/143; B60G 2300/124; B60G 2202/12; B60G 2202/24; B60G 2204/128; B60G 2204/129; B60K 17/00; B60K 17/354; B60K 17/348; B60K 17/165; B60K 2005/003; B60K 13/02; B60K 11/06; B62D 63/04; B62D 21/183; B60Y 2400/72; B60Y 2200/20; B60Y 2410/124; B60Y 2200/124; Y10T 29/49815; Y10T 29/49826

See application file for complete search history.

(56) References Cited

U.S. PATENT DOCUMENTS

| | | |
|---|---|---|
| 2,468,809 A | 5/1949 | Brock |
| 2,576,017 A | 11/1951 | John |
| 2,755,875 A | 7/1956 | Muller |
| 2,757,017 A | 7/1956 | Matthias |
| 2,757,747 A | 8/1956 | MacPherson |
| 2,856,201 A | 10/1958 | Muller |
| 3,149,690 A | 9/1964 | Rosenkrands |
| 3,193,302 A | 7/1965 | Hill |
| 3,292,944 A | 12/1966 | Dangauthier |
| 3,366,411 A | 1/1968 | Vittone |
| 3,603,422 A | 9/1971 | Cordiano |
| 3,642,084 A | 2/1972 | Takahashi |
| 3,712,416 A | 1/1973 | Swanson |
| 3,791,482 A | 2/1974 | Sykora |
| 3,800,910 A | 4/1974 | Rose |
| D237,873 S | 12/1975 | Johnson |
| 3,966,014 A | 6/1976 | Gowing |
| 4,109,751 A | 8/1978 | Kabele |
| 4,114,713 A | 9/1978 | Mery |
| 4,136,756 A | 1/1979 | Kawamura |
| 4,217,970 A | 8/1980 | Chika |
| 4,254,746 A | 3/1981 | Chiba |
| 4,340,123 A | 7/1982 | Fujikawa |
| 4,425,976 A | 1/1984 | Kimura |
| 4,440,419 A | 4/1984 | Kosak et al. |
| 4,529,222 A | 7/1985 | Kijima et al. |
| 4,592,316 A | 6/1986 | Shiratsuchi |
| 4,600,072 A | 7/1986 | Krude |
| 4,641,854 A | 2/1987 | Masuda |
| 4,681,178 A | 7/1987 | Brown |
| 4,695,069 A | 9/1987 | Kurokawa et al. |
| 4,705,128 A | 11/1987 | Krude |
| 4,709,935 A | 12/1987 | Takizawa et al. |
| 4,765,647 A | 8/1988 | Kondo |
| 4,773,675 A | 9/1988 | Kosuge |
| 4,817,985 A | 4/1989 | Enokimoto |
| 4,969,661 A | 11/1990 | Omura |
| 4,974,697 A | 12/1990 | Krude |
| 4,978,131 A | 12/1990 | Edahiro et al. |
| 4,989,894 A | 2/1991 | Winsor |
| 5,016,728 A | 5/1991 | Zulawski |
| 5,036,939 A | 8/1991 | Johnson |
| 5,046,753 A | 9/1991 | Giovanni |
| 5,048,860 A | 9/1991 | Kanai |
| 5,074,374 A | 12/1991 | Ohtake |
| 5,203,585 A | 4/1993 | Pierce |
| 5,215,329 A | 6/1993 | Santo |
| 5,251,713 A | 10/1993 | Enokimoto |
| 5,251,718 A | 10/1993 | Inagawa |
| 5,327,989 A | 7/1994 | Furuhashi |
| 5,340,146 A | 8/1994 | Kato |
| 5,507,510 A | 4/1996 | Kami |
| 5,562,066 A | 10/1996 | Gere |
| 5,566,591 A | 10/1996 | Burkett |
| 5,697,633 A | 12/1997 | Lee |
| 2,833,366 A | 5/1998 | Olley |
| 5,819,702 A | 10/1998 | Mendler |
| 5,833,026 A | 11/1998 | Zetterstrom |
| 5,961,135 A | 10/1999 | Smock |
| 6,056,077 A | 5/2000 | Kobayashi |
| 6,070,689 A | 6/2000 | Tanaka |
| 6,142,123 A | 11/2000 | Galasso |
| 6,152,253 A | 11/2000 | Monaghan |
| D436,557 S | 1/2001 | Selby |
| 6,216,809 B1 | 4/2001 | Etou |
| 6,224,046 B1 | 5/2001 | Miyamoto |
| 6,247,442 B1 | 6/2001 | Bedard |
| 6,412,585 B1 | 7/2002 | DeAnda |
| 6,523,627 B2 | 2/2003 | Fukuda |
| 6,523,634 B1 | 2/2003 | Gagnon |
| RE38,012 E | 3/2003 | Ochab |
| 6,581,716 B1 | 6/2003 | Matsuura |
| 6,588,536 B1 | 7/2003 | Chiu |
| 6,622,806 B1 | 9/2003 | Matsuura |
| 6,626,256 B2 | 9/2003 | Dennison |
| 6,626,260 B2 | 9/2003 | Gagnon |
| 6,651,768 B2 | 11/2003 | Fournier |
| 6,655,717 B1 | 12/2003 | Wang |
| 6,702,309 B2 | 3/2004 | Cho |
| 6,722,463 B1 | 4/2004 | Reese |
| 6,732,830 B2 | 5/2004 | Gagnon |
| 6,745,862 B2 | 6/2004 | Morii |
| D494,890 S | 8/2004 | Katoh |
| D497,324 S | 10/2004 | Chestnut |
| 6,799,781 B2 | 10/2004 | Rasidescu |
| 6,820,708 B2 | 11/2004 | Nakamura |
| 6,851,691 B2 | 2/2005 | Rasidescu |
| 6,868,932 B1 | 3/2005 | Davis |
| D503,658 S | 4/2005 | Lu |
| D511,317 S | 11/2005 | Tanaka |
| 7,004,137 B2 | 2/2006 | Kunugi |
| 7,040,437 B1 | 5/2006 | Fredrickson |
| 7,055,454 B1 | 6/2006 | Whiting |

(56) References Cited

U.S. PATENT DOCUMENTS

| | | |
|---|---|---|
| 7,143,861 B2 | 12/2006 | Chu |
| D535,215 S | 1/2007 | Turner |
| 7,159,557 B2 | 1/2007 | Yasuda |
| 7,168,516 B2 | 1/2007 | Nozaki |
| 7,172,232 B2 | 2/2007 | Chiku |
| D549,133 S | 8/2007 | LePage |
| 7,258,355 B2 | 8/2007 | Amano |
| 7,275,512 B2 | 10/2007 | Deiss |
| D555,036 S | 11/2007 | Eck |
| D563,274 S | 3/2008 | Ramos |
| 7,357,207 B2 | 4/2008 | Vaisanen |
| 7,357,211 B2 | 4/2008 | Inui |
| 7,380,805 B1 | 6/2008 | Turner |
| 7,401,797 B2 | 7/2008 | Cho |
| D578,433 S | 10/2008 | Kawaguchi |
| D578,934 S | 10/2008 | Tanaka |
| 7,431,315 B2 | 10/2008 | Jargowsky et al. |
| 7,506,718 B2 | 3/2009 | Morita |
| D595,613 S | 7/2009 | Lai |
| 7,575,088 B2 | 8/2009 | Mir |
| 7,588,010 B2 | 9/2009 | Mochizuki |
| 7,591,472 B2 | 9/2009 | Kinjyo |
| 7,600,769 B2 | 10/2009 | Bessho |
| D604,201 S | 11/2009 | Kawaguchi |
| D605,555 S | 12/2009 | Tanaka |
| D606,900 S | 12/2009 | Flores |
| 7,631,721 B2 | 12/2009 | Hobbs |
| 7,635,138 B2 | 12/2009 | Imre |
| 7,654,544 B2 | 2/2010 | Lounsberry |
| 7,658,258 B2 | 2/2010 | Denney |
| 7,694,769 B2 | 4/2010 | McGuire |
| 7,708,103 B2 | 5/2010 | Okuyama |
| 7,708,106 B1 | 5/2010 | Bergman |
| 7,728,212 B2 | 6/2010 | Fujishima |
| D622,631 S | 8/2010 | Lai |
| 7,784,805 B2 | 8/2010 | Morgan |
| 7,798,505 B2 | 9/2010 | Neag |
| D625,662 S | 10/2010 | Li |
| 7,819,220 B2 | 10/2010 | Sunsdahl |
| 7,837,203 B1 | 11/2010 | Schmidt |
| 7,891,684 B1 | 2/2011 | Luttinen |
| D650,311 S | 12/2011 | Bracy |
| 8,100,434 B2 | 1/2012 | Miura |
| 8,167,325 B2 | 5/2012 | Lee |
| 8,256,562 B2 | 9/2012 | Robinette |
| 8,306,701 B2 | 11/2012 | Yanagi |
| 8,480,106 B1 | 7/2013 | Cohen |
| 8,517,135 B2 | 8/2013 | Schapf |
| 8,517,136 B2 | 8/2013 | Hurd |
| 8,522,911 B2 | 9/2013 | Hurd |
| 8,596,405 B2 | 12/2013 | Sunsdahl |
| 8,613,335 B2 | 12/2013 | Deckard |
| 8,613,336 B2 | 12/2013 | Deckard |
| 8,727,063 B1 | 5/2014 | Yamamoto |
| 8,746,719 B2 | 6/2014 | Safranski |
| 8,827,019 B2 | 9/2014 | Deckard |
| 8,827,020 B2 | 9/2014 | Deckard |
| 8,827,028 B2 | 9/2014 | Sunsdahl |
| 8,944,449 B2 | 2/2015 | Hurd |
| 8,950,763 B2 | 2/2015 | Jakob |
| 9,211,924 B2 | 12/2015 | Safranski |
| 9,365,251 B2 | 6/2016 | Safranski |
| 2002/0023792 A1 | 2/2002 | Bouffard |
| 2003/0038444 A1 | 2/2003 | Chang |
| 2003/0137121 A1 | 7/2003 | Lenz |
| 2004/0129489 A1 | 7/2004 | Brasseal |
| 2004/0135338 A1 | 7/2004 | Asteggiano |
| 2004/0195034 A1 | 10/2004 | Kato |
| 2004/0195797 A1 | 10/2004 | Nash |
| 2004/0206567 A1 | 10/2004 | Kato |
| 2004/0206568 A1 | 10/2004 | Davis |
| 2005/0006168 A1 | 1/2005 | Iwasaka |
| 2005/0006868 A1 | 1/2005 | Ziech |
| 2005/0056472 A1 | 3/2005 | Smith |
| 2005/0073126 A1 | 4/2005 | Seki |
| 2005/0140110 A1 | 6/2005 | Lee |
| 2005/0173177 A1 | 8/2005 | Smith |
| 2005/0173180 A1 | 8/2005 | Hypes |
| 2005/0206111 A1 | 9/2005 | Gibson |
| 2005/0275183 A1 | 12/2005 | Amano |
| 2006/0032690 A1 | 2/2006 | Inomoto |
| 2006/0032700 A1 | 2/2006 | Vizanko |
| 2006/0071441 A1 | 4/2006 | Mathis |
| 2006/0091636 A1 | 5/2006 | Shelton |
| 2006/0129463 A1 | 6/2006 | Zicherman |
| 2006/0219463 A1 | 10/2006 | Seki |
| 2006/0236980 A1 | 10/2006 | Maruo |
| 2006/0237938 A1 | 10/2006 | Imre |
| 2007/0000715 A1 | 1/2007 | Denney |
| 2007/0007742 A1 | 1/2007 | Allen |
| 2007/0023221 A1 | 2/2007 | Okayama |
| 2007/0023566 A1 | 2/2007 | Howard |
| 2007/0096420 A1 | 5/2007 | Lounsberry |
| 2007/0114747 A1 | 5/2007 | Morgan |
| 2007/0119650 A1 | 5/2007 | Eide |
| 2007/0176486 A1 | 8/2007 | Schlangen |
| 2007/0221430 A1 | 9/2007 | Allison |
| 2007/0227793 A1 | 10/2007 | Nozaki |
| 2007/0256882 A1 | 11/2007 | Bedard |
| 2008/0023240 A1 | 1/2008 | Sunsdahl |
| 2008/0023249 A1 | 1/2008 | Sunsdahl |
| 2008/0135320 A1 | 6/2008 | Matthies |
| 2008/0257630 A1 | 10/2008 | Takeshima |
| 2008/0283326 A1 | 11/2008 | Bennett |
| 2008/0284124 A1 | 11/2008 | Brady |
| 2008/0290623 A1 | 11/2008 | Lundmark |
| 2008/0308334 A1 | 12/2008 | Leonard |
| 2009/0001748 A1 | 1/2009 | Brown |
| 2009/0090575 A1 | 4/2009 | Nagasaka |
| 2009/0178871 A1 | 7/2009 | Sunsdahl |
| 2009/0205891 A1 | 8/2009 | Parrett |
| 2009/0302590 A1 | 12/2009 | Bronkhorst |
| 2010/0078256 A1 | 4/2010 | Kuwabara |
| 2010/0090797 A1 | 4/2010 | Koenig |
| 2010/0289229 A1 | 11/2010 | Post, II |
| 2010/0317484 A1 | 12/2010 | Gillingham |
| 2010/0317485 A1 | 12/2010 | Gillingham |
| 2011/0048833 A1 | 3/2011 | Schapf |
| 2011/0094818 A1 | 4/2011 | Suzuki |
| 2011/0209937 A1 | 9/2011 | Belzile |
| 2011/0240250 A1 | 10/2011 | Azuma |
| 2012/0031693 A1 | 2/2012 | Deckard |
| 2013/0277937 A1 | 10/2013 | Keller |
| 2014/0034409 A1 | 2/2014 | Nakamura |
| 2014/0035251 A1 | 2/2014 | Glanzer et al. |
| 2014/0054871 A1 | 2/2014 | Jakob |
| 2016/0347137 A1 | 12/2016 | Despres-Nadeau et al. |
| 2017/0106747 A1 | 4/2017 | Safranski et al. |
| 2018/0154941 A1* | 6/2018 | Houkom ............... B60R 21/13 |
| 2018/0236834 A1* | 8/2018 | Despres-Nadeau .... B60G 3/202 |
| 2018/0312025 A1* | 11/2018 | Danielson ............. B60T 7/06 |

FOREIGN PATENT DOCUMENTS

| | | |
|---|---|---|
| DE | 3939312 A1 | 5/1990 |
| DE | 102004017639 A1 | 10/2005 |
| DE | 102006055294 A1 | 5/2008 |
| DE | 102006055295 A1 | 5/2008 |
| DE | 102006055288 A1 | 6/2008 |
| DE | 102009004123 A1 | 7/2010 |
| DE | 102011077750 A1 | 12/2012 |
| DE | 102011077751 A1 | 12/2012 |
| EP | 0052663 B1 | 6/1984 |
| JP | 60067206 | 4/1985 |
| JP | 62-110506 A | 5/1987 |
| WO | WO 2008/005131 | 1/2008 |
| WO | WO 2010/074990 | 7/2010 |

OTHER PUBLICATIONS

*Artic Cat, Inc.* v. *Polaris Industries Inc.*, Final Written Decision (Paper 48), Case IPR2015-01789, U.S. Pat. No. 8,746,719 B2,

(56) References Cited

OTHER PUBLICATIONS entered Feb. 1, 2017 before the United States Patent Trial and Appeal Board; 65 pages.
*Artic Cat, Inc. v. Polaris Industries Inc.*, Final Written Decision (Paper 51), Case IPR2015-01788, U.S. Pat. No. 8,746,719 B2, entered Feb. 1, 2017 before the United States Patent Trial and Appeal Board; 75 pages.
Redline Specs, available at www.RedlinePerforms.com: copyright 2008; 2 pages.
Photograph of the Redline Riot, available at http://www.buggyworksandrails.com/images/102_0657.JPG; dated Jun. 28, 2010; 1 page.
Troy Merrifield & Damon Flippo, Rise of the Machine: Let the "Revolution" Begin. One Seat at a Time., CartWheelin' Magazine, available at http://www.1redline.com/news_events/PDF/cart_wheelin_article.pdf, published at least as early as Jan. 2008, last accessed on Feb. 15, 2012; pp. 14-19.
Troy Merrifield, *Redline's Rockin' Riot*, UTV Off-Road Magazine, available at http://www.1redline.com/news_events/PDF/Redline_Riot/Artricle_01_2009.pdf, Feb./Mar. 2009, last accessed on Feb. 15, 2012; pp. 20-24.
Can-Am Specifications for Commander 1000, copyright 2010; 1 page.
Can-Am Specifications for Commander 800R, copyright 2010; 1 page.
Can-Am, *An 85-HP Side-by-Side. No, that's not a typo.*, dated Jun. 25, 2010; 3 pages.
Declaration of Timothy W. Benedict, Aug. 19, 2015, Exhibit 1006, *Artic Cat, Inc. v. Polaris Industries, Inc.*, United States Patent and Trademark Office before the Patent Trial and Appeal Board, Cases IPR2015-01788 and Case IPR2015-01789; 3 pages.
International Search Report of the International Searching Authority, dated Apr. 9, 2012, for related International patent application No. PCT/US2011/046395; 6 pages.
Written Opinion of the International Searching Authority, dated Mar. 1, 2013, for related International patent application No. PCT/US2011/046395; 7 pages.
International Preliminary Report on Patentability issued by the International Searching Authority, dated May 28, 2013, for related International patent application No. PCT/US2011/046395; 31 pages.
Demand and Article 34 Amendment, dated Dec. 5, 2012, for related International patent application No. PCT/US2011/046395; 31 pages.
$2^{nd}$ Written Opinion of the International Searching Authority, dated Mar. 1, 2013, for related International patent application No. PCT/US2011/046395; 9 pages.
Honda 89 FL400R Pilot Service Manual, Honda Motor Co., Ltd., 1988, 265 pages.
R161 Communication in European patent application No. 11745641.8, dated May 7, 2013; 2 pages.
Response to R161 Communication in European patent application No. 11745641.8, dated Nov. 6, 2013; 18 pages.
Communication pursuant to Article 94(3) EPC in European patent application No. 11745641.8, dated Feb. 13, 2014; 4 pages.
Declaration of Gregory W. Davis, Ph.D., P.E., Aug. 21, 2015, Exhibit 1001, *Artic Cat, Inc. v. Polaris Industries, Inc.*, United States Patent and Trademark Office before the Patent Trial and Appeal Board, Case IPR2015-01788 and Case IPR2015-01789;133 pages.
2006 Artic Cat Accessories Brochure, Exhibit 1007, *Artic Cat, Inc. v. Polaris Industries, Inc.*, United States Patent and Trademark Office before the Patent Trial and Appeal Board, Case IPR2015-01788 and Case IPR2015-01789; 69 pages.
"Tuning" up the chassis: suspension enhancements have moved beyond the 'street rodders.' Today, pickups, SUVs and even luxury cars are getting into the act, Mike Mavrigian, MotorAge, Dec. 1, 2002, vol. 121, Issue 12, Exhibit 1008, *Artic Cat, Inc. v. Polaris Industries, Inc.*, United States Patent and Trademark Office before the Patent Trial and Appeal Board, Case IPR2015-01788 and Case IPR2015-01789; 7 pages.

"Anti-sway bars turn for the better," Bob Weber, Chicago Tribune, Jan. 7, 2002, http://articles.chicagotribune.com/2002-01-07/business/0201070199_1_bar-anti-sway-car, Exhibit 1009, *Artic Cat, Inc. v. Polaris Industries, Inc.*, United States Patent and Trademark Office before the Patent Trial and Appeal Board, Case IPR2015-01788 and Case IPR2015-01789; 6 pages.
"Sand Styling" and "Deaton's Dream," Dune Buggies and Hot VWs, Sand Special, Oct. 2004 Edition, Exhibit 1010, *Artic Cat, Inc. v. Polaris Industries, Inc.*, United States Patent and Trademark Office before the Patent Trial and Appeal Board, Case IPR2015-01788 and Case IPR2015-01789; 7 pages.
2008 Revolt Service Manual, Redline Performance Products, LLC, Exhibit 1012, *Artic Cat, Inc. v. Polaris Industries, Inc.*, United States Patent and Trademark Office before the Patent Trial and Appeal Board, Case IPR2015-01788 and Case IPR2015-01789, 259 pages.
"Dueling Duners", Mark A. Rolland, Sand Sports, Jan./Feb. 2008, Exhibit 1013, *Artic Cat, Inc. v. Polaris Industries, Inc.*, United States Patent and Trademark Office before the Patent Trial and Appeal Board, Case IPR2015-01788 and Case IPR2015-01789; 8 pages.
Honda Service Manual'89 FL400R Pilot, Honda Motor Co., Ltd., Nov. 1988, Exhibit 1014, *Artic Cat, Inc. v. Polaris Industries, Inc.*, United States Patent and Trademark Office before the Patent Trial and Appeal Board, Case IPR2015-01788 and Case IPR2015-01789; 265 pages.
Odyssey 350 1985 Brochure, 1984 American Honda Motor Co., Inc., Exhibit 1015; *Artic Cat, Inc. v. Polaris Industries, Inc.*, United States Patent and Trademark Office before the Patent Trial and Appeal Board, Case IPR2015-01788 and Case IPR2015-01789; 6 pages.
"The Automotive Chassis," Engineering Principles, $2^{nd}$ Edition, J. Reimpell et al., translated from German by AGET Limited, SAE International, 2001 Reed Educational and Professional Publishing Ltd., Exhibit 1016, *Artic Cat, Inc. v. Polaris Industries, Inc.*, United States Patent and Trademark Office before the Patent Trial and Appeal Board, Case IPR2015-01788 and Case IPR2015-01789; 5 pages.
Bosch Automotive Handbook, $3^{rd}$ Edition, Robert Bosch GmbH, 1993, Exhibit 1017, *Artic Cat, Inc. v. Polaris Industries, Inc.*, United States Patent and Trademark Office before the Patent Trial and Appeal Board, Case IPR2015-01788 and Case IPR2015-01789; 4 pages.
2008 "Specs" for Redline Revolt, Redline Performance Products, 2008, Exhibit 1018, *Artic Cat, Inc. v. Polaris Industries, Inc.*, United States Patent and Trademark Office before the Patent Trial and Appeal Board, Case IPR2015-01788 and Case IPR2015-01789; 2 pages.
"New for 2004, Yamaha Rhino 660 4×4!", ATV Connection Magazine, 1996-2005 ATV Connection, Inc., Exhibit 1019, *Artic Cat, Inc. v. Polaris Industries, Inc.*, United States Patent and Trademark Office before the Patent Trial and Appeal Board, Case IPR2015-01788 and Case IPR2015-01789; 4 pages.
"Hart's Hunter," Dirt Wheels Magazine, Dec. 1998, Dirt Wheels 69, Exhibit 1020, *Artic Cat, Inc. v. Polaris Industries, Inc.*, United States Patent and Trademark Office before the Patent Trial and Appeal Board, Case IPR2015-01788 and Case IPR2015-01789; 6 pages.
Amended Claims filed in response to First Office Action, dated Aug. 10, 2015, for related Chinese Application No. 201180038339; 15 pages.
European Search Report and Written Opinion issued by the European Patent Office, dated Jun. 3, 2015, for related European patent application No. EP15152331; 4 pages.
First Office Action, dated Jan. 26, 2015, for related Chinese patent application No. 201180038339; 7 pages.
Response to European Search Report and Written Opinion, dated Sep. 14, 2015, for related European patent application No. EP 15152331; 29 pages.
Second Office Action, dated Sep. 14, 2015, for related Chinese patent application No. 201180038339; 8 pages.
"Humvee", Angelfire, available at www.angelfire.com/nb2/jeeppickups/humvee/html, dated Mar. 7, 2014; 7 pages.

(56) References Cited

OTHER PUBLICATIONS

"Bobcat" Utility Vehicles brochure, copyright Feb. 2009; 20 pages.
Petition for Inter Partes Review of U.S. Pat. No. 8,746,719, dated Aug. 21, 2015, *Artic Cat, Inc.* v. *Polaris Industries, Inc.*, United States Patent and Trademark Office before the Patent Trial and Appeal Board, Case IPR2015-01788; 65 pages.
Petition for Inter Partes Review of U.S. Pat. No. 8,746,719, dated Aug. 21, 2015, *Artic Cat, Inc.* v. *Polaris Industries, Inc.*, United States Patent and Trademark Office before the Patent Trial and Appeal Board, Case IPR2015-01789; 66 pages.
Decision, Institution of Inter Partes Review, paper 10, entered Feb. 4, 2016, *Artic Cat, Inc.* v. *Polaris Industries, Inc.*, United States Patent and Trademark Office before the Patent Trial and Appeal Board, Case IPR2015-01788; 18 pages.
Decision, Institution of Inter Partes Review, paper 7, entered Feb. 4, 2016, *Artie Cat, Inc.* v. *Polaris Industries, Inc.*, United States Patent and Trademark Office before the Patent Trial and Appeal Board, Case IPR2015-01789; 22 pages.
Arctic Cat's First Amended Answer and Counterclaim, *Polaris Industries Inc.* v. *Arctic Cat Inc.*, Case 0:15-cv-04475-ADM-LIB, US District of Minnesota, dated Feb. 18, 2016; 33 pages.
Michael J. McKeen Letter, Re: Allowed U.S. Appl. No. 14/565,193, dated Apr. 6, 2016; 11 pages.
Revolt (STV) Photo Galleries, https://webarchive.org/web/20080719163746/http://www.1redline.com/products/revolt/revolt_photo_gallery_php., archived Jul. 19, 20118, viewed Mar. 30, 2016, 4:28 PM; 1 page.
Revolt (STV) Sport Terrain Vehicle, https://web.archive.org/web/20080719163714/http://www.1redline.com/products/revolt/features_singleseat.php, archived Jul. 19, 2008, viewed Mar. 22, 2016, 12:46 PM; 2 pages.
Revolt (STV) Sport Terrain Vehicle Specifications, https://web.archive.org/web/20080719163602/http://www.1redline.com/products/TS750/sportUTV_specs.php, archived Jul. 19, 2008, viewed Mar. 30, 2016, 4:27 PM; 1 page.
*Arctic Cat, Inc.* v. *Polaris Industries, Inc.*, Case IPR2015-1789, U.S. Pat. No. 8,746,719, Transmittal and Patent Owner Polaris Industries Inc.'s Notice of Appeal and Copies of the Decision for which Review Is Sought, filed electronically with USPTO, Apr. 4, 2017; 128 pages.
U.S. Appl. No. 12/849,516, Notice of Allowance and Fee(s) Due, dated Apr. 14, 2014; 5 pages.
U.S. Appl. No. 12/849,516, Notice of Allowance and Fee(s) Due, dated Dec. 26, 2013; 6 pages.
U.S. Appl. No. 12/849,516, Request for Continued Examination (RCE) Transmittal, filed Dec. 9, 2013; 3 pages.
U.S. Appl. No. 12/849,516, Amendment Submitted/Entered with Filing of CPA/RCE, filed Dec. 9, 2013; 1 page.
U.S. Appl. No. 12/849,516, Claims, filed Dec. 9, 2013; 6 pages.
U.S. Appl. No. 12/849,516, Applicant Arguments/Remarks Made in an Amendment, filed Dec. 9, 2013; 1 page.
U.S. Appl. No. 12/849,516, Notice of Allowance and Fee(s) Due, dated Sep. 9, 2013; 6 pages.
U.S. Appl. No. 12/849,516, Applicant Response to Office Action dated Apr. 9, 2013, filed Jul. 26, 2013; 1 page.
U.S. Appl. No. 12/849,516, Claims, filed Jul. 26, 2013; 6 pages.
U.S. Appl. No. 12/849,516, Applicant Arguments/Remarks Made in an Amendment, filed Jul. 26, 2013; 6 pages.
U.S. Appl. No. 12/849,516, Non-Final Rejection, dated Apr. 9, 2013; 6 pages.
U.S. Appl. No. 12/849,516, Applicant Response to Restriction Requirement of Aug. 22, 2012, filed Sep. 21, 2012; 1 page.
U.S. Appl. No. 12/849,516, Claims, filed Sep. 21, 2012; 3 pages.
U.S. Appl. No. 12/849,516, Applicant Arguments/Remarks Made in an Amendment, filed Sep. 21, 2012; 1 page.
U.S. Appl. No. 12/849,516, Requirement for Restriction/Election, dated Aug. 22, 2012; 5 pages.
*Artic Cat, Inc.* v. *Polaris Industries, Inc.*, Case IPR2014-01427, U.S. Pat. No. 8,596,405, Final Written Decision, United States Patent and Trademark Office, Before the Patent Trial and Appeal Board, Paper No. 58, Entered Feb. 4, 2016; 40 pages.
*Arctic Cat, Inc.* v. *Polaris Industries, Inc.*, U.S. Pat. No. 8,746,719 B2, Deposition of Gregory W. Davis, Ph.D., P.E., United States Patent and Trademark Office, Before the Patent Trial and Appeal Board, Apr. 6, 2016; 84 pages.
*Arctic Cat, Inv.* v. *Polaris Industries Inc.*, IPR2015-01788, Polaris Exhibit 2023, Polaris 2012 ATVs/SIDExSIDES, copyright 2011, Polaris Industries, Inc.; 16 pages.
*Artic Cat, Inc.* v. *Polaris Industries, Inc.*, IPR2015-01788, Polaris Exhibit 2028, Dirt Wheels, www.dirtwheelsmag.com, May 2011; 9 pages.
*Arctic Cat, Inc.* v. *Polaris Industries, Inc.*, IPR-2015-01788, Polaris Exhibit 2038, 2011-2012 Ranger FZR XP 900/RZR XP 4 900 Service Manual, Chapter 5, Body/Steering/Suspension, copyright 2012 Polaris Sales Inc.; 70 pages.
*Arctic Cat, Inc.* v. *Polaris Industries, Inc.*, IPR2015-01788, Polaris Exhibit 2043, 2011 Polaris Ranger RZR XP Detail 01, http://www.atv.com/gallery.php?g2_view=largephotos.Largephotos&g1_itemid=35496 [viewed May 4, 2016, 2;58:58 PM]; 1 page.
*Artic Cat, Inc.* v. *Polaris Industries Inc.*, IPR2015-01788, Polaris Exhibit 2118, Consolidated Trial Hearing, *Arctic Cat, Inc.* v. *Polaris Industries, Inc.* IPR2015-01788 & IPR2015-01789, Sep. 29, 2016; 63 pages.
*Arctic Cat, Inc.* v. *Polaris Industries, Inc.*, IPR2015-01788, U.S. Pat. No. 8,746,719 B2 , IPR2015-01789, U.S. Pat. No. 8,746,719 B2, United States Patent and Trademark Office, Before the Patent Trial and Appeal Board, Patent Owner Polaris Industries, Inc.'s Supplemental Brief Pursuant to the Board's Authorization for Additional Briefing, Paper 47, IPR2015-01788/ Paper 44, IPR2015-01789; Dec. 6, 2016; 6 pages.
*Arctic Cat, Inc.* v. *Polaris Industries, Inc.*, IPR2015-01788, United States Patent and Trademark Office, Before the Patent Trial and Appeal Board, Petitioner Arctic Cat, Inc.'s Response to Patent Owner's Supplemental Briefing Pursuant to the Board's Authorization for Additional Briefing, Paper 47, IPR2015-01788 / Paper 44, IPR2015-01789, Dec. 13, 2016; 6 pages.
*Arctic Cat, Inc.* v. *Polaris Industries, Inc.*, IPR2015-01788 and IPR2015-01789, U.S. Pat. No. 8,746,719, United States Patent and Trademark Office, Before the Patent Trial and Appeal Board, Deposition of John J. Moskwa, Jul. 8, 2016; 83 pages.
*Arctic Cat, Inc.* v. *Polaris Industries, Inc.*, IPR2015-01788, Polaris Exhibit 2024, Polaris 2013 Off Road Vehicles, Ranger / RZR / Sportsman, copyright 2012 Polaris Industries, Inc.;16 pages.
*Arctic Cat, Inc.* v. *Polaris Industries, Inc.*, IPR2015-01788, Polaris Exhibit 2029, Sand Sports, May/Jun. 2011, www.sandsports.net; 5 pages.
*Arctic Cat, Inc.* v. *Polaris Industries, Inc.*, IPR2015-01788, Polaris Exhibit 2039, 2011-2012 Ranger RZR XP 900 Service Manual, Chapter 8, Transmission, copyright 2012 Polaris Sales Inc.; 44 pages.
*Arctic Cat, Inc.* v. *Polaris Industries, Inc.*, IPR2015-01788, Polaris Exhibit 2044, In the United States Patent and Trademark Office in re Patent of Sunsdahl et al., U.S. Pat. No. 8,746,719, Issued Jun. 10, 2014, Side-By-Side Vehicle, Declaration of Dr. John J. Moskwa Regarding IPR2015-01788 and IPR2015-01789, May 5, 2016; 159 pages.
*Arctic Cat, Inc.* v. *Polaris Industries, Inc.*, IPR2015-01788, U.S. Pat. No. 8,746,719, United States Patent and Trademark Office, Before the Patent Trial and Appeal Board, Petitioner Arctic Cat, Inc.'s Response to Patent Owner's Motion for Observation, Sep. 13, 2016; 13 pages.
*Arctic Cat, Inc.* v. *Polaris Industries, Inc.*, IPR2015-01788 and IPR2015-01789, U.S. Pat. No. 8,746,719 B2, United States Patent and Trademark Office, Before the Patent Trial and Appeal Board, Deposition of Gregory W. Davis, Ph.D., Aug. 19, 2016; 39 pages.
*Arctic Cat, Inc.* v. *Polaris Industries, Inc.*, IPR2015-01788, Replacement AC 1029, Exhibit P: Disclosure of Claim Elements of U.S. Pat. No. 8,746,719 by U.S. Pat. No. 4,817,985, "Enokimoto '985", alone or in combination with other references; 28 pages.
*Arctic Cat, Inc.* v. *Polaris Industries, Inc.*, IPR2015-01788, AC1029, Exhibit F: Disclosure of Claim Elements of U.S. Pat. No. 8,746,719

(56) References Cited

OTHER PUBLICATIONS by U.S. Pat. No. 5,251,713, "Enokimoto '713", alone or in combination with other references; 30 pages.
*Arctic Cat, Inc. v. Polaris Industries, Inc.*, IPR2015-01788, In the United States Patent and Trademark Office Before the Patent Trial and Appeal Board, Corrected Preliminary Response by Patent Owner Under 37 C.F.R. § 42.107, Dec. 2, 2015; 38 pages.
*Arctic Cat, Inc. v. Polaris Industries, Inc.*, IPR2015-01788, U.S. Pat. No. 8,746,719 B2, In the United States Patent and Trademark Office Before the Patent Trial and Appeal Board, Motion for Observation Regarding Cross Examination of Reply Witness, Sep. 2, 2016; 17 pages.
*Arctic Cat, Inc. v. Polaris Industries, Inc.*, IPR2015-01788, Exhibit 2016, In the United States Patent and Trademark Office Before the Patent Trial and Appeal Board, Declaration of Donna Beadle, May 3, 2016; 3 pages.
*Arctic Cat, Inc. v. Polaris Industries, Inc.*, IPR2015-01788, Exhibit 2025, 2014 Polaris Off-Road Vehicles, © 2013 Polaris Industries, Inc.; 18 pages.
*Arctic Cat, Inc. v. Polaris Industries, Inc.*, IPR2015-01788, Exhibit 2030, UTV Off-Road Magazine, Feb./Mar. 2011, Issue 29; 4 pages.
*Arctic Cat, Inc. v. Polaris Industries, Inc.*, IPR-2015-001788, Paper 46, IPR2015-01789, Paper 43 (Nov. 21, 2016), United States Patent and Trademark Office, Before the Patent Trial and Appeal Board, IPR2015-01781, U.S. Pat No. 8,827,028 B2, IPR-2015-01783, U.S. Pat. No. 8,827,028 B2, IPR2015-01788, U.S. Pat. No. 8,746,719 B2, IPR2015-01789, U.S. Pat. No. 8,746,719 B2, Proceedings before Karl D. Easthom, Philip J. Kauffman, and Michael W. Kim, Administrative Patent Judges, Oct. 3, 2016; 58 pages.
*Arctic Cat, Inc. v. Polaris Industries, Inc.*, IPR2015-01788, AC1031, IPR2015-01788/IPR2015-01789, Oral Hearing, Oct. 3, 2016; 42 pages.
*Arctic Cat, Inc. v. Polaris Industries, Inc.*, IPR2015-01788, Polaris Exhibit 2021, Polaris Ranger RZR, copyright 2010 Polaris Industries, Inc.; 16 pages.
*Arctic Cat, Inc. v. Polaris Industries, Inc.*, IPR2015-01788, Polaris Exhibit 2026, ATV Rider, ATVRiderOnline.com, May/Jun. 2011; 7 pages.
*Arctic Cat, Inc. v. Polaris Industries, Inc.*, IPR2015-01788, Exhibit 2031,United States Patent and Trademark Office, Before the Patent Trial and Appeal Board, Deposition of Gregory W. Davis, Ph.D., Apr. 17, 2015; 111 pages.
*Arctic Cat, Inc. v. Polaris Industries, Inc.*, IPR2015-01788, Exhibit 2036, Engineering Principles, Second Edition, The Automotive Chassis, Society of Automotive Engineers, Inc., copyright Reed Educational and Professional Publishing Ltd. 2001 (original copyright 1986 Vogel-Buchverlag, Wurzburg, Germany; 8 pages.
*Arctic Cat, Inc. v. Polaris Industries, Inc.*, IPR2015-01788, Exhibit 2041, Ranger RZR 4 XP 900 R12XT87AA/9EAS Parts Catalog 2012, 9923530 Parts Manual, copyright 2011 Polaris Industries, Inc.; 150 pages.
*Arctic Cat, Inc. v. Polaris Industries, Inc.*, IPR2015-01788, In the United States Patent and Trademark Office Before the Patent Trial and Appeal Board, Case IPR2015-01788, U.S. Pat. No. 8,746,719, Petitioner Arctic Cat, Inc.'s Response to Patent Owner's Response to Petition, Aug. 4, 2016; 29 pages.
*Arctic Cat, Inc. v. Polaris Industries, Inc.*, IPR2015-01788/ U.S. Pat. No. 8,76,719, IPR2015-01783/U.S. Pat. No. 8,827,028, In the United States Patent and Trademark Office Before the Patent Trial and Appeal Board, Deposition of John Moskwa, Jun. 24, 2016; 63 pages.
*Arctic Cat, Inc. v. Polaris Industries, Inc.*, IPR2015-01788, Polaris Exhibit 2022, Polaris 2011 ATVs Side X Sides, © 2010 Polaris Industries, Inc.; 44 pages.
*Arctic Cat, Inc. v. Polaris Industries, Inc.*, IPR2015-01788, Polaris Exhibit 2027, ATV Trail Rider, May/Jun. 2011; 8 pages.
*Arctic Cat, Inc. v. Polaris Industries, Inc.*, IPR2015-01788, Polaris Exhibit 2037, 2011-2012 Ranger RZR XP 900 Service Manual, Chapter 1, General Information, copyright 2012 Polaris Sales Inc.; 14 pages.

*Arctic Cat, Inc. v. Polaris Industries, Inc.*, IPR2015-01788, Polaris Exhibit 2042, 2011 Polaris, The Way Out, Ranger RZR XP 900 Owner's Manual for Maintenance and Security, copyright 2010 Polaris Sales Inc.; 135 pages.
*Arctic Cat, Inc. v. Polaris Industries, Inc.*, IPR2014-01427, In the United States Patent and Trademark Office Before the Patent Trial and Appeal Board, Deposition of Dr. John W. Moskwa, Jul. 14, 2015; 92 pages.
*Arctic Cat, Inc. v. Polaris Industries, Inc.*, IPR2015-01788, Polaris Exhibit 2006, U.S. Pat. No. 7,270,336 B2, Fujimori, Date of Patent: Sep. 18, 2007; 6 pages.
*Arctic Cat, Inc. v. Polaris Industries, Inc.*, IPR2015-01788, AC1028, In the United States Patent and Trademark Office in re Patent of Sunsdahl et al., U.S. Pat. No. 8,746,719, Issued Jun. 10, 2014, Side-By-Side Vehicle, Second Declaration of Gregory W. Davis, Ph.D., P.E., Aug. 4, 2016; 14 pages.
*Arctic Cat, Inc. v. Polaris Industries, Inc.*, IPR2015-01788, Replacement AC 1030, Exhibit N: Disclosure of Claim Elements of U.S. Pat. No. 8,746,719 by U.S. Pat. No. 3,292,944, "Dangauthier '944", alone or in combination with other references; 26 pages.
*Arctic Cat, Inc. v. Polaris Industries, Inc.*, IPR2015-01788, In the United States Patent and Trademark Office Before the Patent Trial and Appeal Board, [Redacted] Response by Patent Owner Polaris Industries, Inc. Under 37 C.F.R. § 42.120, May 5, 2016; 77 pages.
*Arctic Cat, Inc. v. Polaris Industries, Inc.*, IPR2015-01789, AC 1030, Exhibit N: Disclosure of Claim Elements of U.S. Pat. No. 8,746,719 by U.S. Pat. No. 3,292,944, "Dangauthier '944", alone or in combination with other references; 26 pages.
*Arctic Cat, Inc. v. Polaris Industries, Inc.*, IPR2015-01789, In the United States Patent and Trademark Office Before the Patent Trial and Appeal Board, Preliminary Response by Patent Owner Under 37 C.F.R. § 42.107, Nov. 25, 2015; 42 pages.
*Arctic Cat, Inc. v. Polaris Industries, Inc.*, AC1001, In the United States Patent and Trademark Office in re Patent of Sunsdahl et al., U.S. Pat. No. 8,746,719, Issued Jun. 10, 2014, Side-By-Side Vehicle, Declaration of Gregory W. Davis, Ph.D., P.E., Aug. 21, 2015; 133 pages.
*Arctic Cat, Inc. v. Polaris Industries, Inc.*, AC1006, In the United States Patent and Trademark Office in re Patent of Sunsdahl et al., U.S. Pat. No. 8,746,719, Issued Jun. 10, 2014, Side-By-Side Vehicle, Declaration of Timothy W. Benedict, Aug. 19, 2015; 3 pages.
*Arctic Cat, Inc. v. Polaris Industries, Inc.*, IPR2015-01789, Exhibit 2016, In the United States Patent and Trademark Office Before the Patent Trial and Appeal Board, Declaration of Donna Beadle, May 3, 2016; 3 pages.
*Arctic Cat, Inc. v. Polaris Industries, Inc.*, IPR2015-01788 and IPR2015-0789, Polaris Exhibit 2044, In the United States Patent and Trademark Office in re Patent of Sunsdahl et al., U.S. Pat. No. 8,746,719, Issued Jun. 10, 2014, Side-By-Side Vehicle, Declaration of Dr. John J. Moskwa Regarding IPR2015-01788 and IPR2015-01789, May 5, 2016; 159 pages.
*Arctic Cat, Inc. v. Polaris Industries, Inc.*, IPR2015-01789, U.S. Pat. No. 8,746,719, In the United States Patent and Trademark Office Before the Patent Trial and Appeal Board, [Redacted] Response by Patent Owner Polaris Industries, Inc. Under 37 C.F.R. § 42.120, May 5, 2016; 77 pages.
*Arctic Cat, Inc. v. Polaris Industries, Inc.*, IPR2015-01789, U.S. Pat. No. 8,746,719, United States Patent and Trademark Office, Before the Patent Trial and Appeal Board, Petitioner Arctic Cat, Inc.'s Response to Patent Owner's Motion for Observation, Sep. 13, 2016; 13 pages.
*Arctic Cat, Inc. v. Polaris Industries, Inc.*, IPR2015-01789, U.S. Pat. No. 8,746,719, In the United States Patent and Trademark Office Before the Patent Trial and Appeal Board, Petitioner Arctic Cat, Inc.'s Response to Patent Owner's Response to Petition, Aug. 4, 2016; 31 pages.
*Arctic Cat, Inc. v. Polaris Industries, Inc.*, IPR2015-01789, Replacement AC 1029, Exhibit P: Disclosure of Claim Elements of U.S. Pat. No. 8,746,719 by U.S. Pat. No. 4,817,985, "Enokimoto '985", alone or in combination with other references; 28 pages.

(56) References Cited

OTHER PUBLICATIONS

*Arctic Cat, Inc.* v. *Polaris Industries, Inc.*, IPR2015-01789, AC 1023, In the United States Patent and Trademark Office Before the Patent Trial and Appeal Board, Deposition of John Moskwa, Jun. 24, 2016; 63 pages.
*Arctic Cat, Inc.* v. *Polaris Industries, Inc.*, IPR2015-01789, AC 1026, United States Patent and Trademark Office, Before the Patent Trial and Appeal Board, Deposition of John J. Moskwa, Jul. 8, 2016; 83 pages.
*Arctic Cat, Inc.* v. *Polaris Industries, Inc.*,IPR2015-01789, AC 1028, In the United States Patent and Trademark Office in re Patent of Sunsdahl et al., U.S. Pat. No. 8,746,719, Issued Jun. 10, 2014, Side-By-Side Vehicle, Second Declaration of Gregory W. Davis, Ph.D., P.E., Aug. 4, 2016; 14 pages.
*Arctic Cat, Inc.* v. *Polaris Industries, Inc.*, IPR2015-01789, AC1029, Exhibit F: Disclosure of Claim Elements of U.S. Pat. No. 8,746,719 by U.S. Pat. No. 5,251,713, "Enokimoto '713", alone or in combination with other references; 30 pages.
Office Action and Examination Search Report, Canadian Patent Application No. 2,807,140 (PCT US2011046395) to Polaris Industries Inc., Side-By-Side Vehicle, Mar. 3, 2017; 4 pages.
Amended claims (marked copy) re: CN Application No. 201180038339.5; 2 pages.

\* cited by examiner

| HOUSING 462 | 483 | SPACER 484 | 485 | HOUSING 460 |

FIG. 37A

| HOUSING 462' | 486 | SPACER 484' | 487 | HOUSING 460' |

FIG. 37B

SIDE-BY-SIDE VEHICLE

RELATED APPLICATION

This application is a continuation of U.S. patent application Ser. No. 15/159,561, filed May 19, 2016, titled SIDE-BY-SIDE VEHICLE, which is a continuation of U.S. patent application Ser. No. 14/565,193, filed Dec. 9, 2014, titled SIDE-BY-SIDE VEHICLE, which a continuation of U.S. patent application Ser. No. 14/225,208, filed Mar. 25, 2014, titled SIDE-BY-SIDE VEHICLE, which is a divisional application of U.S. patent application Ser. No. 12/849,516, now U.S. Pat. No. 8,746,719, filed Aug. 3, 2010, titled SIDE-BY-SIDE VEHICLE, the entire disclosures of which are expressly incorporated by reference herein.

FIELD OF THE INVENTION

The present invention relates generally to a vehicle and in particular to a vehicle having side-by-side seating.

BACKGROUND AND SUMMARY OF THE INVENTION

Side-by-side vehicles are known. The present disclosure relates to vehicles, including utility vehicles. The present disclosure relates to air handling systems for vehicles. The present disclosure relates to suspension systems for vehicles.

In exemplary embodiment of the present disclosure, a vehicle is provided. The vehicle, comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a rear drive unit supported by the frame and positioned rearward of the operator area; and a first rear suspension system moveably coupling the first ground engaging member to the frame. The rear drive being operatively coupled to the power source and operatively coupled to at least a first ground engaging member positioned rearward of the operator area through a drive shaft to transfer power received from the power source to the first ground engaging member. The first rear suspension system including a control arm moveably coupled to the frame at a location rearward of the drive shaft connecting the rear drive unit and the first ground engaging member and between a plane passing through a first laterally extending end of the rear drive unit and a centerline longitudinal plane of the vehicle. The plane being parallel to the centerline longitudinal plane of the vehicle. In one example, the first rear suspension includes a second control arm moveably coupled to the frame at a second location rearward of the drive shaft connecting the rear drive unit and the first ground engaging member and between the plane passing through the first laterally extending end of the rear drive unit and the centerline longitudinal plane of the vehicle. In a variation thereof, the control arm and the second control arm are coupled to a bearing carrier which is coupled to the first ground engaging member, the bearing carrier including an opening through which the drive shaft is operatively coupled to the first ground engaging member. In a further variation thereof, the first rear suspension includes a radius arm coupled to the frame at a third location forward of the rear drive unit and coupled to the bearing carrier. The third location may be forward of the power source. The third location may be under the seating of the operator area. In another variation thereof, the first rear suspension includes a dampening member having a first end coupled to the radius arm at a fourth location and a second end coupled to the frame at a fifth location, the fifth location being forward of the fourth location and closer to the longitudinal centerline plane than the fourth location. In another example, the vehicle further comprises a front drive unit supported by the frame and positioned forward of the operator area. The front drive being operatively coupled to the power source and operatively coupled to at least a second ground engaging member positioned forward of the operator area to transfer power received from the power source to the second ground engaging member.

In another exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a rear drive unit supported by the frame and positioned rearward of the operator area, the rear drive being operatively coupled to the power source and operatively coupled to at least a first ground engaging member positioned rearward of the operator area through a drive shaft to transfer power received from the power source to the first ground engaging member; and a first rear suspension system moveably coupling the first ground engaging member to the frame. The first rear suspension system including a control arm coupled to the frame at a rear face of the frame. The control arm being unobscured by the frame from a viewing direction which is perpendicular to a centerline longitudinal plane of the vehicle and rearward of the vehicle. In one example, the rear face of the vehicle is a flat surface. In another example, the first rear suspension includes a second control arm moveably coupled to the rear face of the frame at a second location the second control arm being unobscured by the frame from the viewing direction which is perpendicular to a centerline longitudinal plane of the vehicle and rearward of the vehicle. In a variation thereof, the control arm and the second control arm are coupled to a bearing carrier which is coupled to the first ground engaging member. The bearing carrier including an opening through which a drive shaft is operatively coupled to the first ground engaging member. The first rear suspension may include a radius arm coupled to the frame at a third location forward of the power source and coupled to the bearing carrier. The third location may be under the seating of the operator area. The first rear suspension includes a dampening member having a first end coupled to the radius arm at a fourth location and a second end coupled to the frame at a fifth location. The fifth location being forward of the fourth location and closer to the longitudinal centerline plane than the fourth location. In another example, the vehicle further comprises a front drive unit supported by the frame and positioned forward of the operator area, the front drive being operatively coupled to the power source and operatively coupled to at least a second ground engaging member positioned forward of the operator area to transfer power received from the power source to the second ground engaging member.

In another exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a rear drive unit supported by the frame and positioned rearward of the operator area. The rear drive being operatively coupled to the power source and operatively coupled to a first ground engaging member positioned rearward of the operator area through a first drive shaft to transfer power received from the power source to the first ground engaging member and to a second ground engaging member positioned rearward of the operator area through a second drive shaft to transfer power received from the power source to the second ground engaging member. The first ground engaging member being positioned on a first side of a vertical centerline longitudinal plane of the vehicle and the second ground engaging member being positioned on a second side of the vertical centerline longitudinal plane of the vehicle. The vehicle further comprising a first rear suspension system moveably coupling the first ground engaging member to the frame. The first rear suspension system including a first radius arm coupled to the first ground engaging member and coupled to the frame at a first location forward of the first ground engaging member, a first control arm coupled to the first ground engaging member and to the frame; and a first dampening member coupled to the first radius arm and to the frame. The vehicle further comprising a second rear suspension system moveably coupling the second ground engaging member to the frame. The second rear suspension system including a second radius arm coupled to the second ground engaging member and coupled to the frame at a second location forward of the second ground engaging member, a second control arm coupled to the second ground engaging member and to the frame; and a second dampening member coupled to the second radius arm and to the frame. The vehicle further comprising a sway bar coupling the first rear suspension to the second rear suspension, the sway bar being coupled to the frame at a location forward of the power source. In one example, the location at which the sway bar is coupled to the frame is rearward of the first location and the second location. In another example, the sway bar is coupled to the first radius arm through a first link and the sway bar is coupled to the second radius arm through a second link. In a variation thereof, the location at which the sway bar is coupled to the frame is rearward of the first location and the second location. In another example, the first control arm is coupled to the frame at a fourth location, the power source being positioned between the first location and the fourth location. In a variation thereof, the location at which the sway bar is coupled to the frame is rearward of the first location and the second location.

In a further exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including side-by-side seating and operator controls; a rear drive unit supported by the frame and positioned rearward of the operator area; and a first rear suspension system moveably coupling the first ground engaging member to the frame. The rear drive being operatively coupled to the power source and operatively coupled to a first ground engaging member positioned rearward of the operator area through a first drive shaft to transfer power received from the power source to the first ground engaging member and to a second ground engaging member positioned rearward of the operator area through a second drive shaft to transfer power received from the power source to the second ground engaging member, the first ground engaging member being positioned on a first side of a vertical centerline longitudinal plane of the vehicle and the second ground engaging member being positioned on a second side of the vertical centerline longitudinal plane of the vehicle. The first rear suspension system including a first moveable arm. The vehicle further comprising a second rear suspension system moveably coupling the second ground engaging member to the frame, the second rear suspension system including a second moveable arm; and a sway bar coupling the first rear suspension to the second rear suspension, the sway bar being coupled to the frame at a location forward of the power source. In one example, the sway bar is coupled to the first moveable arm and the second moveable arm. In a variation thereof, the vehicle further comprises a front drive operatively coupled to the power source and operatively coupled to a third ground engaging member positioned forward of the operator area and a fourth ground engaging member positioned forward of the operator area, the third ground engaging member being positioned on the first side of the vertical centerline longitudinal plane of the vehicle and the fourth ground engaging member being positioned on the second side of the vertical centerline longitudinal plane of the vehicle.

In a further exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a rear drive unit supported by the frame and positioned rearward of the operator area, the rear drive being operatively coupled to the power source and operatively coupled to a first ground engaging member positioned rearward of the operator area through a first drive shaft to transfer power received from the power source to the first ground engaging member; and a first rear suspension system moveably coupling the first ground engaging member to the frame. The first rear suspension system including a first radius arm coupled to the first ground engaging member and coupled to the frame at a first location forward of the first ground engaging member, a first control arm coupled to the first ground engaging member and to the frame; and a first dampening member coupled to the first radius arm and to the frame. The vehicle further comprising a bearing carrier coupled to the first ground engaging member, the first radius arm, and the first control arm. The bearing carrier including an opening through which the drive shaft is operatively coupled to the first ground engaging member. The first radius arm may be uncoupled from the frame at the first location and uncoupled from the bearing carrier without uncoupling the drive shaft from the first ground engaging member. In one example, the first radius arm includes an open end which receives the drive shaft.

In still another exemplary embodiment of the present disclosure, a method of removing a radius arm of a rear suspension of a vehicle is provided. The method comprising the steps of (a) uncoupling a first portion of the radius arm of the rear suspension from a frame of the vehicle; (b) uncoupling a second portion of the radius arm of the rear suspension from a bearing carrier which is coupled to a wheel of the vehicle, the bearing carrier having an opening through which a drive shaft is operatively coupled to the ground engaging member; and (c) removing the radius arm from the vehicle, wherein the drive shaft remains coupled to the wheel throughout steps (a) through (c). In one example, the method further comprises the step of uncoupling a third portion of the radius arm of the rear suspension from the frame of the vehicle, the third portion being spaced apart from the first portion and the second portion. In a variation thereof, the step of uncoupling the third portion of the radius arm of the rear suspension from the frame of the vehicle includes the step of uncoupling the third portion of the radius arm of the rear suspension from a dampening member which is coupled to the frame.

In yet a further exemplary embodiment of the present disclosure, a vehicle is provided. The vehicle comprising a frame; a plurality of ground engaging members supporting the frame; and a unit. The unit including a power source supported by the frame through less than three connections, a transmission supported by the frame through less than three connections, and a spacer coupled to the power source housing and coupled to the transmission housing to position the transmission relative to the power source. The power source having a power source housing and a power source output drive member. The transmission having a transmission housing and a transmission input drive member and a transmission output drive member. The transmission input drive member being operatively coupled to the power source output drive member and the transmission output drive member being operatively coupled to at least one of the plurality of the plurality of ground engaging members to propel the vehicle. The power source output drive member and the transmission input drive member being completely outside of the spacer. The unit being supported by the frame through at least a first connection, a second connection, and a third connection. In one example, the spacer is coupled to the power source through a first fastener and a second fastener and the spacer is coupled to the transmission through a third fastener and a fourth fastener. In a variation thereof, the first fastener is parallel to the second fastener and the third fastener is parallel to the fourth fastener. In another example, the spacer is received by a portion of the power source housing and is coupled to the power source housing through a first connection and a second connection and wherein the spacer is received by a portion of the transmission housing and is coupled to the transmission through a third connection and a fourth connection.

In a further exemplary embodiment of the present disclosure, a method of supporting a power source and a transmission on a frame of a vehicle is provided. The method comprising the steps of coupling the power source to the transmission with a spacer, a power source output drive member of the power source and an input drive member of the transmission being completely outside of the spacer; and supporting the power source, the transmission, and the spacer on the frame through at least three connections, less than three connections supporting the power source and less than three connection supporting the transmission.

In still a further exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a rear drive unit supported by the frame and positioned rearward of the operator area, the rear drive being operatively coupled to the power source and operatively coupled to at least a first ground engaging member positioned rearward of the operator area through a drive shaft to transfer power received from the power source to the first ground engaging member; and a first rear suspension system moveably coupling the first ground engaging member to the frame. The first rear suspension system including a radius arm moveably coupled to the frame at a first location forward of the drive shaft; a control arm moveably coupled to the frame at second location rearward of the drive shaft; and a dampening member moveably coupled to the frame at a third location and moveably coupled to the radius arm at a fourth location. The third location being forward of the fourth location and closer to the longitudinal centerline plane than the fourth location. In one example, the vehicle further comprises a bearing carrier coupled to the control arm and the radius arm, the first suspension being generally rotatable about a first suspension axis generally passing through the first location and the second location. A top view projection of the first suspension axis intersecting a longitudinal centerline of the vehicle. In a variation thereof, a top view projection of a centerline of the dampening member is angled relative to the top view projection of the first suspension axis. The top view projection of the centerline of the dampening member may be generally normal to the top view projection of the first suspension axis. The top view projection of the centerline of the dampening member may be angled up to about 30 degrees from a normal to the top view projection of the first suspension axis. The top view projection of the centerline of the dampening member may be angled up to about 20 degrees from a normal to the top view projection of the first suspension axis. The top view projection of the centerline of the dampening member may be angled up to about 10 degrees from a normal to the top view projection of the first suspension axis.

In yet another exemplary embodiment, a vehicle is provided. The vehicle comprising a frame; a plurality of ground engaging members supporting the frame; a power source supported by the frame and operatively coupled to at least one of the plurality of ground engaging members to propel the vehicle; an operator area supported by the frame, the operator area including seating and operator controls; a cargo carrying portion supported by the frame and located rearward of the operator area; and a first air intake system operatively coupled to the power source to communicate ambient air to the power source. The first air intake system receiving ambient air through an inlet in an exterior body panel of the cargo carrying portion. In one example, the cargo carrying portion is a cargo bed. In a variation thereof, the cargo carrying portion includes a floor and a plurality of walls. The floor including a removable cover which permits access to a portion of the first air intake system. The portion of the first air intake system may be an airbox including a filter. In another example, the first air intake system includes a resonator box located between an exterior surface of the exterior body panel of the cargo carrying portion and a wall of a cargo carrying region of the cargo carrying portion. In yet another example, the vehicle further comprises a cover coupled to the exterior body panel to cover the inlet in the exterior body panel. The cover permitting the ambient air to pass by the cover. In a variation thereof, the vehicle further comprises a filter housing positioned behind the cover and a filter removably positioned within the filter housing. The ambient air passing through the filter. The filter may be located between an exterior surface of the exterior body panel of the cargo carrying portion and a wall of a cargo carrying region of the cargo carrying portion. The inlet in the exterior body panel of the cargo carrying portion may be positioned on a first side of a vertical centerline plane of the vehicle and the first air intake system transports the ambient air to a second side of the vertical centerline plane as the ambient air travels through a fluid conduit of the first air intake system. The vehicle may further comprise a CVT unit supported by the frame and operatively coupled between the power source and the at least one of the plurality of ground engaging members; and a second air intake system operatively coupled to the CVT unit to communicate ambient air to an interior of the CVT unit. The second air intake system including a second air inlet through which ambient air enters the second air intake system. The second air inlet being completely positioned to the second side of the vertical centerline plane of the vehicle. The second air intake system transporting the ambient air received through the second air inlet to the first side of the vertical centerline plane of the vehicle as the ambient air travels towards the CVT unit.

In still another exemplary embodiment of the present disclosure, a method of providing air to a power source of a vehicle is provided. The method comprising the steps of: providing an air inlet of an air intake system in a cargo carrying portion of the vehicle, the air inlet being rearward of an operator area of the vehicle; receiving a first amount of ambient air through the air inlet; and communicating the first amount of ambient air to the power source of the vehicle. In one example, the air inlet is provided in an exterior body panel of the cargo carrying portion of the vehicle. In another example, the cargo carrying portion includes a cargo bed. In a further example, the step of communicating the first amount of ambient air to the power source of the vehicle includes the step of: passing the ambient air through a first filter located between an exterior of the cargo carrying portion and a wall of a cargo bed of the cargo carrying portion. In still another example, the step of communicating the first amount of ambient air to the power source of the vehicle includes the step of passing the ambient air through a resonator box located between an exterior of the cargo carrying portion and a wall of a cargo bed of the cargo carrying portion. In yet still another example, the step of communicating the first amount of ambient air to the power source of the vehicle includes the step of passing the ambient air through an airbox. The airbox including a base portion, a cover portion, and a filter positioned in an interior of the airbox. The ambient air passing through the filter, the airbox being located below a floor of the cargo carrying portion. In still another example, the method further comprises the steps of manipulating a portion of the floor of the cargo carrying portion to access the airbox from above the floor of the cargo carrying portion; and moving the cover portion of the airbox relative to the base portion of the airbox to access the filter of the airbox, the cover portion being rotatably coupled to the base portion.

In yet still another exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; a CVT unit supported by the frame and operatively coupled between the power source and the at least one of the plurality of ground engaging members; an operator area supported by the frame, the operator area including seating and operator controls; a cargo carrying portion supported by the frame and located rearward of the operator area; and an air intake system operatively coupled to the CVT unit to communicate ambient air to an interior of the CVT unit, the air intake system receiving ambient air through an inlet in an exterior body panel of the cargo carrying portion. In one example, the cargo carrying portion is a cargo bed. In another example the vehicle further comprises a cover coupled to the exterior body panel to cover the inlet in the exterior body panel. The cover permitting the ambient air to pass by the cover. In a further example, the vehicle further comprises a filter housing positioned behind the cover and a filter removably positioned within the filter housing. The ambient air passing through the filter. In a variation thereof, the filter is located between an exterior surface of the exterior body panel of the cargo carrying portion and a wall of a cargo carrying region of the cargo carrying portion. The inlet in the exterior body panel of the cargo carrying portion may positioned on a first side of a vertical centerline plane of the vehicle and the air intake system transports the ambient air to a second side of the vertical centerline plane as the ambient air travels through a fluid conduit of the air intake system. In another example, the CVT unit includes a drive member operatively coupled to the power source; a driven member operatively coupled to the at least one ground engaging member; a drive belt operatively coupling the driven member to the drive member; and a CVT housing having an interior containing the drive member, the driven member, and the drive belt. The CVT housing including a plurality of air inlets to the interior of the CVT housing, a first air inlet being positioned proximate the drive member and a second air inlet being positioned proximate the driven member. Both the first air inlet and the second air inlet being in fluid communication with the air intake system to receive ambient air from the air intake system. In a variation thereof, the CVT housing includes an air outlet through which air exits the interior of the CVT housing, the air outlet being in fluid communication with a fluid conduit which directs the air at a portion of the power source.

In still another exemplary embodiment of the present disclosure, a method of providing air to a CVT unit of a vehicle is provided. The method comprising the steps of: providing an air inlet of an air intake system in a cargo carrying portion of the vehicle, the air inlet being rearward of an operator area of the vehicle; receiving a first amount of ambient air through the air inlet; and communicating the first amount of ambient air to an interior of the CVT unit of the vehicle. In one example, the air inlet is provided in an exterior body panel of the cargo carrying portion of the vehicle. In another example, the cargo carrying portion includes a cargo bed. In still another example, the step of communicating the first amount of ambient air to the CVT unit of the vehicle includes the step of: passing the ambient air through a first filter located between an exterior of the cargo carrying portion and a wall of a cargo bed of the cargo carrying portion.

In yet another exemplary embodiment of the present disclosure, a vehicle is provided. The vehicle comprising a frame; a plurality of ground engaging members supporting the frame; an operator area supported by the frame, the operator area including seating and operator controls; a cargo carrying portion supported by the frame and located rearward of the operator area; a power source supported by the frame and operatively coupled to at least one of the plurality of ground engaging members to propel the vehicle; a CVT unit supported by the frame at a first position; a first air intake system operatively coupled to the power source to communicate ambient air to the power source, the first air intake system including a first air inlet through which ambient air enters the first air intake system, the first air inlet being completely positioned to a first side of the CVT unit; and a second air intake system operatively coupled to the CVT unit to communicate ambient air to an interior of the CVT unit, the second air intake system including a second air inlet through which ambient air enters the second air intake system, the second air inlet being completely positioned to a second side of the CVT unit. The CVT unit being operatively coupled between the power source and the at least one of the plurality of ground engaging members. In one example, the first air inlet and the second air inlet are both rearward of a front plane of the seating of the operator area. In a variation thereof, the first air inlet and the second air inlet are both rearward of the operator area. In another variation thereof the vehicle further comprises a roll cage. The first air inlet and the second air inlet are both rearward of the roll cage. In another example, the first air inlet and the second air inlet are positioned above the plurality of ground engaging members. In a variation thereof the vehicle further comprises a rear drive unit supported by the frame rearward of the front plane of the seating and operatively coupled to at least one ground engaging member which is rearward of the front plane of the seating, the power source being operatively coupled to the rear drive unit; and a first suspension system coupling the at least one ground engaging member which is rearward of the front plane of the seating to the frame, the first air inlet and the second air inlet being positioned completely above the first suspension system.

In still another exemplary embodiment of the present disclosure, a vehicle is provided. The vehicle comprising a frame; a plurality of ground engaging members supporting the frame; a power source supported by the frame and operatively coupled to at least one of the plurality of ground engaging members to propel the vehicle; an air intake system operatively coupled to the CVT unit to communicate ambient air to an interior of the CVT unit; and a CVT unit supported by the frame. The CVT unit being operatively coupled between the power source and the at least one of the plurality of ground engaging members. The CVT unit comprising a drive member operatively coupled to the power source; a driven member operatively coupled to the at least one ground engaging member; a drive belt operatively coupling the driven member to the drive member; and a CVT housing having an interior containing the drive member, the driven member, and the drive belt. The CVT housing including a plurality of air inlets to the interior of the CVT housing. A first air inlet being positioned proximate the drive member and a second air inlet being positioned proximate the driven member. Both the first air inlet and the second air inlet being in fluid communication with the air intake system to receive ambient air from the air intake system. In one example, the CVT unit includes a diverter which receives the ambient air from the air intake system and directs a first portion of the ambient air to the first air inlet and a second portion of the ambient air to the second air inlet. In a variation thereof, the CVT housing includes a base portion and a cover. The cover being removably coupled to the base portion. The diverter being associated with the base portion. The diverter may be part of the base portion of the CVT housing. In another example, the first portion of the ambient air moves from the first air inlet towards an air outlet of the CVT housing in a generally counterclockwise movement and the second portion of the ambient air moves from the second air inlet towards the air outlet of the CVT housing in a generally counterclockwise movement.

The above mentioned and other features of the invention, and the manner of attaining them, will become more apparent and the invention itself will be better understood by reference to the following description of embodiments of the invention taken in conjunction with the accompanying drawings. These above mentioned and other features of the invention may be used in any combination or permutation.

BRIEF DESCRIPTION OF THE DRAWINGS

FIG. 37A represents the coupling of a housing of the power supply to a housing of the shiftable transmission with a first spacer;

FIG. 37B represents the coupling of another housing of another power supply to another housing of another shiftable transmission with a second spacer;

FIG. 43 illustrates an exemplary motion ratio plot for the rear suspension of FIG. 1;

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a side-by-side vehicle, it should be understood that the features disclosed herein may have application to other types of vehicles such as all-terrain vehicles, motorcycles, watercraft, snowmobiles, and golf carts.

Figure 1:
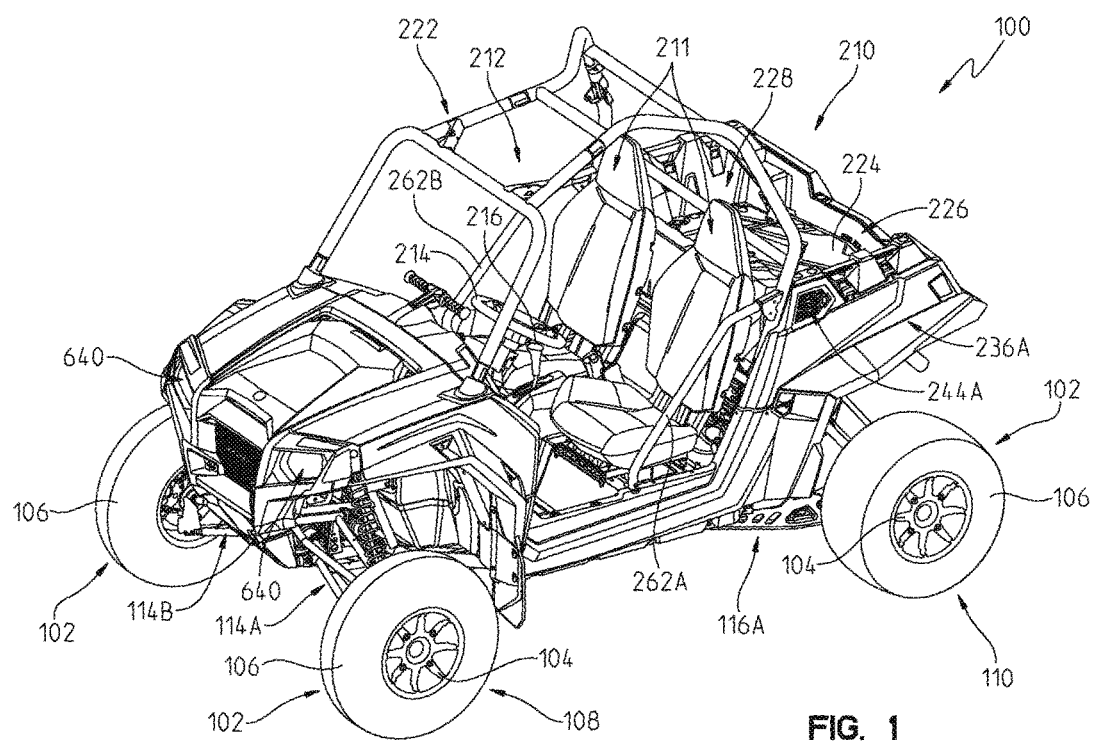
FIG. 1 is a front, perspective view of an exemplary side-by-side vehicle.

Referring to FIG. 1, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

As mentioned herein one or more of ground engaging members 102 are operatively coupled to a power source 130 (see FIG. 9) to power the movement of vehicle 100. Exemplary power sources include internal combustion engines and electric motors. In the illustrated embodiment, the power source 130 is an internal combustion engine.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110. As configured in FIG. 1, vehicle 100 is a four wheel, two axle vehicle.

Figure 6:
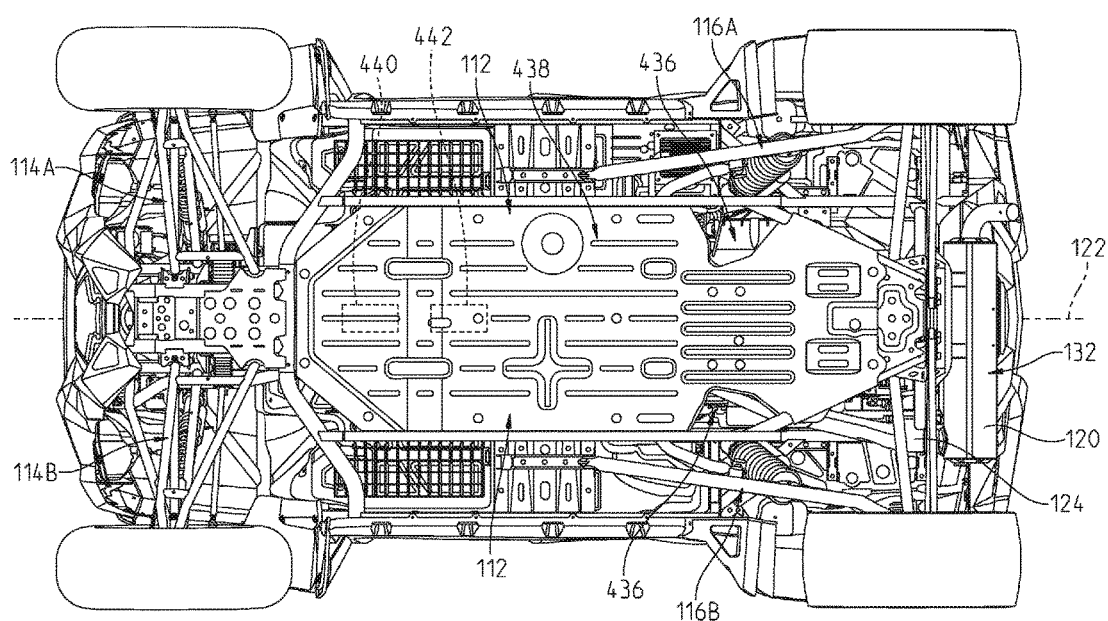
FIG. 6 illustrates a bottom view of the exemplary side-by-side vehicle of FIG. 1.
Figure 32:
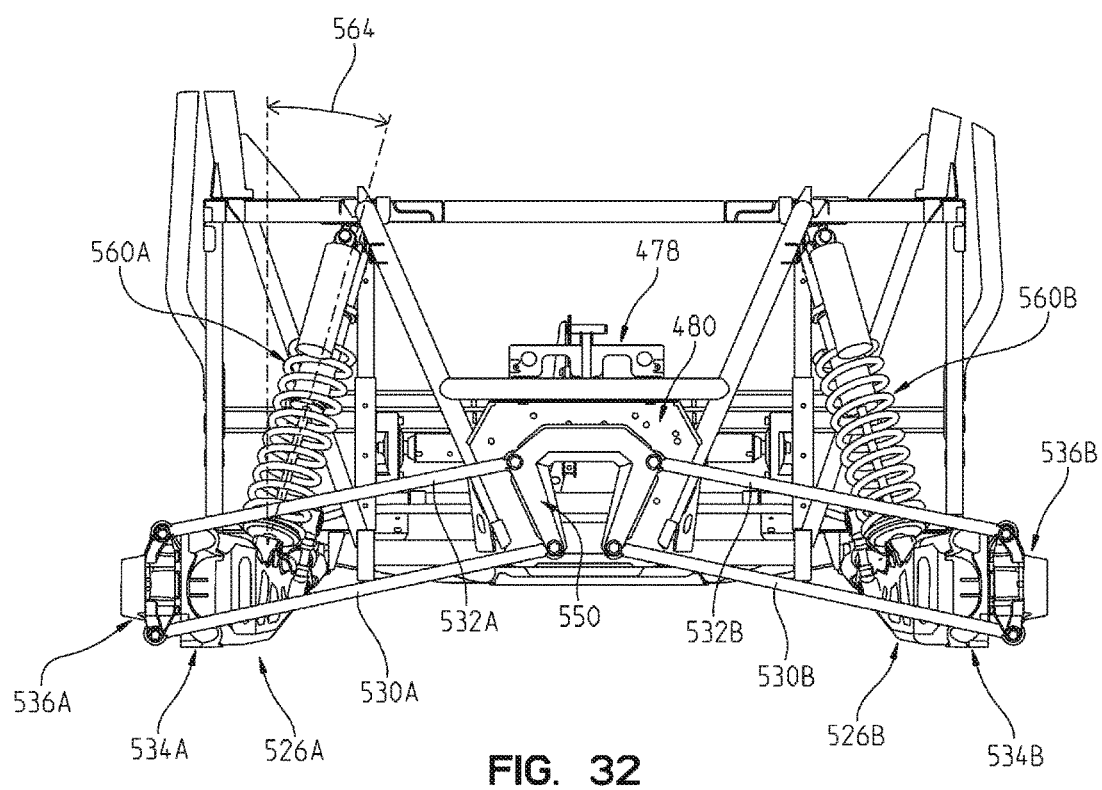
FIG. 32 illustrates a rear view of the rear suspension of the vehicle of FIG. 1.

Referring to FIG. 6, the wheels 104 of front axle 108 are coupled to a frame 112 of vehicle 100 through front independent suspensions 114. Front independent suspensions 114 in the illustrated embodiment are double A-arm suspensions. Other types of suspensions systems may be used for front independent suspensions 114. The wheels 104 of rear axle 110 are couple to frame 112 of vehicle 100 through rear independent suspensions 116. Referring to FIG. 32, rear independent suspensions 116 in the illustrated embodiment include radius arms 526 and control arms 530, 532. Other types of suspensions systems may be used for rear independent suspensions 116. In one embodiment, both front suspensions 114 and rear suspensions 116 provide about 14 inches of suspension travel. In one embodiment, both front suspensions 114 and rear suspensions 116 provide up to about 14 inches of suspension travel.

Figure 9:
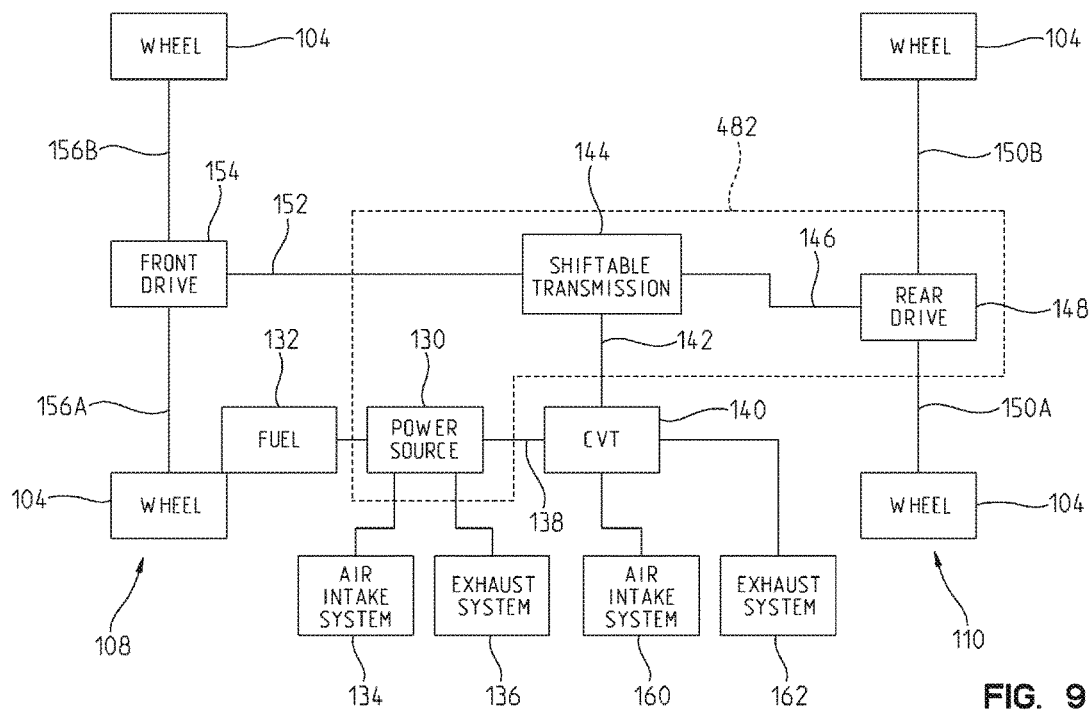
FIG. 9 illustrates a representative view of a drive train of the exemplary side-by-side vehicle of FIG. 1.

Referring to FIG. 9, an internal combustion power source 130 is represented. Power source 130 receives fuel from a fuel source 132 and ambient air from an air intake system 134. Exhaust is expelled from power source 130 through an exhaust system 136. An output shaft 138 of power source 130 is coupled to a drive member of a CVT unit 140. A driven member of the CVT unit 140 is operatively coupled to the drive member of the CVT unit 140 through a drive belt. CVT unit 140 receives ambient air through an air intake system 160 and expels air from an interior of CVT unit 140 through an exhaust system 162. The driven member is coupled to an output shaft 142 which is operatively coupled to an input of a shiftable transmission 144.

A first output shaft 146 of shiftable transmission 144 is coupled to a rear drive unit 148. Rear drive unit 148 is coupled to corresponding wheels 104 through half shafts 150. Rear drive unit 148 may be a differential. A second output shaft 152 of shiftable transmission 144 is coupled to a front drive unit 154. Front drive unit 154 is coupled to corresponding wheels 104 through half shafts 156. Front drive unit 154 may be a differential.

Various configurations of rear drive unit 148 and front drive unit 154 are contemplated. Regarding rear drive unit 148, in one embodiment rear drive unit 148 is a locked differential wherein power is provided to both of the wheels of axle 110 through output shafts 150. In one embodiment, rear drive unit 148 is a lockable/unlockable differential relative to output shafts 150. When rear drive unit 148 is in a locked configuration power is provided to both wheels of axle 110 through output shafts 150. When rear drive unit 148 is in an unlocked configuration, power is provided to one of the wheels of axle 110, such as the wheel having the less resistance relative to the ground, through output shafts 150. Regarding front drive unit 154, in one embodiment front drive unit 154 has a first configuration wherein power is provided to both of the wheels of front axle 108 and a second configuration wherein power is provided to one of the wheels of axle 108, such as the wheel having the less resistance relative to the ground.

In one embodiment, front drive unit 154 includes active descent control ("ADC"). ADC is an all wheel drive system that provides on-demand torque transfer to the front wheels when one of the wheels 104 of rear axle 110 lose traction and that provides engine braking torque to the wheels 104 of front axle 108. Both the on-demand torque transfer and the engine braking feature of front drive unit 154 may be active or inactive. In the case of the on-demand torque transfer, when active, power is provided to both of the wheels of front axle 108 and, when inactive, power is provided to one of the wheels of front axle 108. In the case of the engine braking, when active, engine braking is provided to the wheels of front axle 108 and, when inactive, engine braking is not provided to the wheels of front axle 108. Exemplary front drive units are disclosed in U.S. patent application Ser. No. 12/816,052, filed Jun. 15, 2010, titled ELECTRIC VEHICLE, U.S. Pat. No. 5,036,939, and U.S. Pat. RE38,012E, the disclosures of which are expressly incorporated herein by reference.

Figure 10:
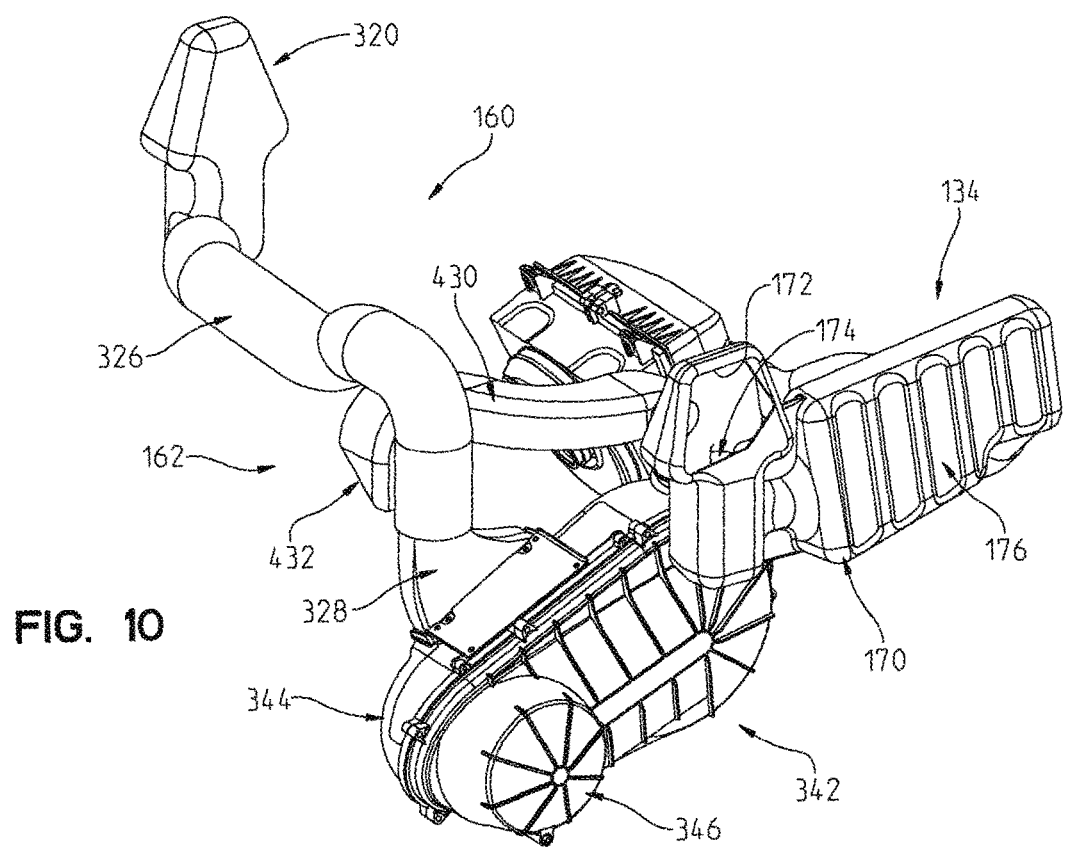
FIG. 10 illustrates a left, perspective view of an air handling system of a power source of the exemplary side-by-side vehicle of FIG. 1 and an air handling system of a CVT unit of the exemplary side-by-side vehicle of FIG. 1.

Referring to FIG. 10, an exemplary embodiment of air intake system 134, air intake system 160, and exhaust system 162 is shown. Air intake system 134, in the illustrated embodiment, includes an air inlet housing 170 having an air inlet 172. In the illustrated embodiment, air inlet housing 170 includes a single air inlet 172. In one embodiment, air inlet housing 170 includes multiple air inlets. Ambient air enters an interior 174 of air inlet housing 170 through air inlet 172. The air travels into a resonator portion 176 of air inlet housing 170. In the illustrated embodiment, resonator portion 176 is a portion of air inlet housing 170. In one embodiment, resonator portion 176 is a separate component which is coupled to air inlet housing 170. Resonator portion 176 acts to dampen noise emanating from power source 130 to provide a quieter vehicle 100 during operation. The air exits resonator portion 176 and passes through a fluid conduit 178 to an airbox 180 of vehicle 100. Fluid conduit 178 is coupled to a cylindrical portion 182 (see FIG. 12) of airbox 180.

Figure 2:
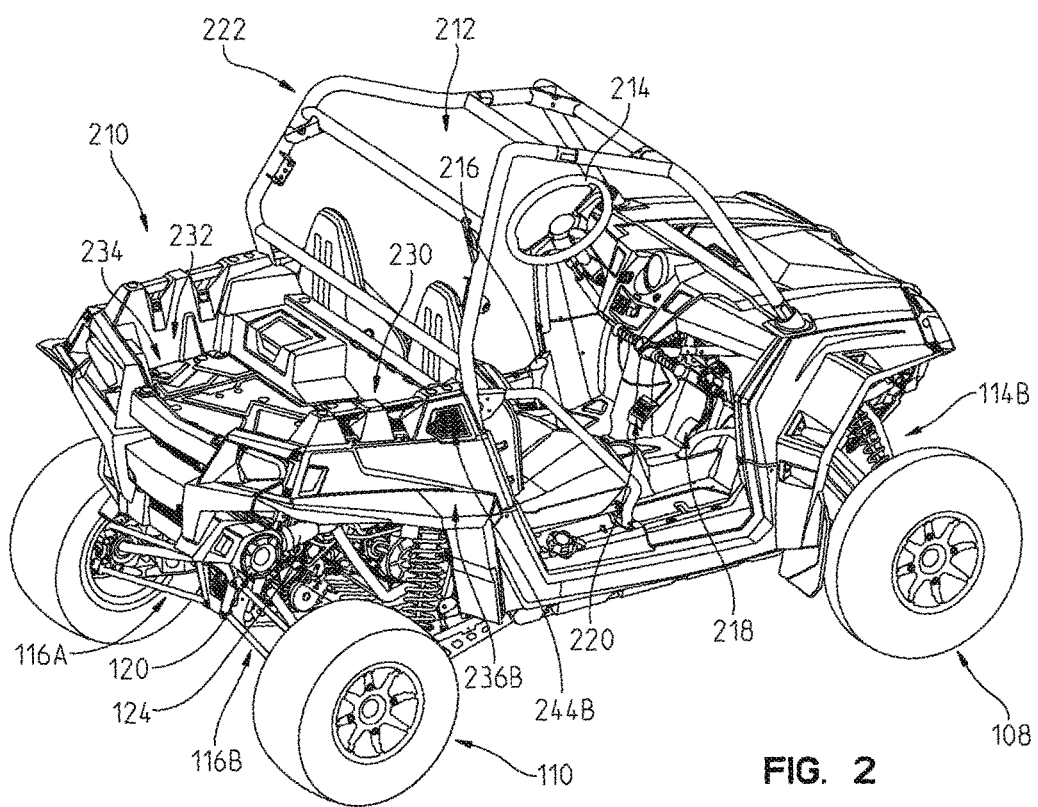
FIG. 2 is a rear, perspective view of an exemplary side-by-side vehicle.
Figure 3:
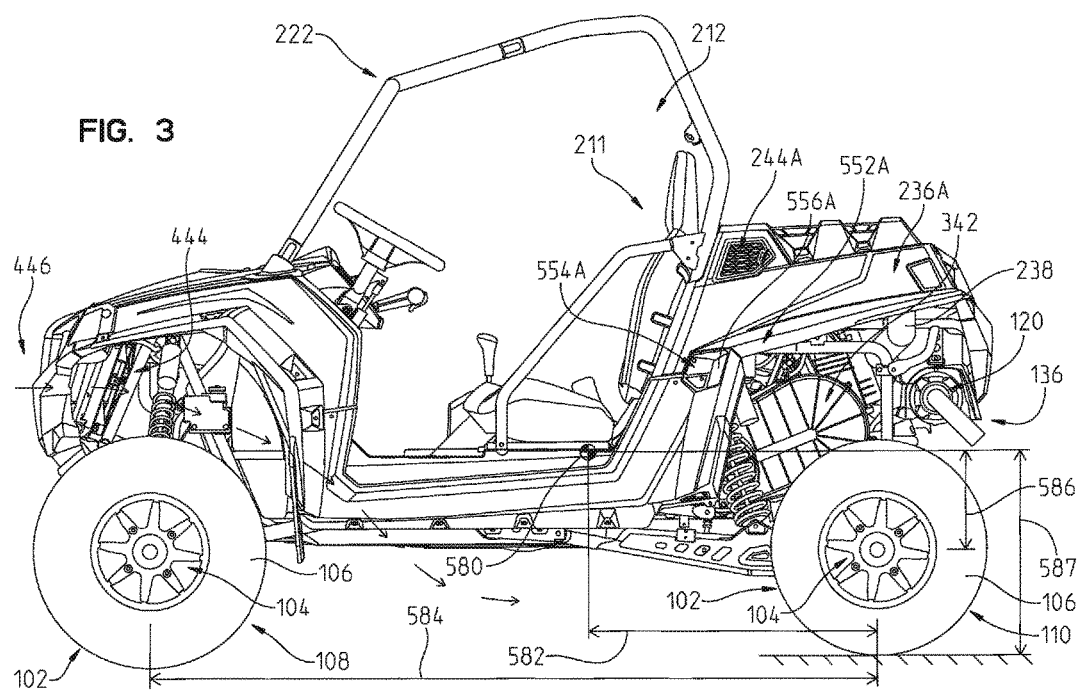
FIG. 3 illustrates a left side view of the exemplary side-by-side vehicle of FIG. 1.
Figure 13:
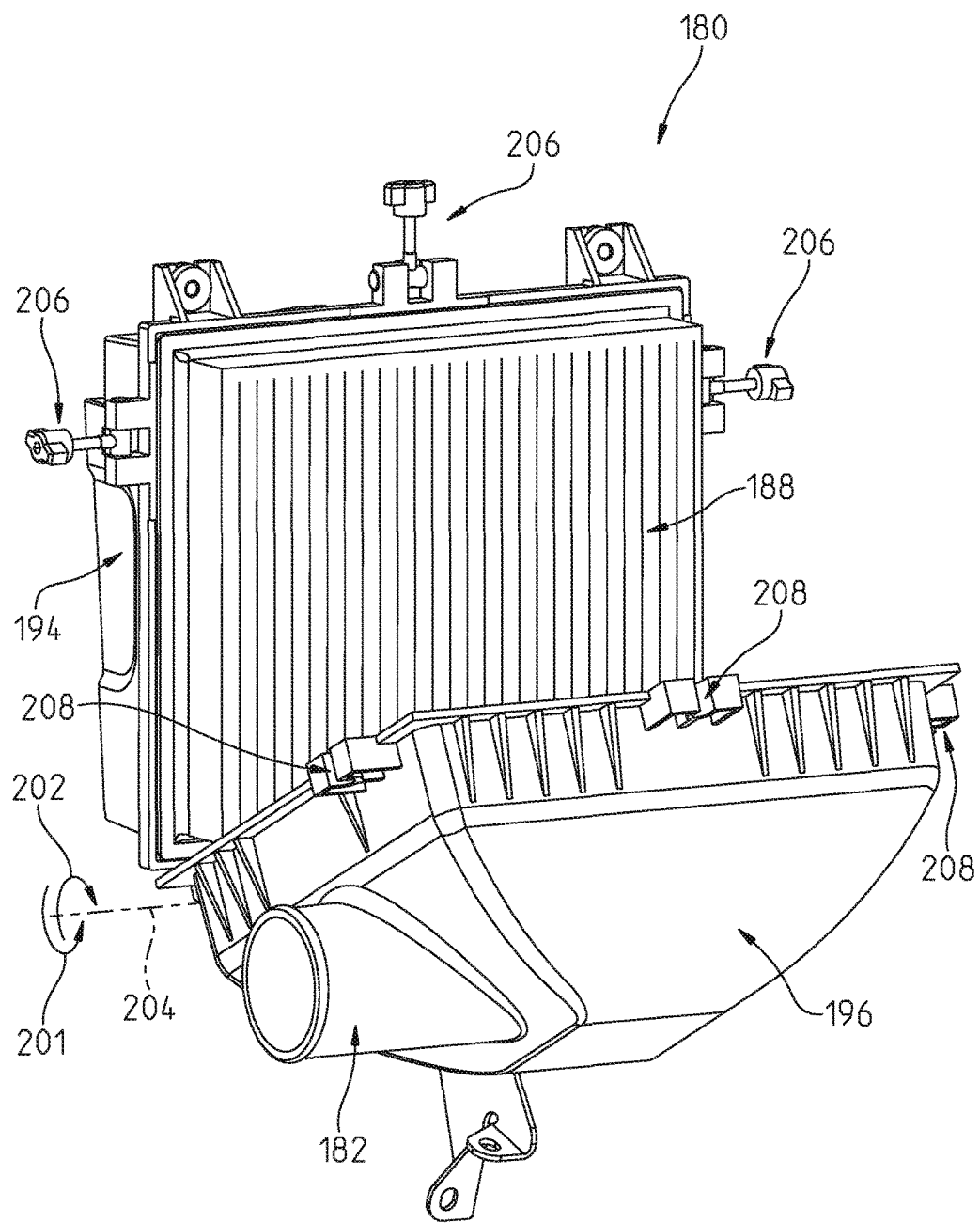
FIG. 13 illustrates the airbox of FIG. 12 with a cover of the airbox rotated relative to a base portion of the air box to provide access to a filter of the airbox.
Figure 14:
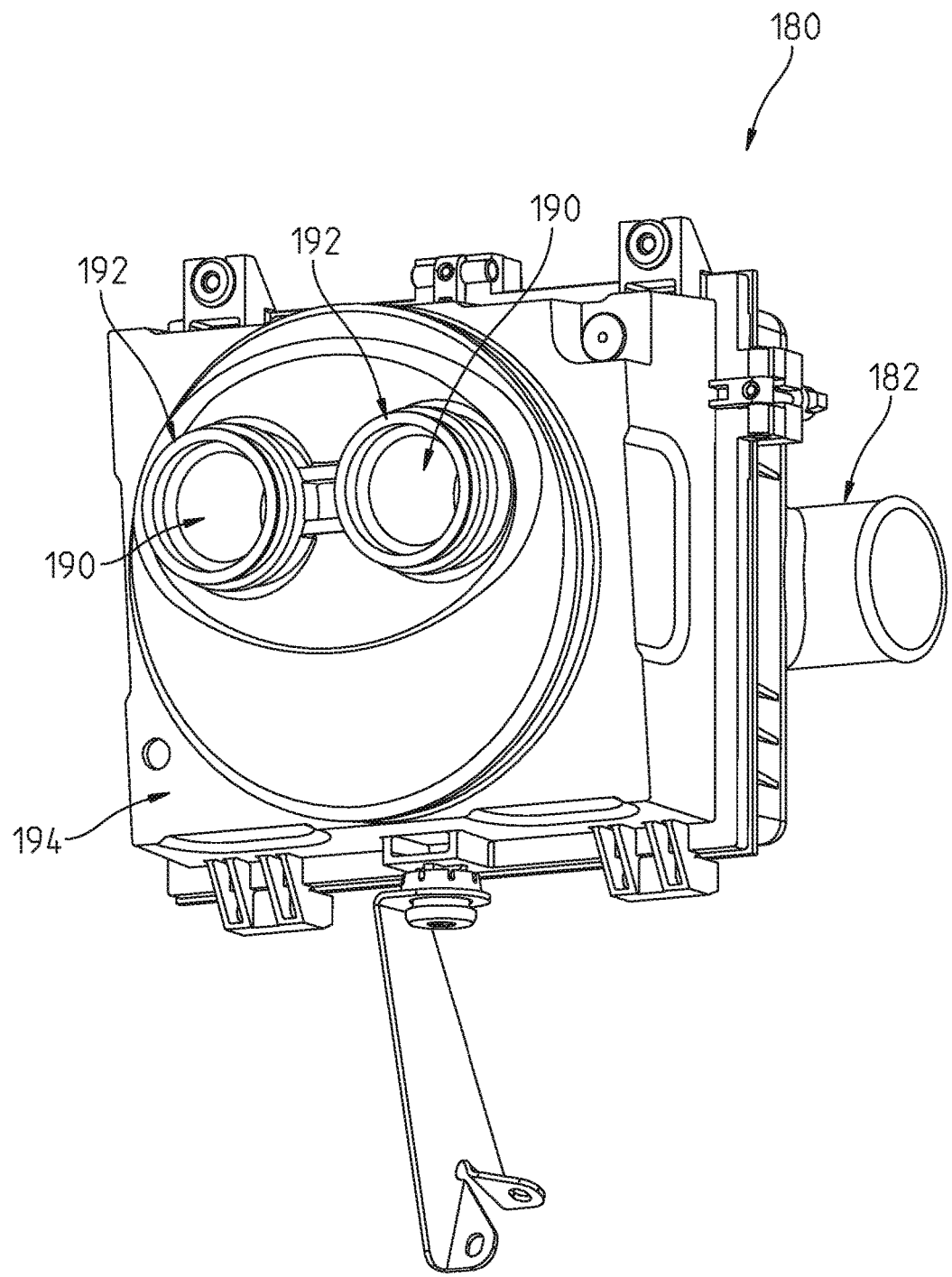
FIG. 14 illustrates a front, perspective view of the airbox of the air handling system of a power source of FIG. 10.

The air enters an interior 184 of airbox 180. Referring to FIG. 13, a filter 188 is positioned in interior 184 of airbox 180. Once the air passes through filter 188 it exits through air outlets 190 provided in boots 192 (see FIG. 14) on the rear of airbox 180. Boots 192 are coupled to the air intakes of power source 130. Power source 130 uses the air in the combustion of fuel provided by fuel source 132. The exhaust produced in the combustion process is expelled from power source 130 through exhaust system 136. Referring to FIG. 3, exhaust system 136 includes a muffler 120 coupled to power source 130 through a fluid conduit 124 (see FIG. 2). Muffler 120 is supported by frame 112 and positioned rearward of rear axle 110. Muffler 120 is positioned transverse to a vertical centerline plane 122 of vehicle 100 as shown in FIG. 6. A majority of muffler 120 is positioned rearward of frame 112. Further, muffler 120 is positioned forward of a rear extent of the tires 106 of rear axle 110 and forward of a rear extent of vehicle 100.

Figure 12:
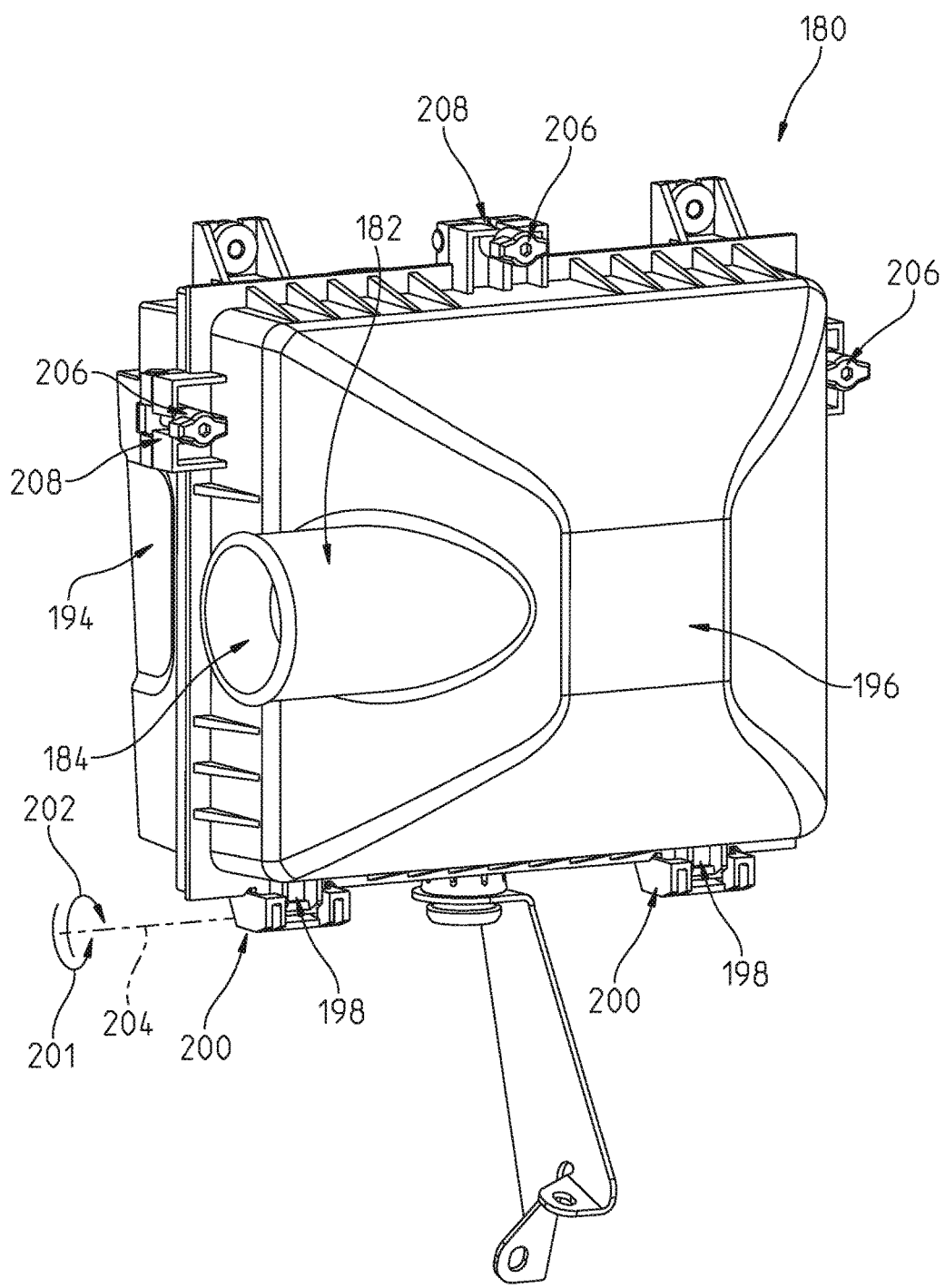
FIG. 12 illustrates a rear, perspective view of an airbox of the air handling system of a power source of FIG. 10.

Returning to FIG. 13, airbox 180 includes a base portion 194 and a front cover portion 196. Base portion 194 and front cover portion 196 cooperate to hold filter 188 in place. Referring to FIG. 12, a lower portion of base portion 194 and a lower portion of front cover portion 196 include hinge members 198 and hinge members 200, respectively. Front cover portion 196 is rotatable in direction 201 and direction 202 about axis 204 to close and open airbox 180, respectively. Referring to FIG. 13, base portion 194 includes three couplers 206 which engage portions 208 of front cover portion 196 to retain front cover portion 196 and keep airbox 180 in a closed state. In the illustrated embodiment, couplers 206 are swing nuts and portions 208 are recesses. The shafts of the swing nuts are received in the recesses of portions 208 and the swing nuts are tightened to secure front cover portion 196 relative to base portion 194.

When couplers 206 are loosened front cover portion 196 may be rotated in direction 202 about axis 204 relative to base portion 194 placing airbox 180 in an open state. In the open state filter 188 may be removed from interior 184 of airbox 180 while front cover portion 196 remains coupled to base portion 194.

Returning to FIG. 1, vehicle 100 includes a cargo carrying portion 210. Cargo carrying portion 210 is positioned rearward of an operator area 212. Operator area 212 includes seating 211 and a plurality of operator controls. In the illustrated embodiment, seating 211 includes a pair of bucket seats. In one embodiment, seating 211 is a bench seat. In one embodiment, seating 211 includes multiple rows of seats, either bucket seats or bench seats or a combination thereof. Exemplary operator controls include a steering wheel 214, a gear selector 216, an accelerator pedal 218 (see FIG. 2), and a brake pedal 220 (see FIG. 2). Steering wheel 214 is operatively coupled to the wheels of front axle 108 to control the orientation of the wheels relative to frame 112. Gear selector 216 is operatively coupled to the shiftable transmission 144 to select a gear of the shiftable transmission 144. Exemplary gears include one or more forward gears, one or more reverse gears, and a park setting. Accelerator pedal 218 is operatively coupled to power source 130 to control the speed of vehicle 100. Brake pedal 220 is operatively coupled to brake units associated with one or more of wheels 104 to slow the speed of vehicle 100.

Figure 25:
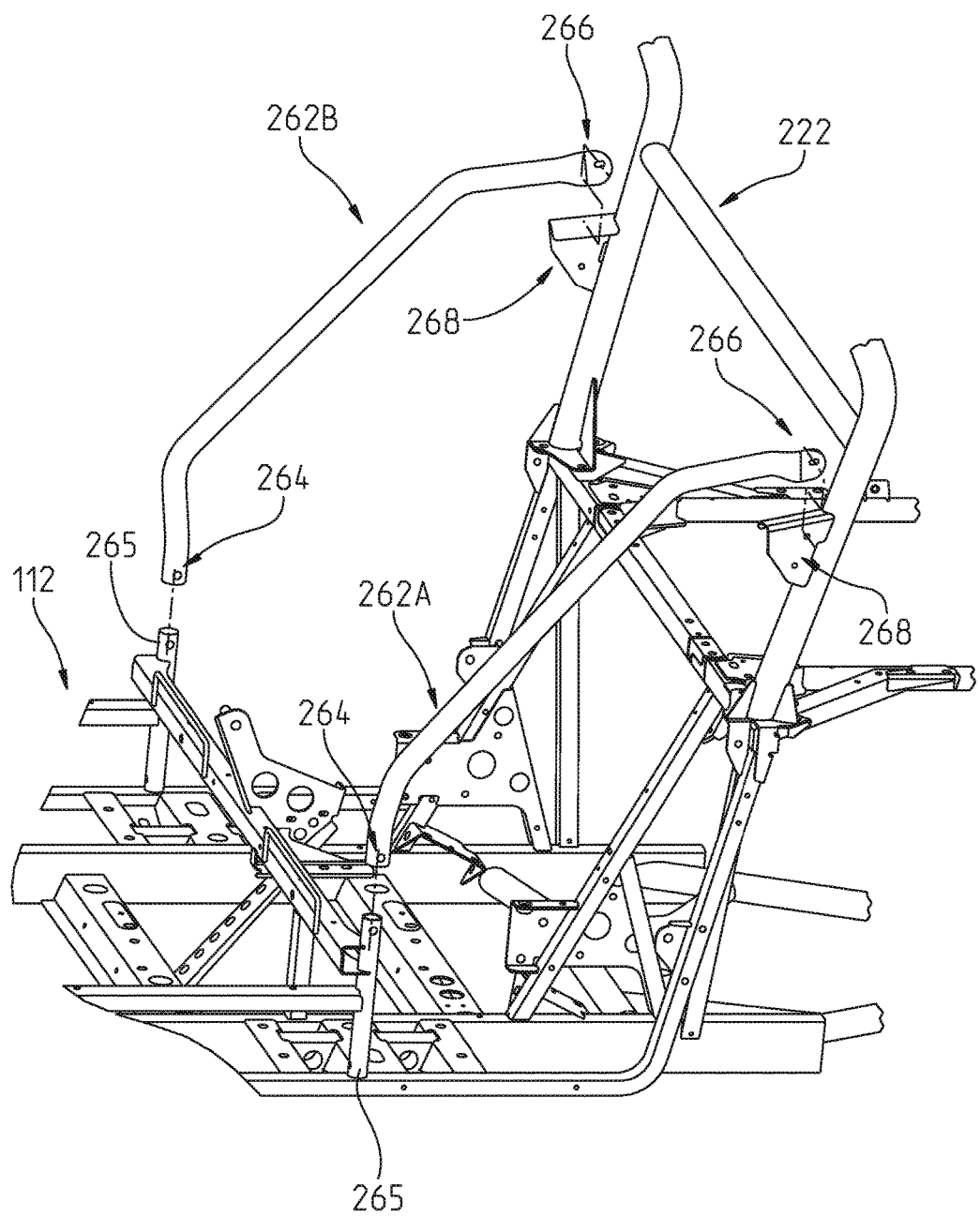
FIG. 25 illustrates side protection members of the vehicle of FIG. 1.

Operator area 212 is protected with a roll cage 222. Referring to FIG. 1, side protection members 262 are provided on both the operator side of vehicle 100 and the passenger side of vehicle 100. In the illustrated embodiment, side protection members 262 are each a unitary tubular member. Referring to FIG. 25, side protection members 262 each include a first end 264 coupled to an upstanding member 265 of frame 112. First end 264 may be coupled with a fastener, such as a bolt. A second end 266 of side protection members 262 is coupled to a bracket 268 secured to roll cage 222. Second end 266 may be secured to bracket 268 through a fastener, such as a bolt.

In the illustrated embodiment, cargo carrying portion 210 includes a cargo bed 234 (see FIG. 5) having a floor 224 and a plurality of upstanding walls. Floor 224 may be flat, contoured, and/or comprised of several sections. The plurality of walls include a rear wall 226 (see FIG. 1), a right side wall 228 (see FIG. 1), a front wall 230 (see FIG. 2), and a left side wall 232 (see FIG. 2). Portions of cargo carrying portion 210 also include mounts 213 (see FIG. 5) which receive an expansion retainer (not shown). The expansion retainers which may couple various accessories to cargo carrying portion 210. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein.

Figure 15:
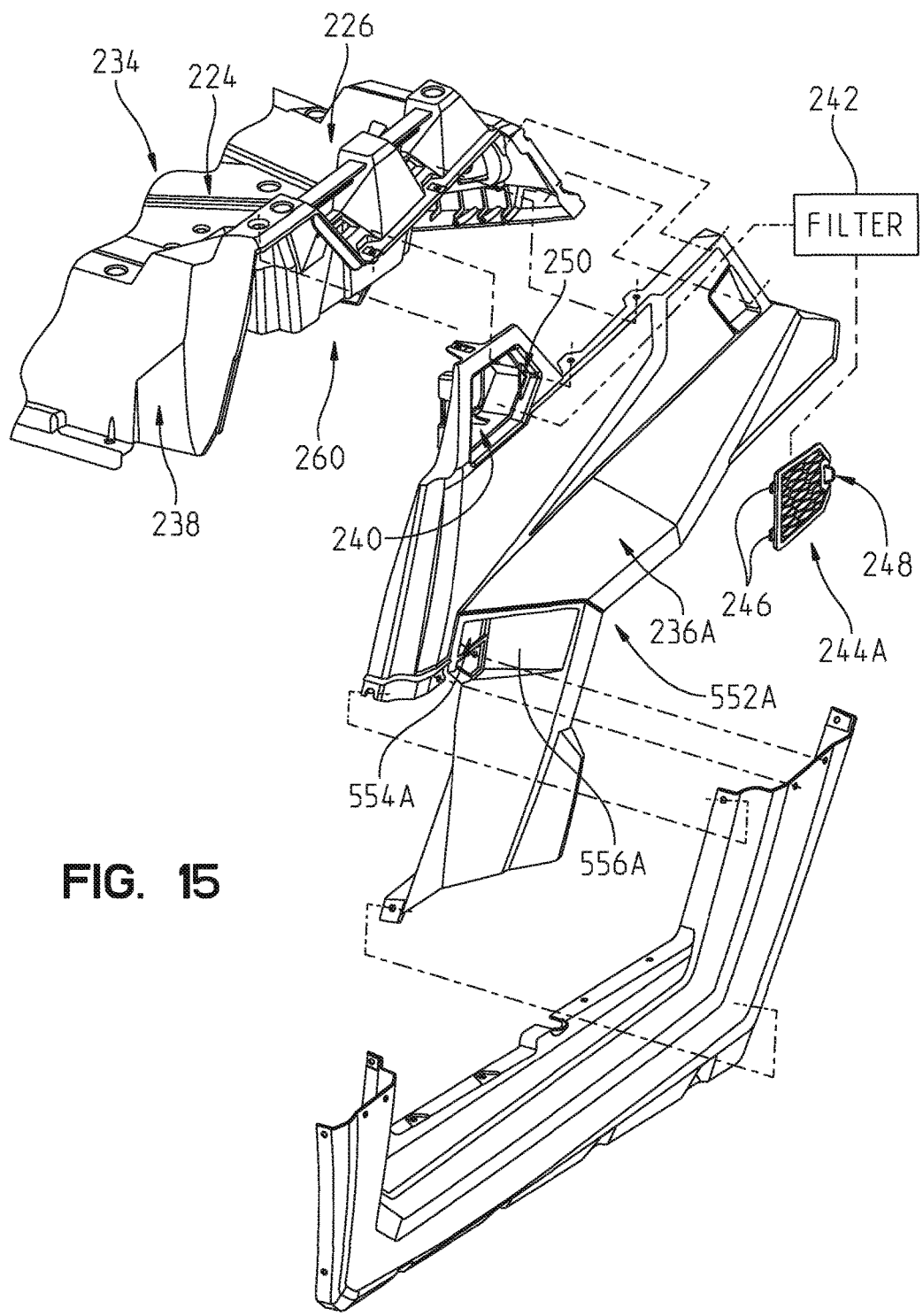
FIGS. 15 and 16 illustrate an exploded view of a portion of a cargo carrying portion of the exemplary side-by-side vehicle of FIG. 1.
Figure 16:
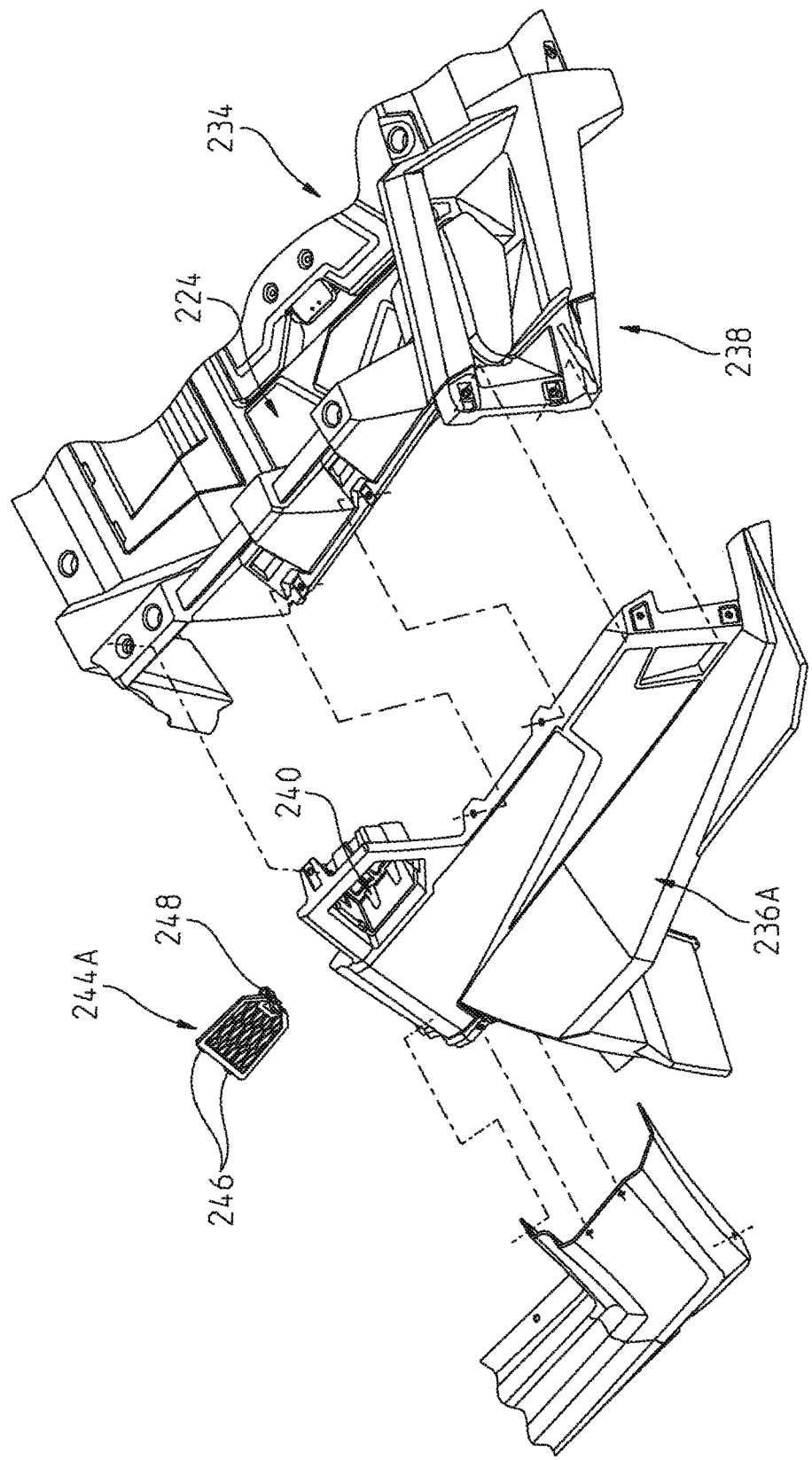
Figure 26:
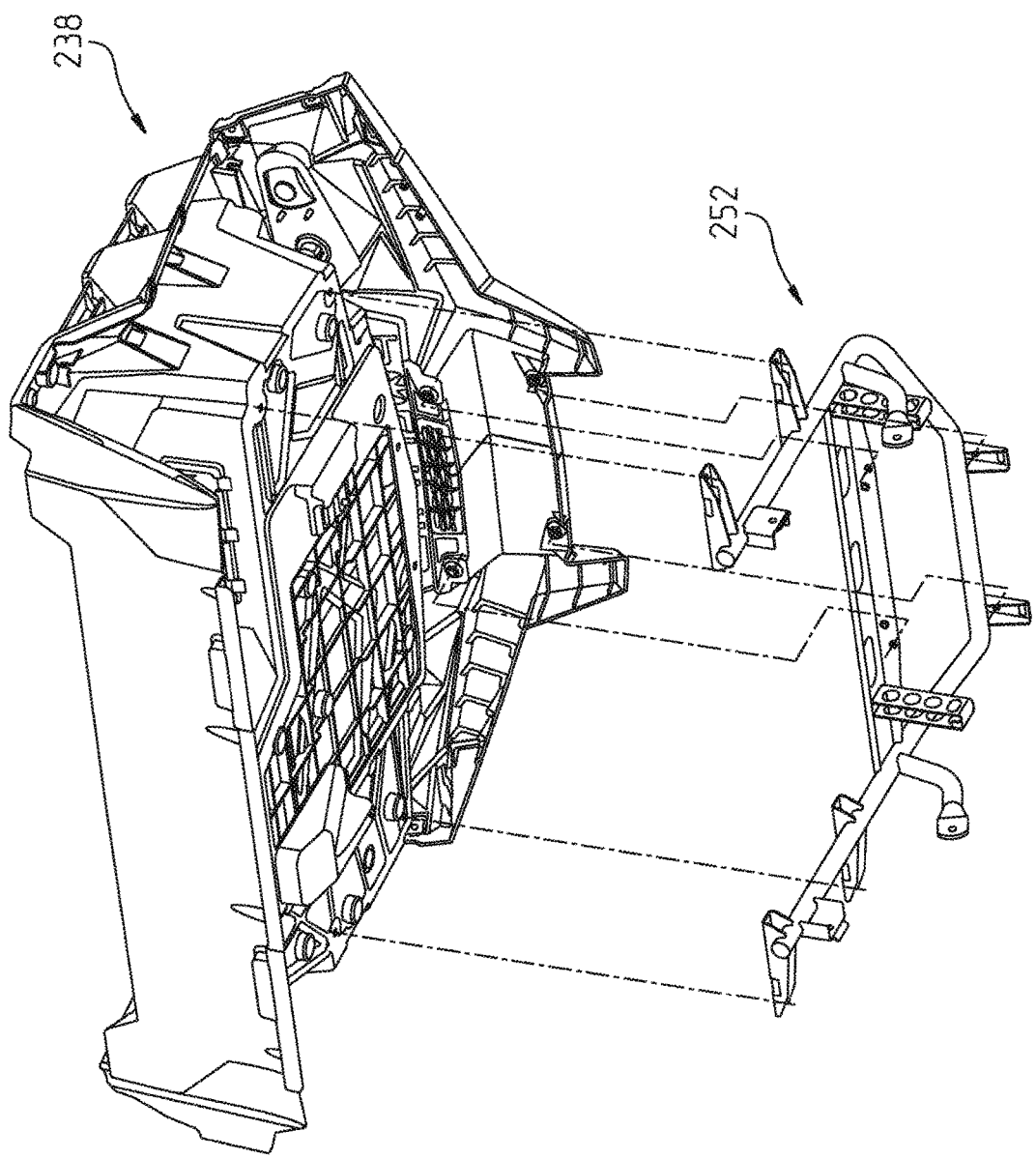
FIG. 26 illustrates the coupling of the cargo carrying base portion frame and the cargo bed of the vehicle of FIG. 1.
Figure 27:
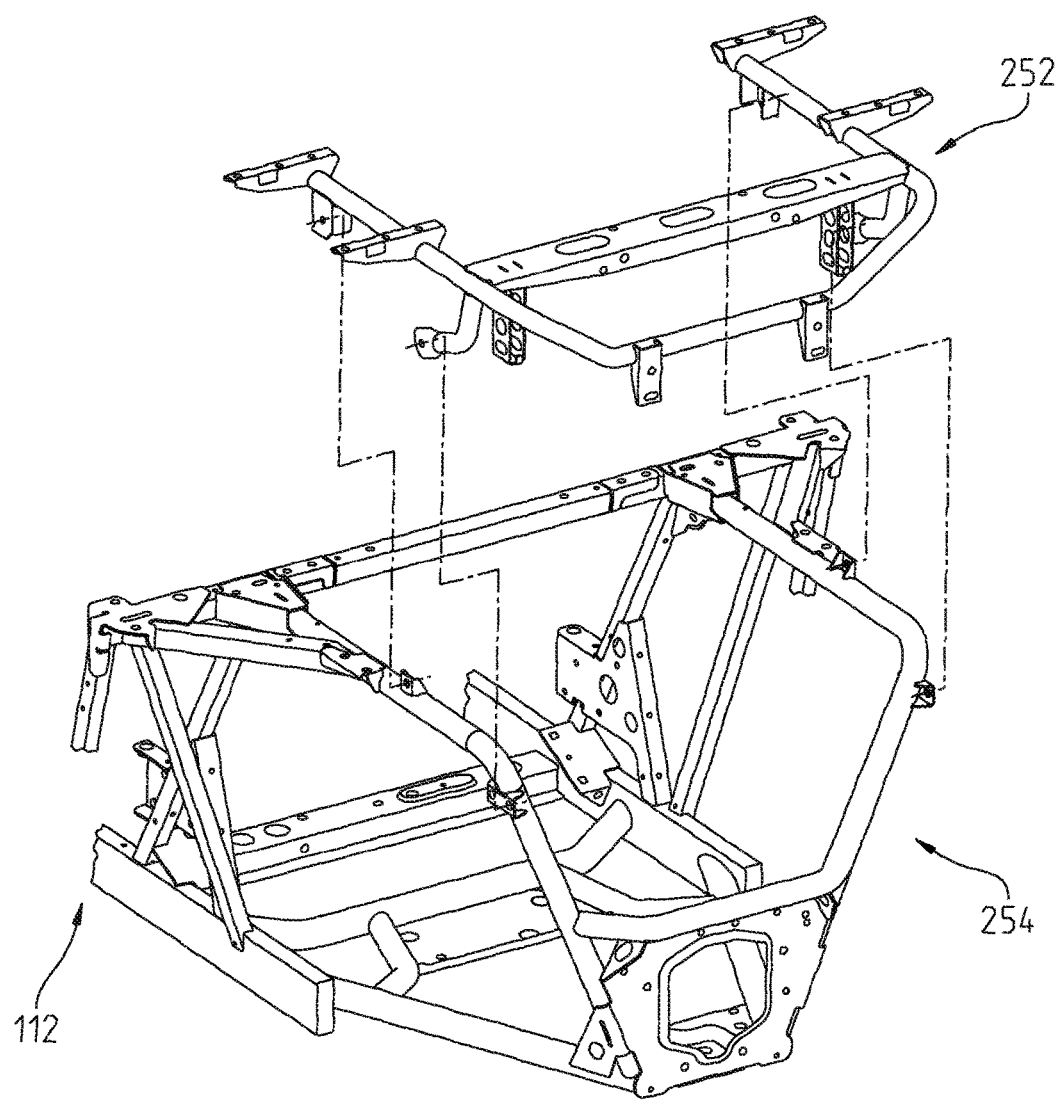
FIG. 27 illustrates the coupling of the cargo carrying base portion frame to the frame of the vehicle of FIG. 1.

Referring to FIG. 15, an exterior side wall of cargo carrying portion 210 is formed by body panel 236 which is coupled to cargo bed body panel 238. Body panel 236 and cargo bed body panel 238, as well as other body panels of vehicle 100, are supported by frame 112. Referring to FIGS. 26 and 27, cargo bed body panel 238 is coupled to a cargo carrying portion base frame 252 through multiple connections. Fasteners may be used to couple cargo bed body panel 238 to cargo carrying portion base frame 252. Exemplary fasteners include bolts, screws, clips, and other suitable devices for securing cargo bed body panel 238 to cargo carrying portion base frame 252. Referring to FIG. 27, cargo carrying portion base frame 252 is coupled to a rear frame portion 254 of frame 112 through multiple connections. Fasteners may be used to couple cargo carrying portion base frame 252 to rear frame portion 254 of frame 112.

Body panel 236 includes a filter housing 240 having a recess therein to receive a filter 242. Filter 242 is held in place in the recess of filter housing 240 with a cover 244. In one embodiment, filter 242 is a foam filter. Cover 244 includes tabs 246 which are received in apertures (not shown) in body panel 236 to hold a first end of cover 244 relative to body panel 236. Cover 244 further includes a latch member 248 which cooperates with a latch plate 250 of body panel 236 to hold a second end of cover 244 relative to body panel 236.

Filter housing 240, filter 242, and cover 244 are part of air intake system 134. Air inlet housing 170 is positioned in the space 260 between body panel 236 and cargo bed body panel 238. Air inlet 172 of air inlet housing 170 is in fluid communication with an interior of filter housing 240. In operation, ambient air passes through openings in cover 244 and into filter housing 240. The air passes through filter 242 and into the interior of air inlet housing 170 through air inlet 172. The air travels through the interior of air inlet housing 170 and through fluid conduit 178 into interior 184 of airbox 180. Once the air passes through filter 188 it flows into the air intake of power source 130.

Referring to FIG. 3, the intake of air intake system 134 through cover 244 is positioned rearward of operator area 212. In the illustrated embodiment, the intake of air intake system 134 is positioned rearward of roll cage 222. In the illustrated embodiment, the intake of air intake system 134 is positioned above a top surface of ground engaging members 102. In the illustrated embodiment, the intake of air intake system 134 is positioned above floor 224 of cargo bed 234.

Figure 17:
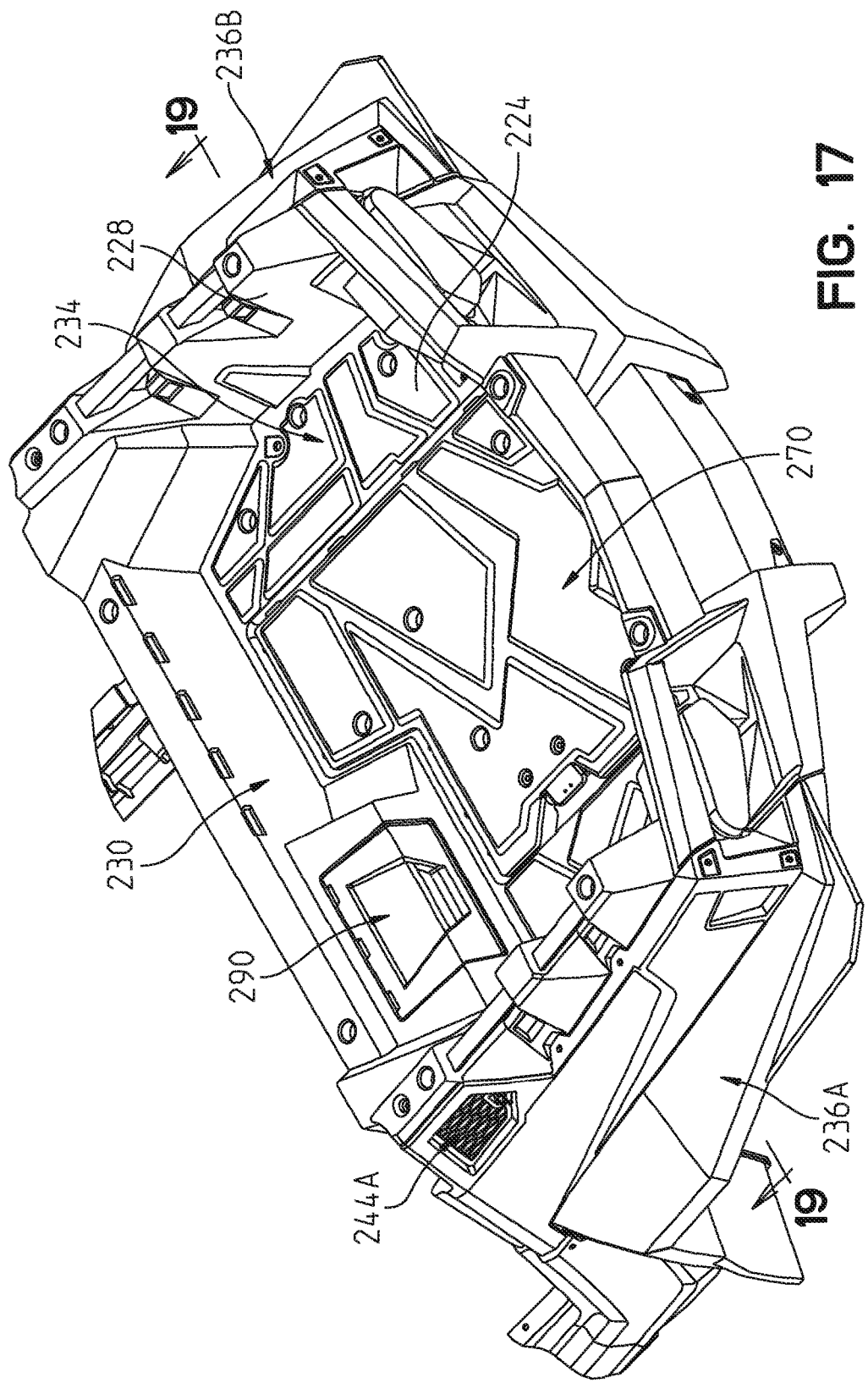
FIG. 17 illustrates a cargo carrying portion of the exemplary side-by-side vehicle of FIG. 1.
Figure 18:
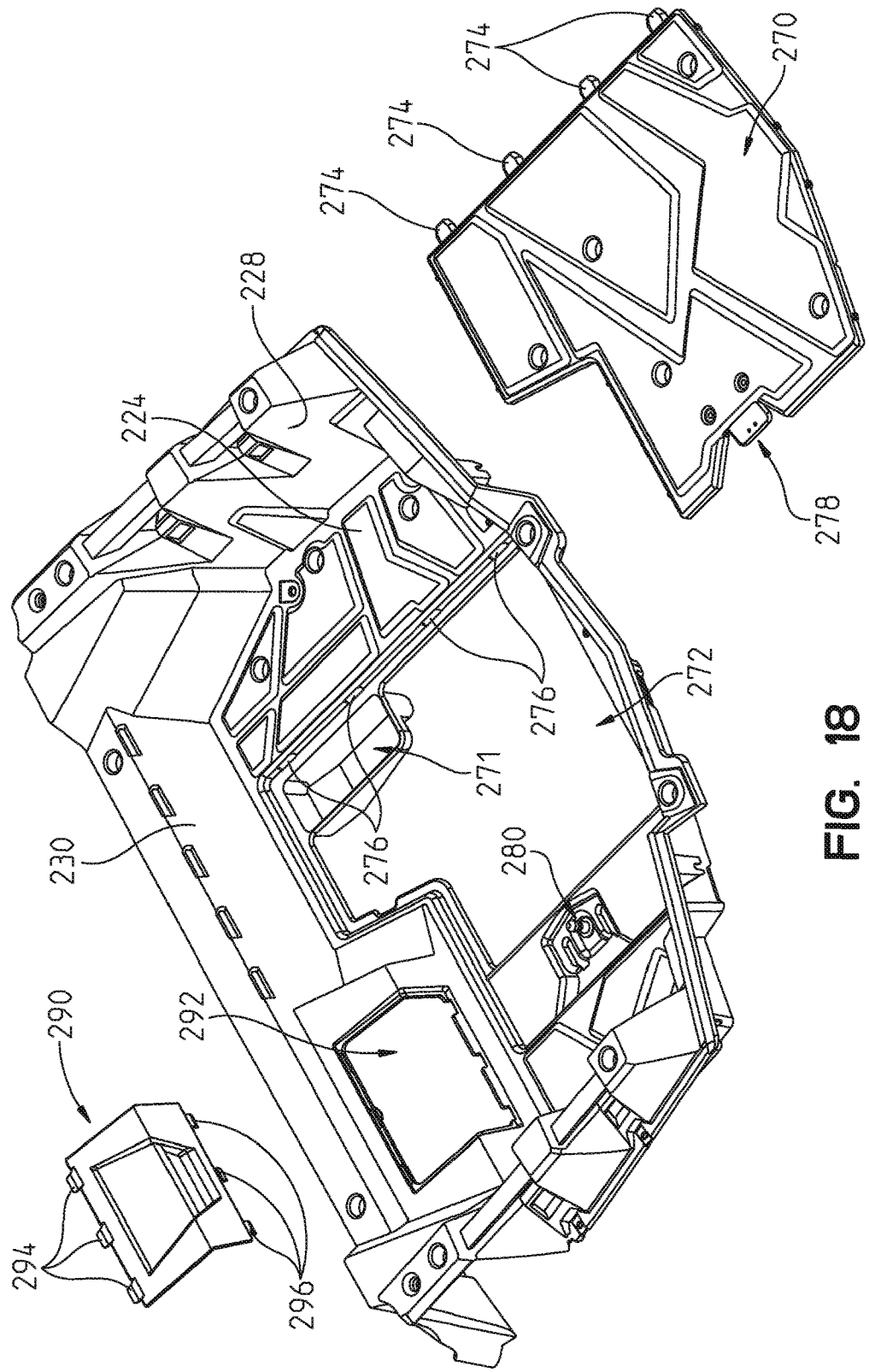
FIG. 18 illustrates the cargo carry portion of FIG. 17 with a plurality of removable covers spaced apart.

Referring to FIG. 17, cargo bed 234 includes a removable cover 270. As shown in FIG. 18, when removable cover 270 is removed a service tray 271 is accessible. Service tray 271 is molded as part of body 238. Tools may be placed in the service tray 271 during servicing of power source 130. The tools in service tray 271 are retained therein when cover 270 is positioned over service tray 271 due to cover 270 generally closing off a top opening in service tray 271. Further, when cover 270 is removed access to a space 272 is provided. In one embodiment, airbox 180 is positioned in space 272. As such, in one embodiment, to remove filter 188 an operator would remove removable cover 270 to access airbox 180 and then loosen couplers 206 to permit front cover portion 196 to rotate in direction 202. An operator may also change the sparkplugs of power source 130 through space 272.

Figure 19:
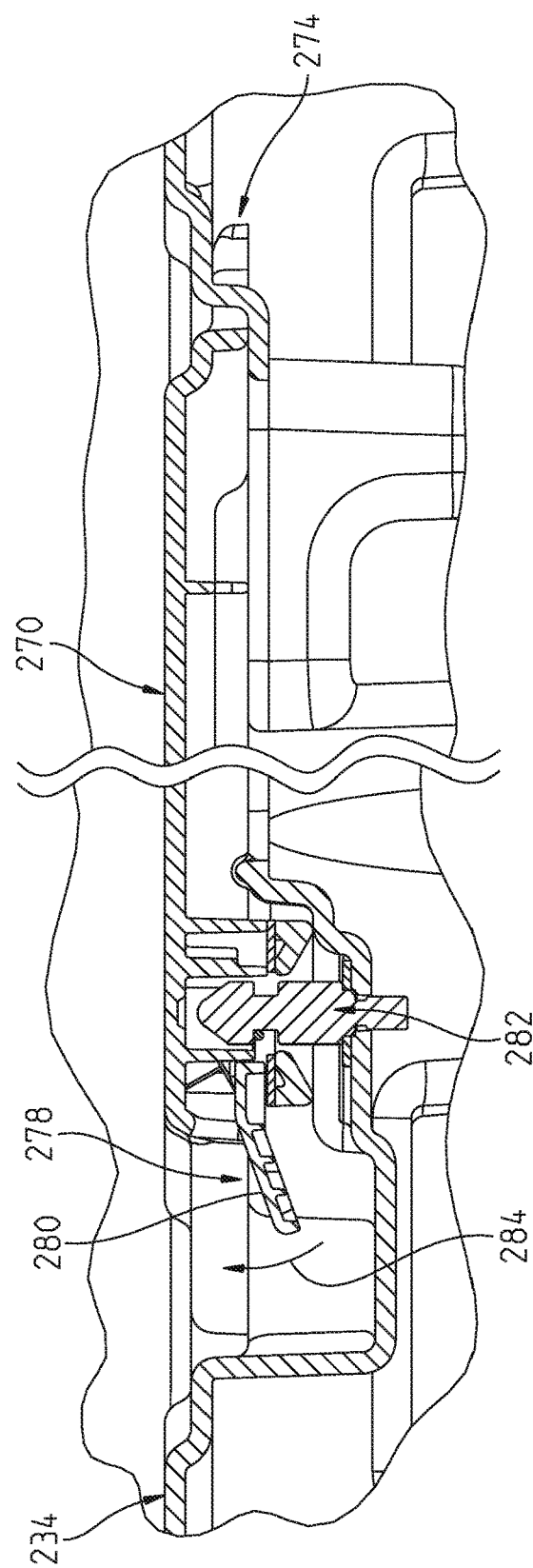
FIG. 19 illustrates a section view along lines 19-19 of FIG. 17.

Removable cover 270 includes a plurality of tabs 274 along a first side of removable cover 270. Tabs 274 are received in openings 276 provided in a recessed portion of floor 224. Tabs 274 and openings 276 cooperate to retain removable cover 270 relative to floor 224. On the opposite side of removable cover 270, a latch mechanism 278 is coupled to removable cover 270. Latch mechanism 278 includes a handle 280 which may be actuated by an operator. As shown in FIG. 19, latch mechanism 278 interacts with a latch pin 282 which is coupled to floor 224 to couple removable cover 270 to floor 224. When an operator rotates handle 280 in a direction 284, latch mechanism 278 releases latch pin 282 and removable cover 270 may be rotated upward in direction 284.

In one embodiment, removable cover 270 may be replaced with an accessory which includes the same tabs and latch placement as cover 270. This permits further customization of the vehicle 100. In one embodiment, an exemplary accessory includes a cooler for storing cold products.

Figure 20:
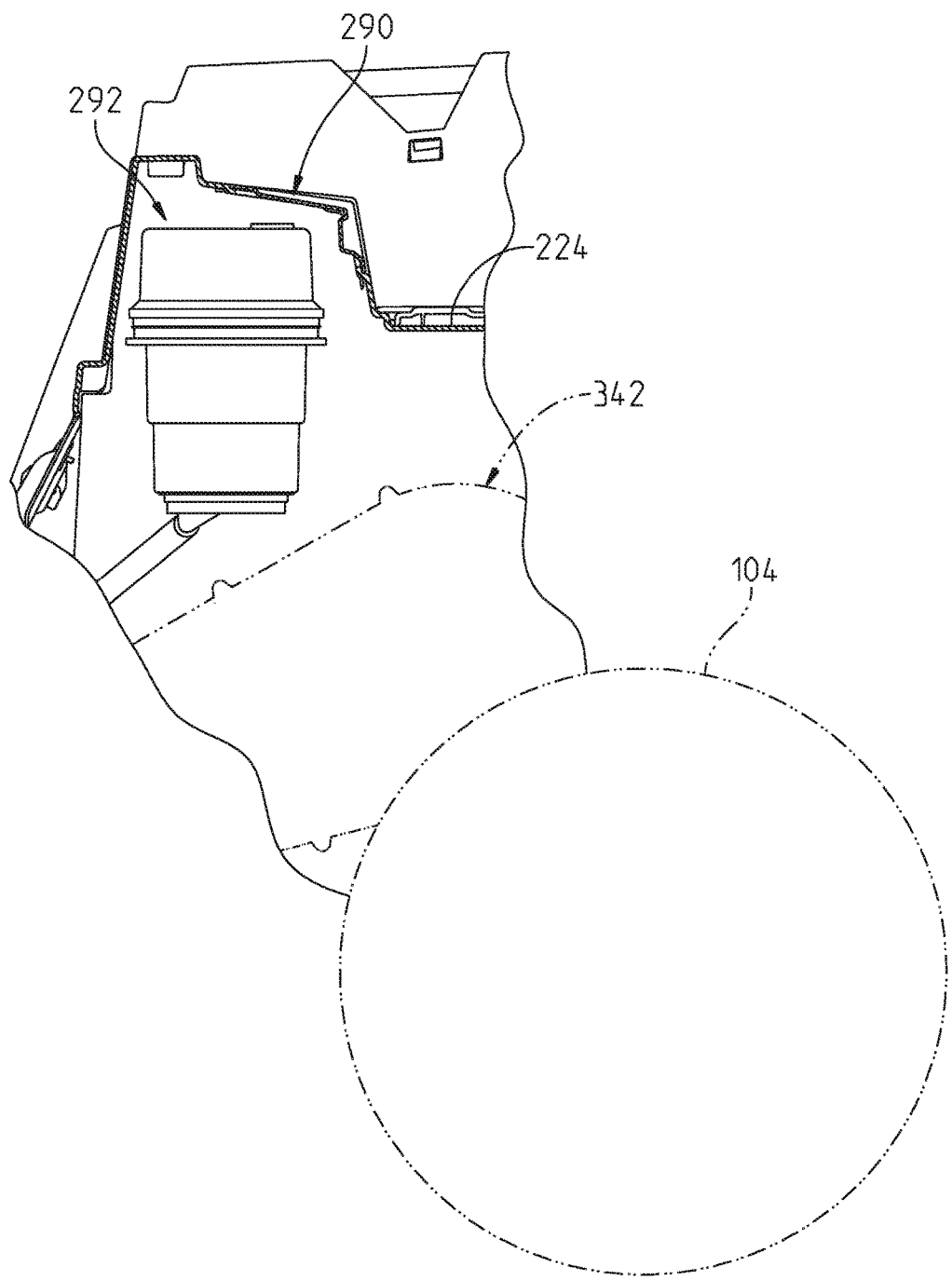
FIG. 20 illustrates a location of an oil reservoir of the exemplary side-by-side vehicle of FIG. 1.

Returning to FIG. 18, cargo bed 234 includes a second removable cover 290. When removable cover 290 is removed access to space 292 is provided. Cover 290 is held in place relative to cargo bed 234 with tabs 294 and tabs 296 which interact with portions of cargo bed 234 to retain removable cover 290. Referring to FIG. 20, an oil reservoir 300 for power source 130 is supported in space 292. Oil reservoir 300 is supported by frame 112 (see FIG. 29). Removable cover 290 serves as a service door for checking the oil level within oil reservoir 300. In one embodiment, a dip stick is provided to check the oil level. In one embodiment, the oil level may be checked by visual inspection.

Figure 41:
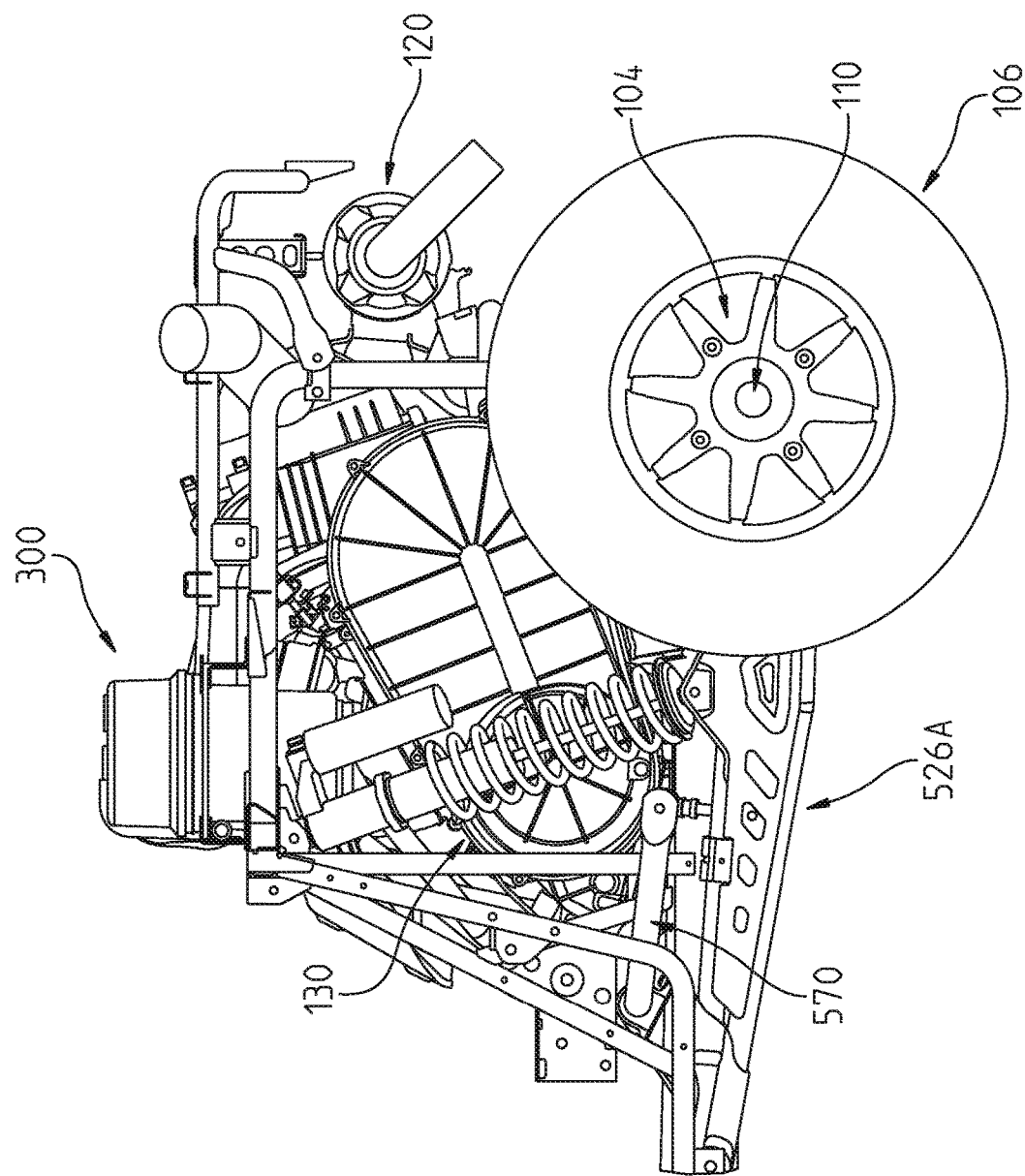
FIG. 41 illustrates a top view of a portion of the vehicle of FIG. 1.
Figure 42:
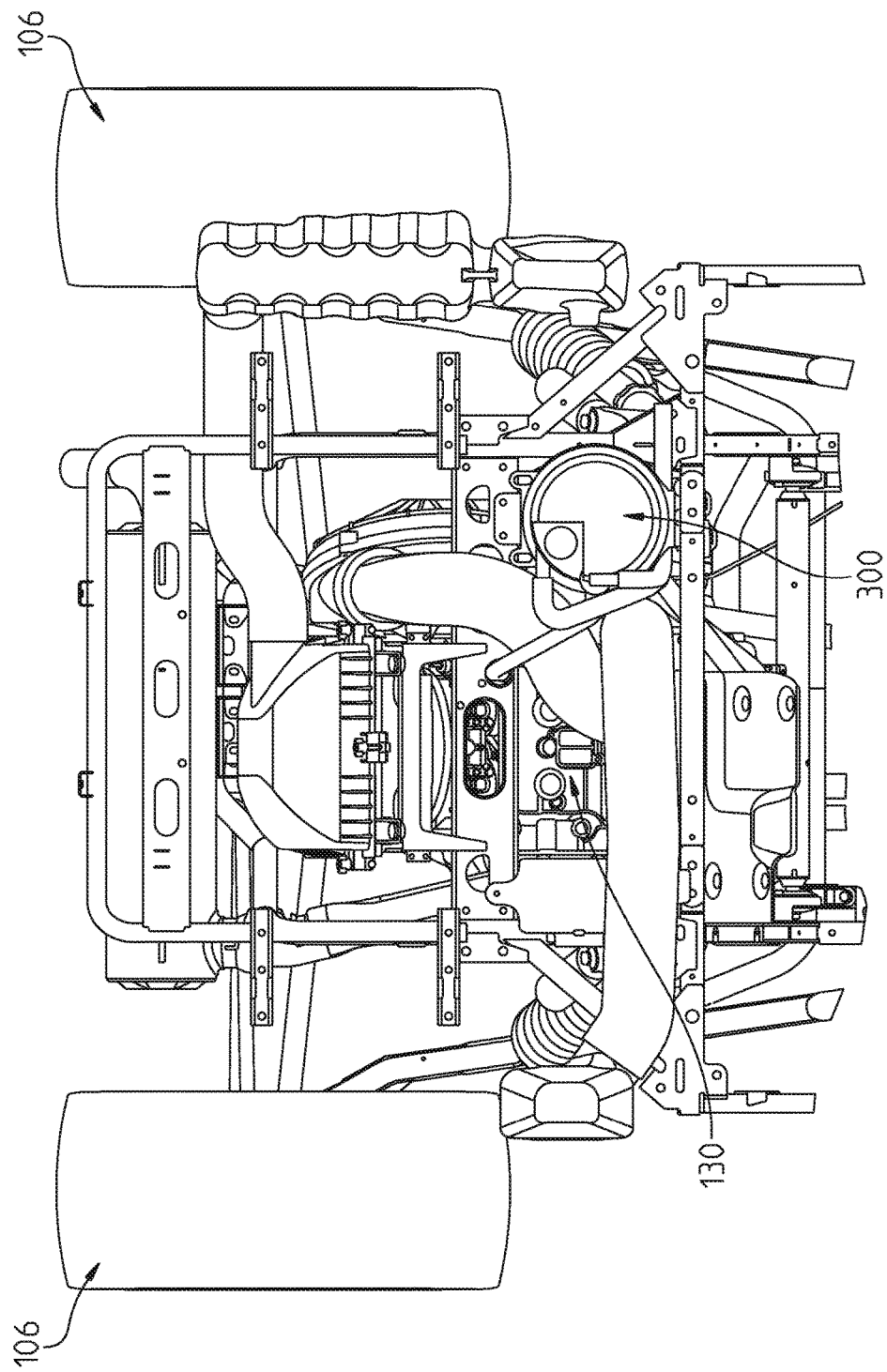
FIG. 42 illustrates a side view of a portion of the vehicle of FIG. 1.
Figure 48:
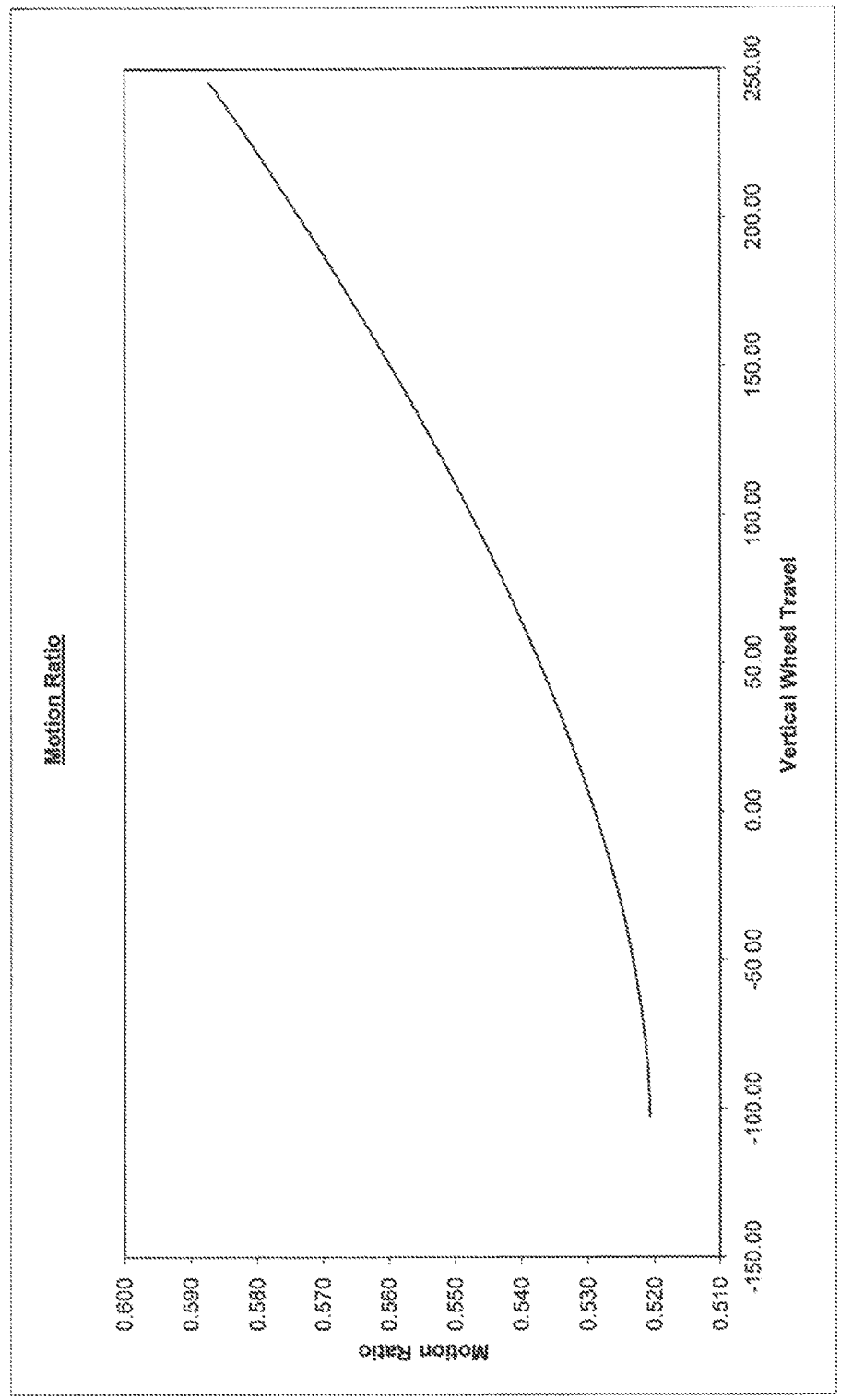

Oil reservoir 300 provides oil to a pump of power source 130. In the illustrated embodiment, power source 130 is a dry sump engine which receives oil from oil reservoir 300. By placing oil reservoir above the pump of power source 130, oil is continued to be provided to the pump of power source 130 when vehicle is on an incline. As shown in FIG. 41, oil reservoir 300 is positioned rearward of a front edge of power source 130 and forward of a trailing edge of power source 130 and generally above power source 130. Referring to FIG. 42, oil reservoir 300 is generally to a driver side of vehicle 100. By keeping oil reservoir 300 closer to power source 130, vehicle 100 has increased performance in cold weather.

Figure 4:
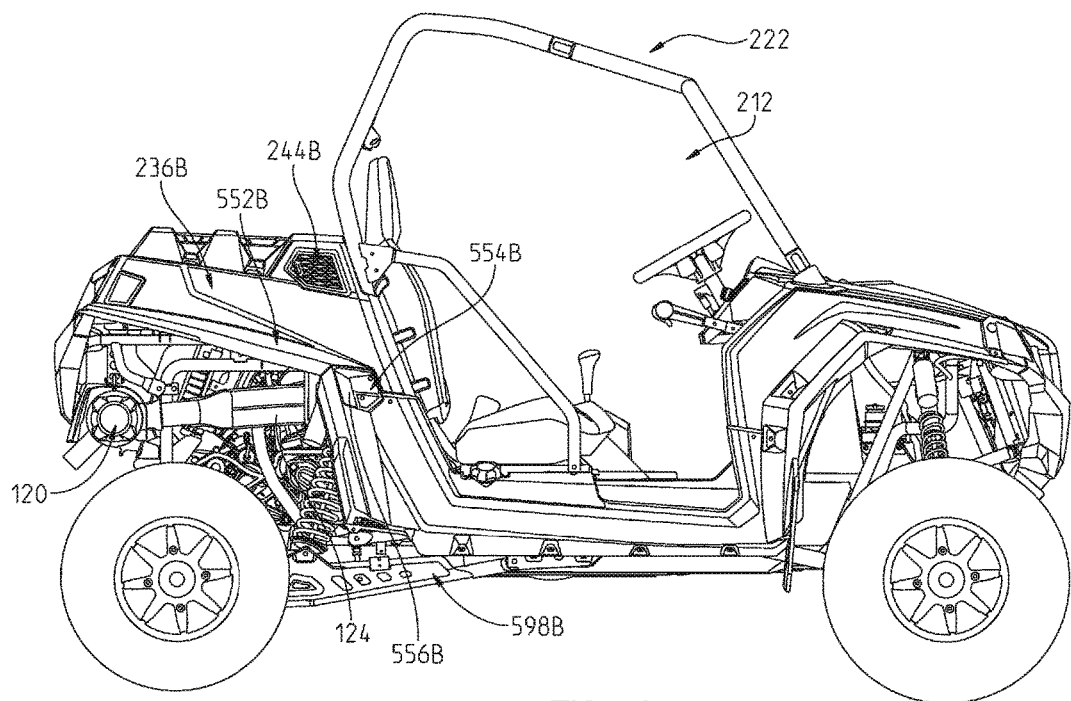
FIG. 4 illustrates a right side view of the exemplary side-by-side vehicle of FIG. 1.
Figure 11:
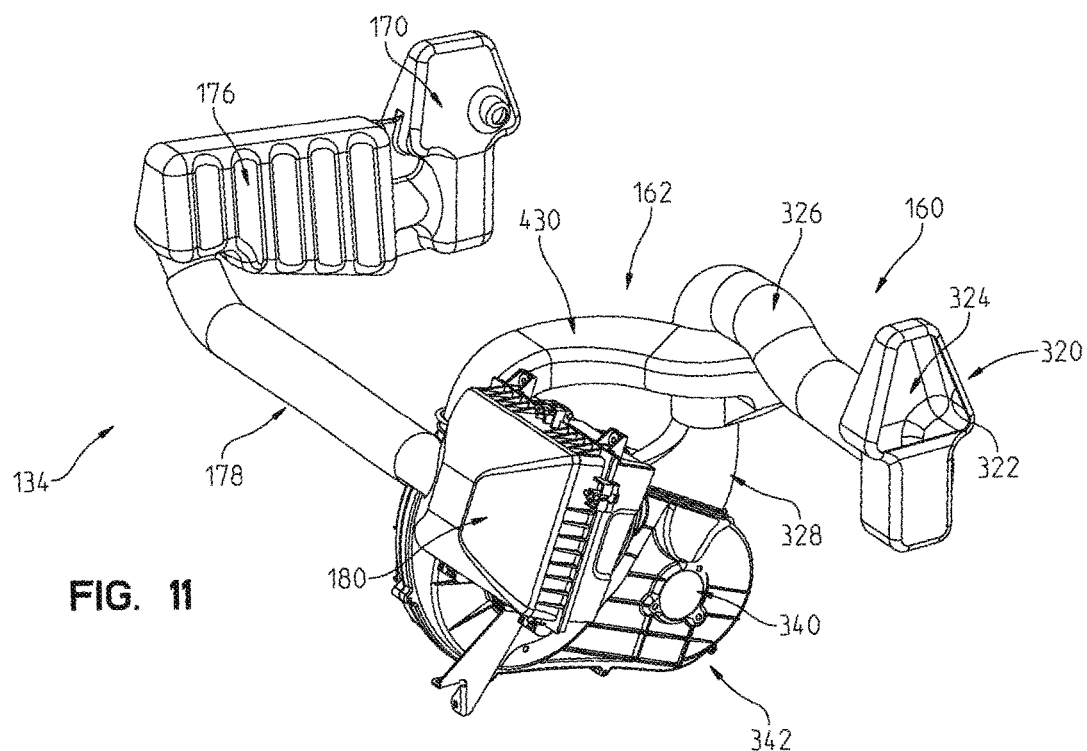
FIG. 11 illustrates a right, perspective view of the air handling system of a power source of FIG. 10 and an air handling system of a CVT unit of FIG. 10.

Returning to FIGS. 10 and 11, air intake system 160 is shown. Air intake system 160 includes an air inlet housing 320 having an air inlet 322. Ambient air is introduced into an interior 324 of air inlet housing 320 through air inlet 322. Air inlet housing 320 receives ambient air which passes through a filter 242 located behind a cover 244B (see FIG. 4) coupled to a body panel 236B (see FIG. 4) of cargo bed 234. The filter 242 is received in a filter housing of body panel 236B which is generally a mirror image of filter housing 240. Cover 244B is coupled to body panel 236B and removable from body panel 236B in the same manner as cover 244A is relative to body panel 236A.

Figure 22:
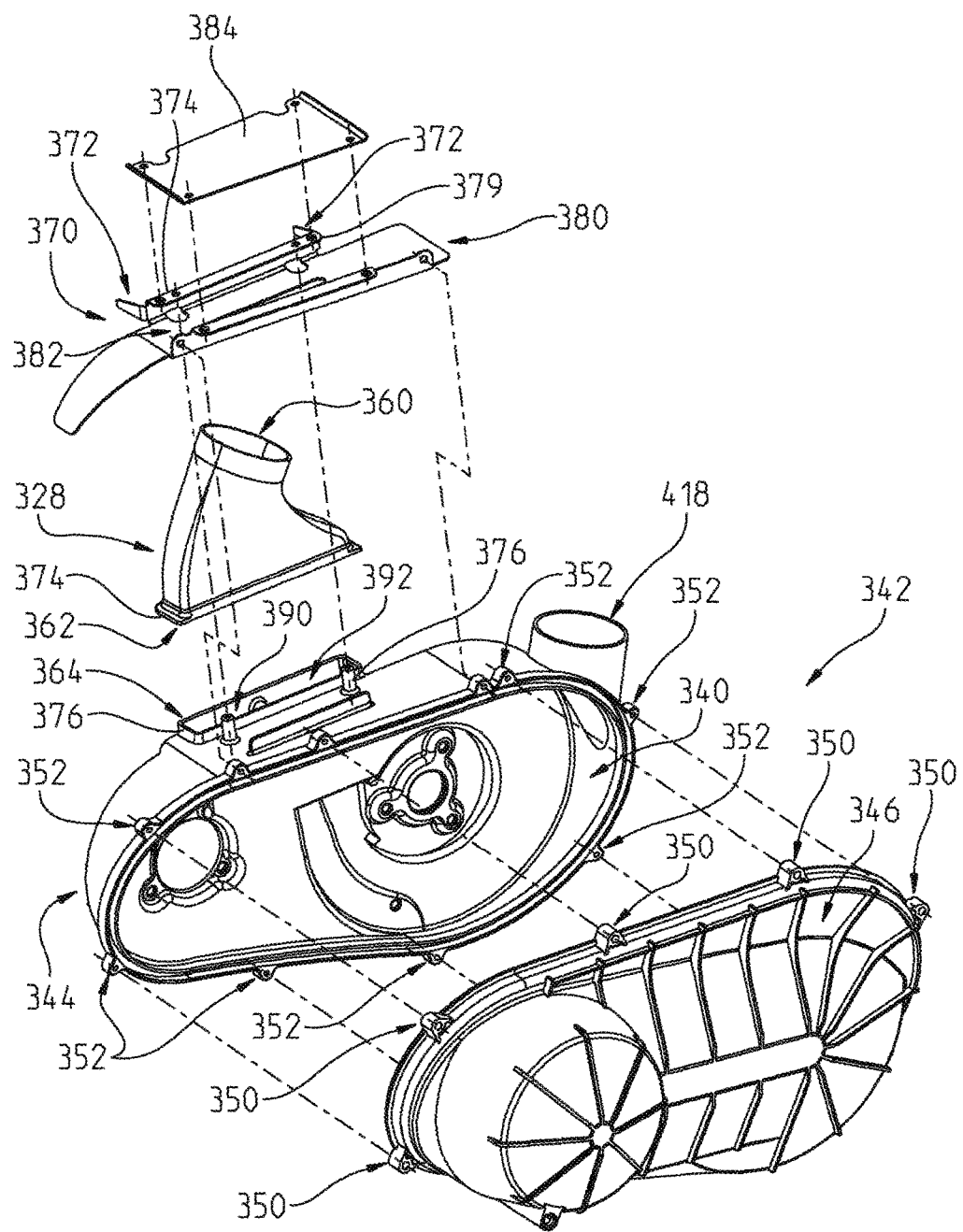
FIG. 22 illustrates a an exploded view of portions of the CVT unit of FIG. 21.
Figure 28:
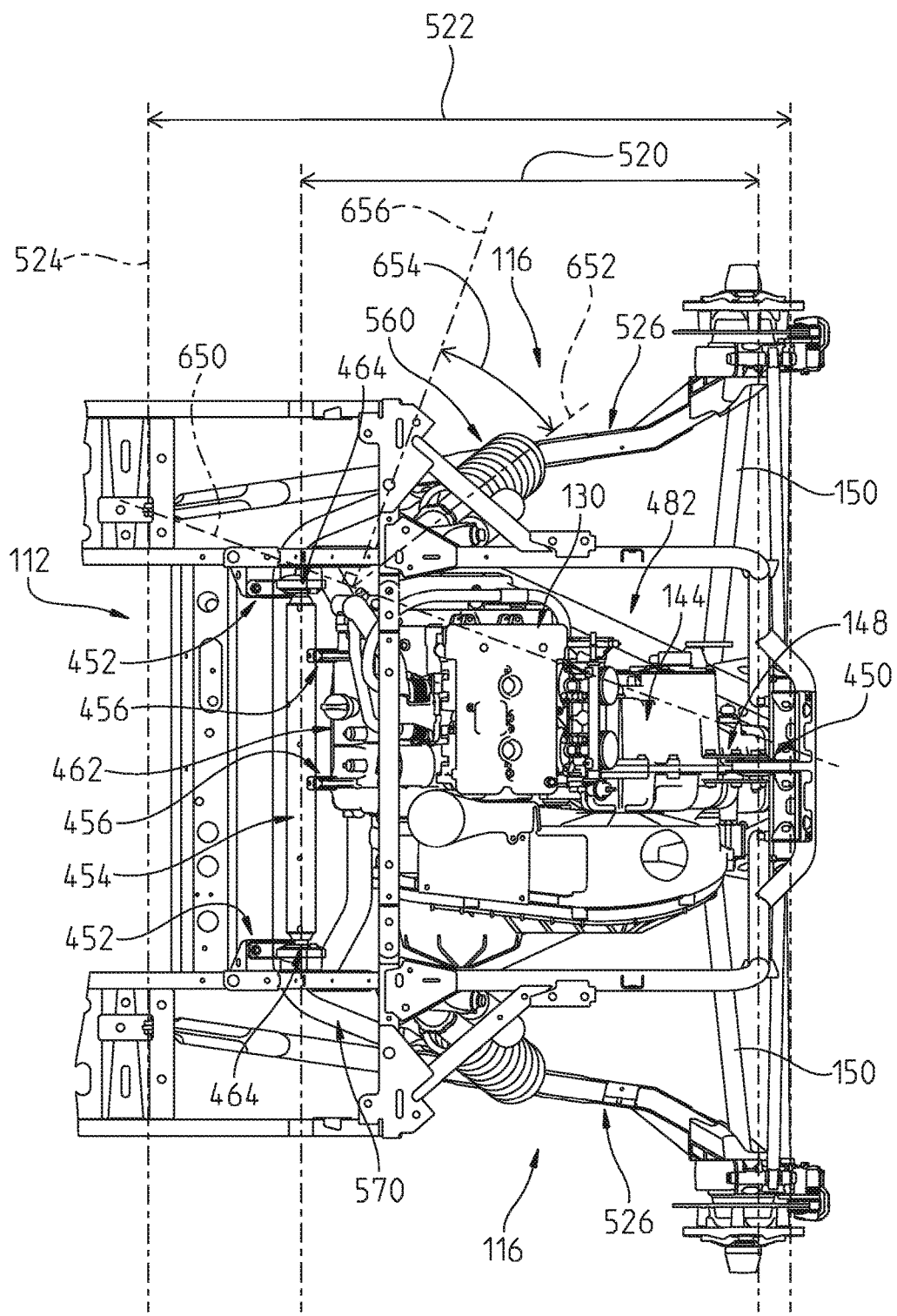
FIG. 28 illustrates a top view of the coupling of a unit including the power source, the shiftable transmission, and the rear drive to the frame of the vehicle of FIG. 1.

Returning to FIGS. 10 and 11, the interior 324 of air inlet housing 320 is in fluid communication with an interior 340 of a CVT housing 342 through a fluid conduit 326 and a fluid duct 328. Referring to FIG. 10, CVT housing 342 includes a base portion 344 and a cover 346. Cover 346 is removably coupled to base portion 344 through more or more couplers. Referring to FIG. 22, couplers, such as threaded members, are received in apertures of coupling features 350 of cover 346 and are threaded into coupling features 352 of base portion 344. In one embodiment, quick connect couplers are used to coupled cover 346 to base portion 344. In one embodiment, a seal is provided between base portion 344 and cover 346. Referring to FIG. 3, CVT housing 342 is provided on a left side of vehicle 100 below cargo bed 234 to provide easy access to CVT housing 342. As shown in FIG. 28, CVT housing 342 is positioned completely rearward of line 524 associated with rear suspensions 116 and completely forward of control arms 530 and 532 of rear suspensions 116.

Figure 21:
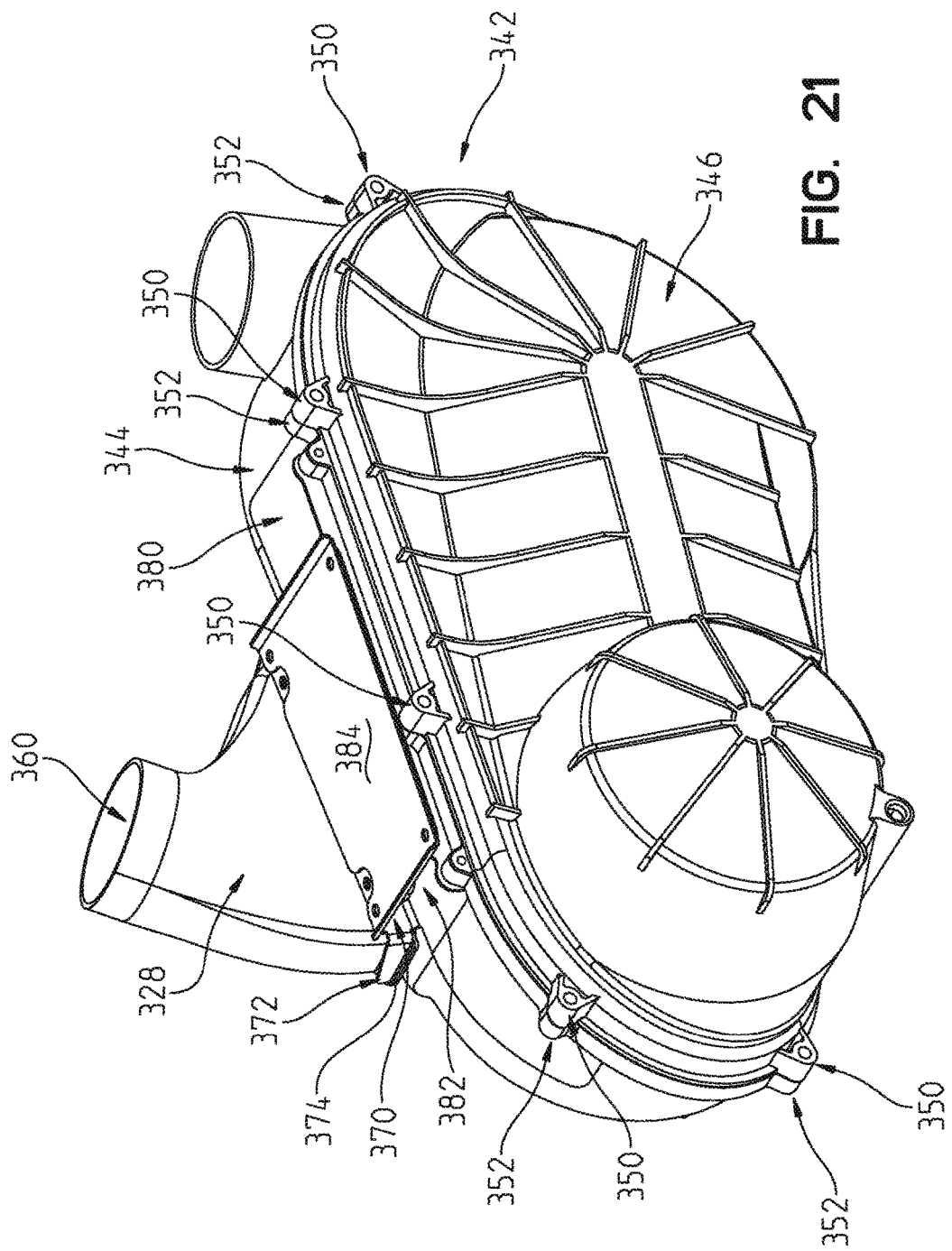
FIG. 21 illustrates a first, perspective view of a CVT unit of the exemplary side-by-side vehicle of FIG. 1.

Referring to FIG. 22, fluid duct 328 includes a first open end 360 which receives the ambient air from fluid conduit 326 and a second open end 362 which mates with a diverter portion 364 of base portion 344. In one embodiment, a seal is provided between open end 362 of fluid duct 328 and diverter portion 364 of base portion 344. Fluid duct 328 is held relative to base portion 344 with a holder 370. In the illustrated embodiment, holder 370 includes a pair of spaced apart fingers 372 which press against a flange 374 of fluid duct 328 as shown in FIG. 21. Holder 370 is coupled to base portion 344. In one embodiment, threaded couplers are received in openings 374 of holder 370 and threaded into coupling portions 376 of base portion 344.

In the illustrated embodiment, holder 370 is further coupled to a shield 380 which is coupled to base portion 344. Holder 370 bounds a side of a channel 382 formed by holder 370 and shield 380. In one embodiment, channel 382 provides a routing region for wires, cables, and other items. A top of channel 382 is covered by a cover 384 which is removably coupled to holder 370 and shield 380. The wires are captured in channel 382 between shield 380 and cover 384.

Figure 23:
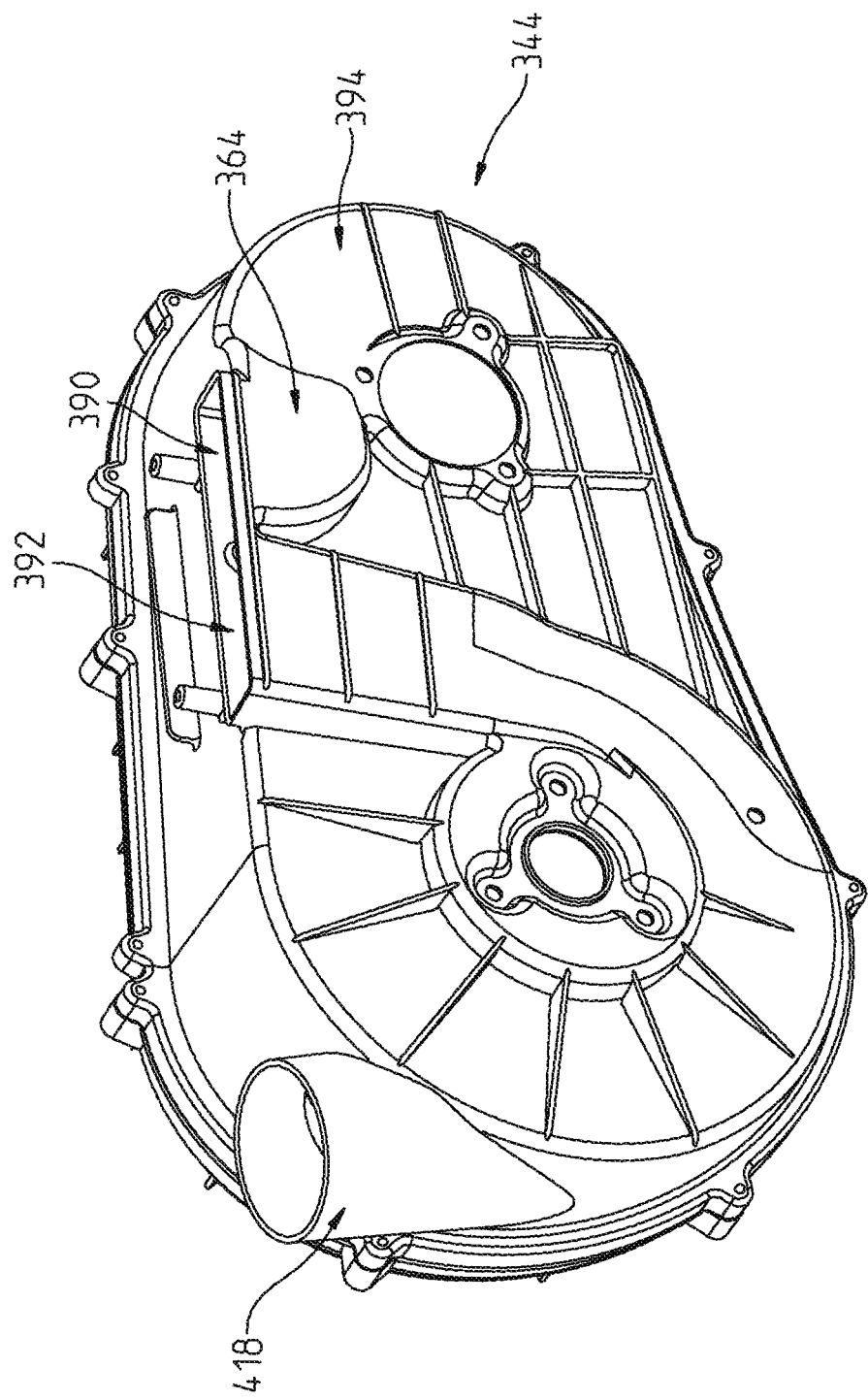
FIG. 23 illustrates a second, perspective view of portions of the CVT unit of FIG. 21.

Diverter portion 364 receives the ambient air from fluid duct 328 and communicates it to interior 340 of CVT housing 342. Diverter portion 364 includes a plurality of conduits which direct the ambient air to various portions of interior 340 of CVT housing 342. In the illustrated embodiment, diverter portion 364 includes a pair of conduits, conduit 390 and conduit 392. Referring to FIG. 23, in the illustrated embodiment, conduit 390 and conduit 392 are provided as part of the wall 394 of base portion 344.

Figure 24A:
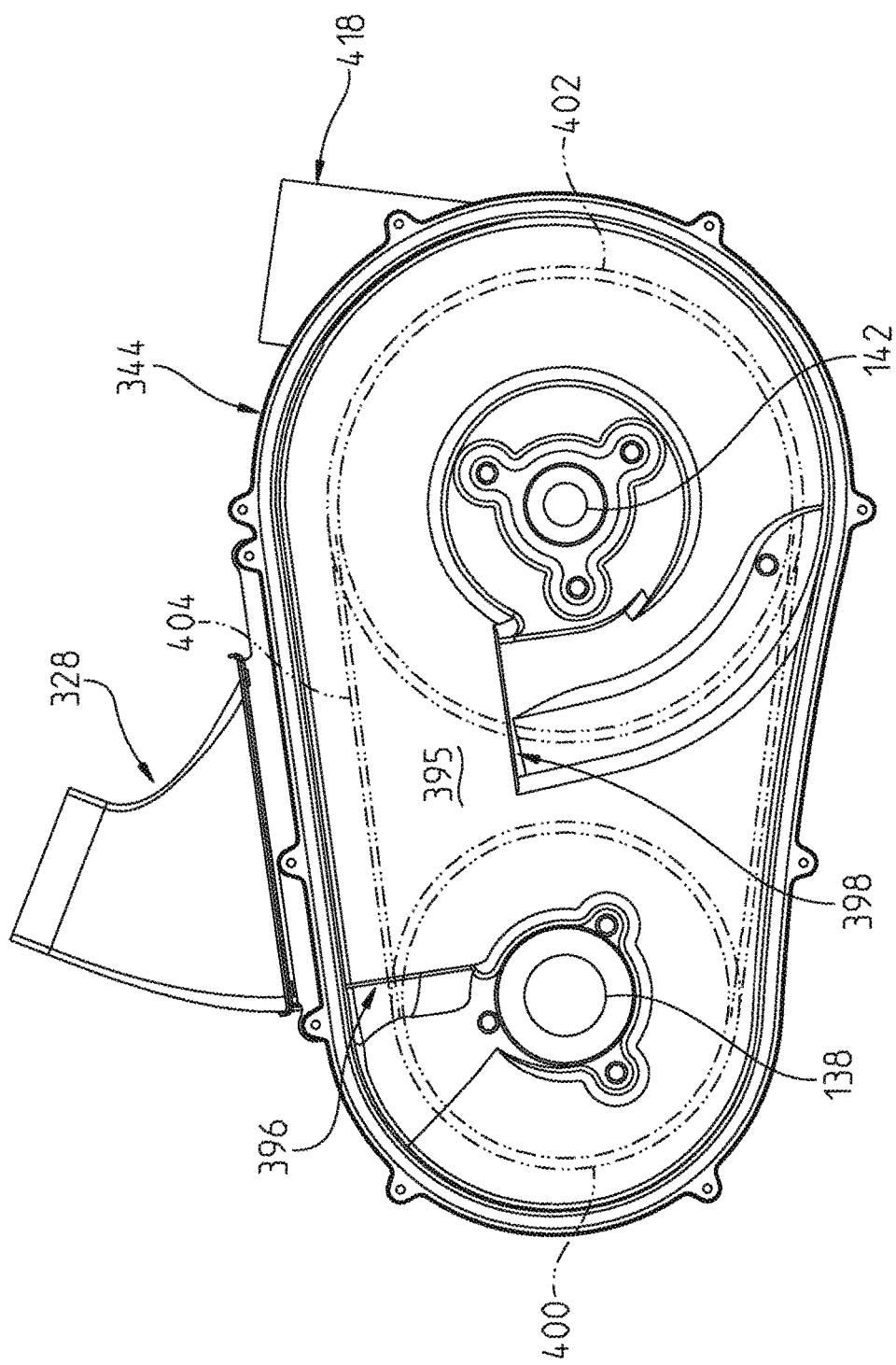
FIG. 24A illustrates the relative positions of a drive member, a driven member, and a drive belt of the CVT unit of FIG. 21.

Referring to FIG. 24A, conduit 390 enters interior 340 of CVT housing 342 through opening 396 in interior wall 395 of base portion 344. Opening 396 is positioned proximate a drive member 400 of CVT unit 140 which is shown in phantom. Drive member 400 is coupled to output shaft 138 of power source 130. Conduit 392 enters interior 340 of CVT housing 342 through opening 398 in interior wall 395 of base portion 344. Opening 398 is positioned proximate to a driven member 402 of CVT unit 140. Driven member 402 is coupled to shaft 142 of shiftable transmission 144. Driven member 402 is operatively coupled to drive member 400 through a drive belt 404.

Figure 24B:
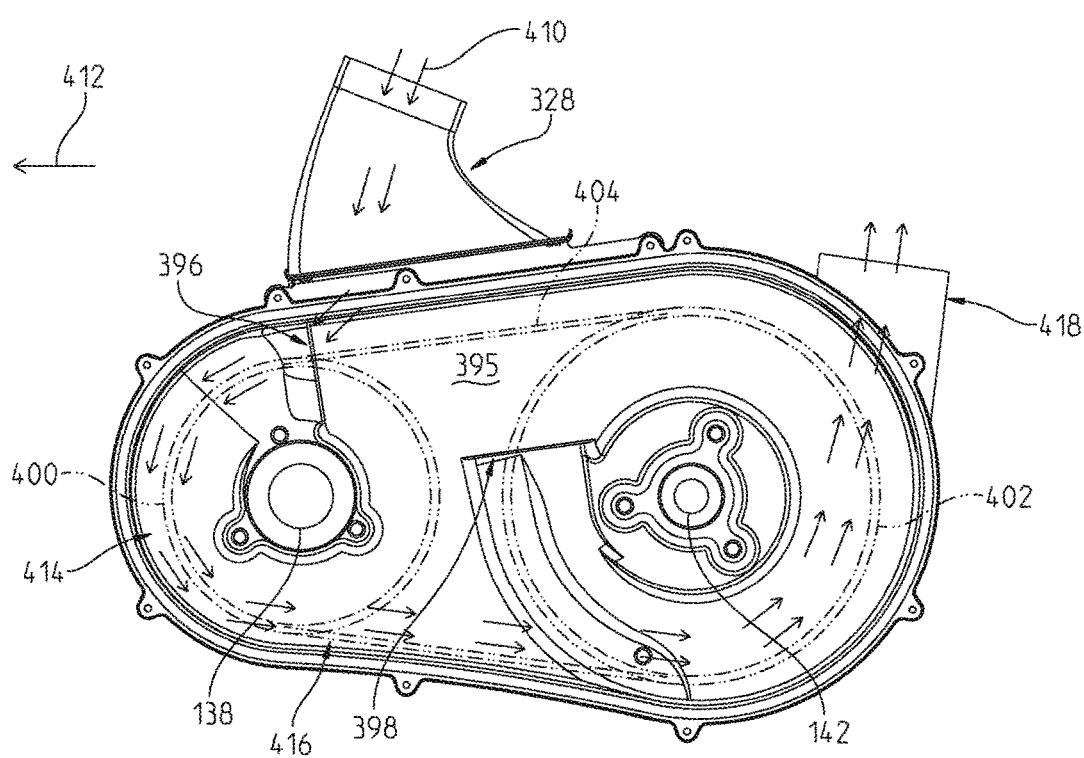
FIG. 24B illustrates the airflow within an interior of the CVT unit of FIG. 21 from a first air inlet of the CVT housing to an air outlet of the CVT housing.

Referring to FIG. 24B, the flow path of air 410 from conduit 390 is illustrated. The air enters interior 340 through opening 396. The shape of conduit 390 generally directs air 410 in direction 412. Air 410 is directed by drive member 400 and the shape of base portion 344 along a front portion 414 of CVT housing 342 and a bottom portion 416 of CVT housing 342. The air 410 removes heat from drive member 400 and drive belt 404. The warmed air passes driven member 402 and exits interior 340 of CVT housing 342 through outlet duct 418. In one embodiment, drive member 400 includes fins which direct airflow. An exemplary CVT member with fins is disclosed in U.S. patent application Ser. No. 12/069,521, filed Feb. 11, 2008, titled Suspension for an all terrain vehicle, the disclosure of which is expressly incorporated by reference herein.

Figure 24C:
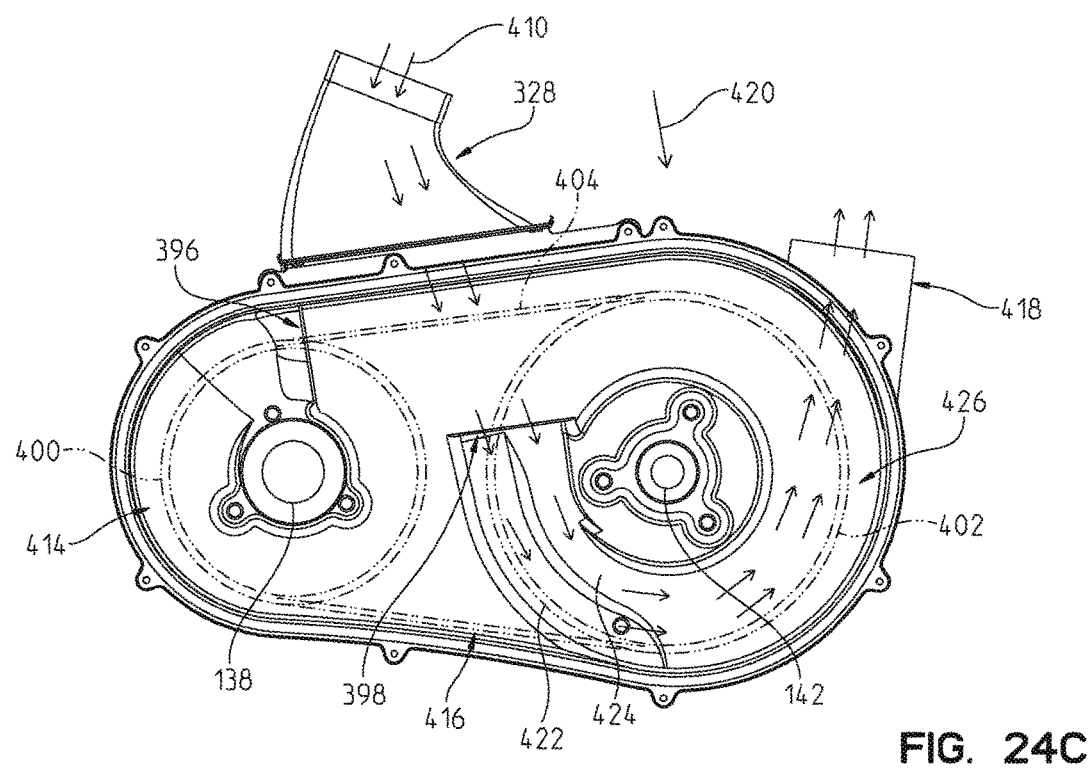
FIG. 24C illustrates the airflow within an interior of the CVT unit of FIG. 21 from a second air inlet of the CVT housing to an air outlet of the CVT housing.

Referring to FIG. 24C, the flow path of air 410 from conduit 392 is illustrated. The air enters interior 340 through opening 398. The shape of conduit 392 generally directs air 410 in direction 420 towards bottom portion 416 of CVT housing 342. Base portion 344 includes directing features 422 and 424 which generally direct air 410 along two different paths, but generally towards bottom portion 416 of CVT housing 342. Air 410 is directed by driven member 402 and the shape of base portion 344 generally along bottom portion 416 of CVT housing 342 and back portion 426 of CVT housing 342. The air 410 removes heat from driven member 402 and drive belt 404. The warmed air passes driven member 402 and exits interior 340 of CVT housing 342 through outlet duct 418. In one embodiment, driven member 402 includes fins which direct airflow. An exemplary CVT member with fins is disclosed in U.S. patent application Ser. No. 12/069,521, filed Feb. 11, 2008, titled Suspension for an all terrain vehicle, the disclosure of which is expressly incorporated by reference herein.

As illustrated in FIGS. 24B and 24C, air 410 is split by diverter portion 364 into multiple streams of air. A first portion of the air 410 is directed at drive member 400 and a second portion of air 410 is directed at driven member 402. Both the first portion and the second portion are introduced in a manner to generally direct the air 410 in a counterclockwise movement. This counterclockwise movement is consistent with the counterclockwise rotation of drive member 400 and driven member 402 during operation of CVT unit 140.

During operation of vehicle 100, the amount of air directed at each of drive member 400 and driven member 402 may change. In this embodiment, drive member 400 and driven member 402 include fins and generally act as fans. At low speeds, drive member 400 is spinning at engine rpm and driven member 402 is spinning at less than engine rpm. As such, drive member 400 draws more air than driven member 402. At higher speeds, drive member 400 is still spinning at engine rpm, but driven member 402 is now spinning at higher than engine rpm. As such, driven member 402 draws more air than drive member 400.

Returning to FIGS. 10 and 11, outlet duct 418 is coupled to a fluid conduit 430 of exhaust system 162. Fluid conduit 430 terminates in an open end 432. Open end 432 of fluid conduit 430 is located generally above the head portion of power source 130 to provide airflow past the head portion of power source 130. Referring to FIG. 6, a skid plate 438 of frame 112 includes openings 436 which promote the movement of air relative to power source 130.

Figure 10A:
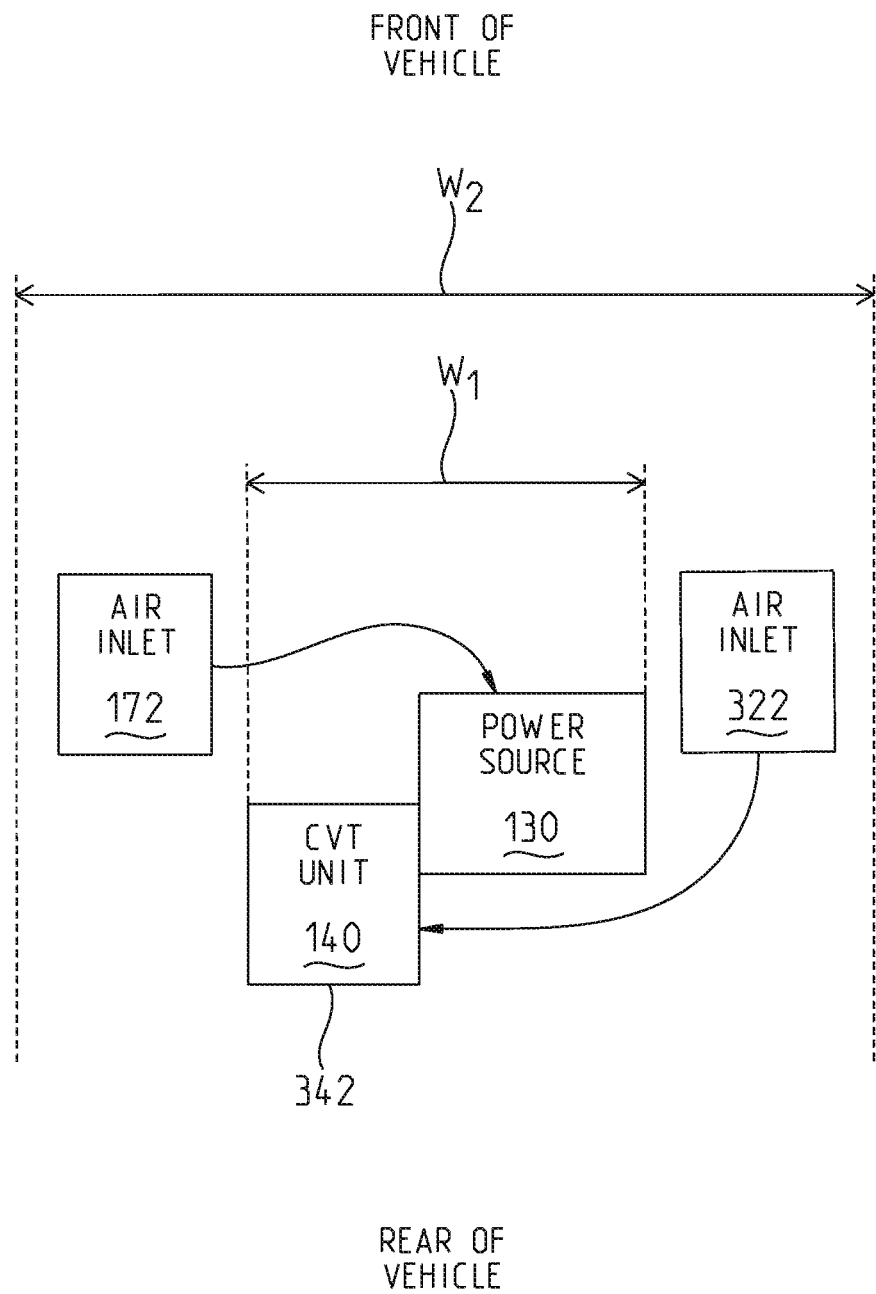
FIG. 10A is a representative view of the location of the air inlet of the air handling system of a power source of FIG. 10 and the location of the air inlet of the air handling system of a CVT unit of FIG. 10 relative to the power source and the CVT unit.

In one embodiment, the air inlet 172 for air intake system 134 is positioned on a first side of vertical centerline plane 122 and the air inlet 322 for air intake system 160 is positioned on a second side of vertical centerline plane 122. In one embodiment, as represented in FIG. 10A, both air inlet 172 of air intake system 134 and air inlet 322 of air intake system 160 are positioned laterally outside of a lateral extent (w1) of power source 130 and CVT unit 140 and within a lateral extent (w2) of vehicle 100. As represented in FIG. 10A, air inlet 172 of air intake system 134 is positioned to a first lateral side of CVT housing 342 of CVT unit 140 and air inlet 322 of air intake system 160 is positioned to a second lateral side of CVT housing 342 of CVT unit 140.

Referring to FIG. 6, skid plate 438 may further include openings in one or both of regions 440 and 442. These openings facilitate the movement of air through radiator 444

(see FIG. 3). As shown in FIG. 3, the flow of air 446 enters through a front grill in vehicle 100, passes through radiator 444 taking on heat, and then flows downward through one or both of regions 440 and 442 and underneath vehicle 100. The flow of air 446 is directed away from operator area 212.

Figure 29:
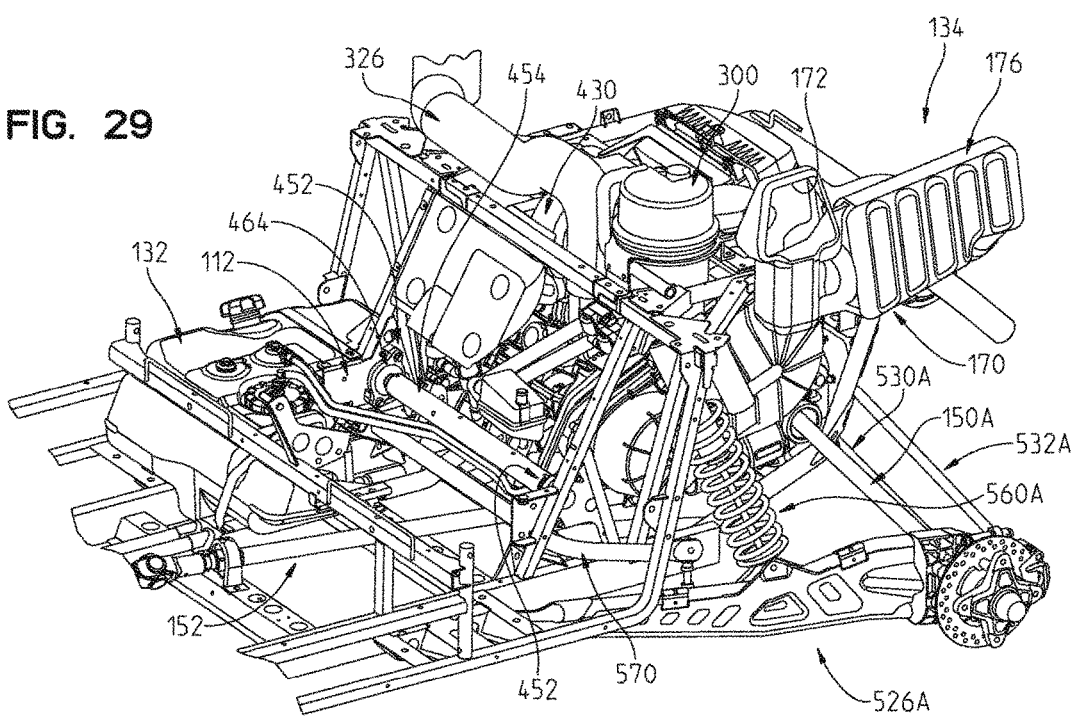
FIG. 29 illustrates a perspective view of the coupling of a unit including the power source, the shiftable transmission, and the rear drive to the frame of the vehicle of FIG. 1.
Figure 30:
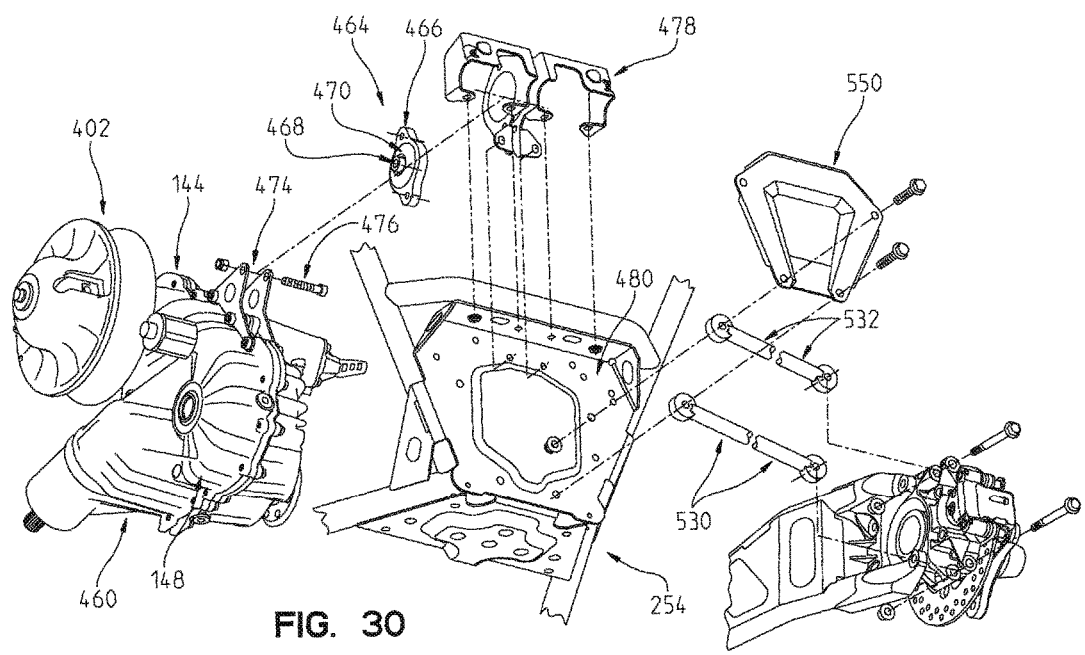
FIG. 30 illustrates a rear perspective exploded view of the coupling of the shiftable transmission and the rear drive to the frame of the vehicle of FIG. 1.

Referring to FIGS. 28-30, shiftable transmission 144 and rear drive unit 148 are provided within a common housing 460 (see FIG. 30). A housing 462 of power source 130 is coupled to housing 460 and is overall referred to as unit 482. Referring to FIGS. 37-40, the connection of housing 460 and housing 462 is shown.

Figure 37:
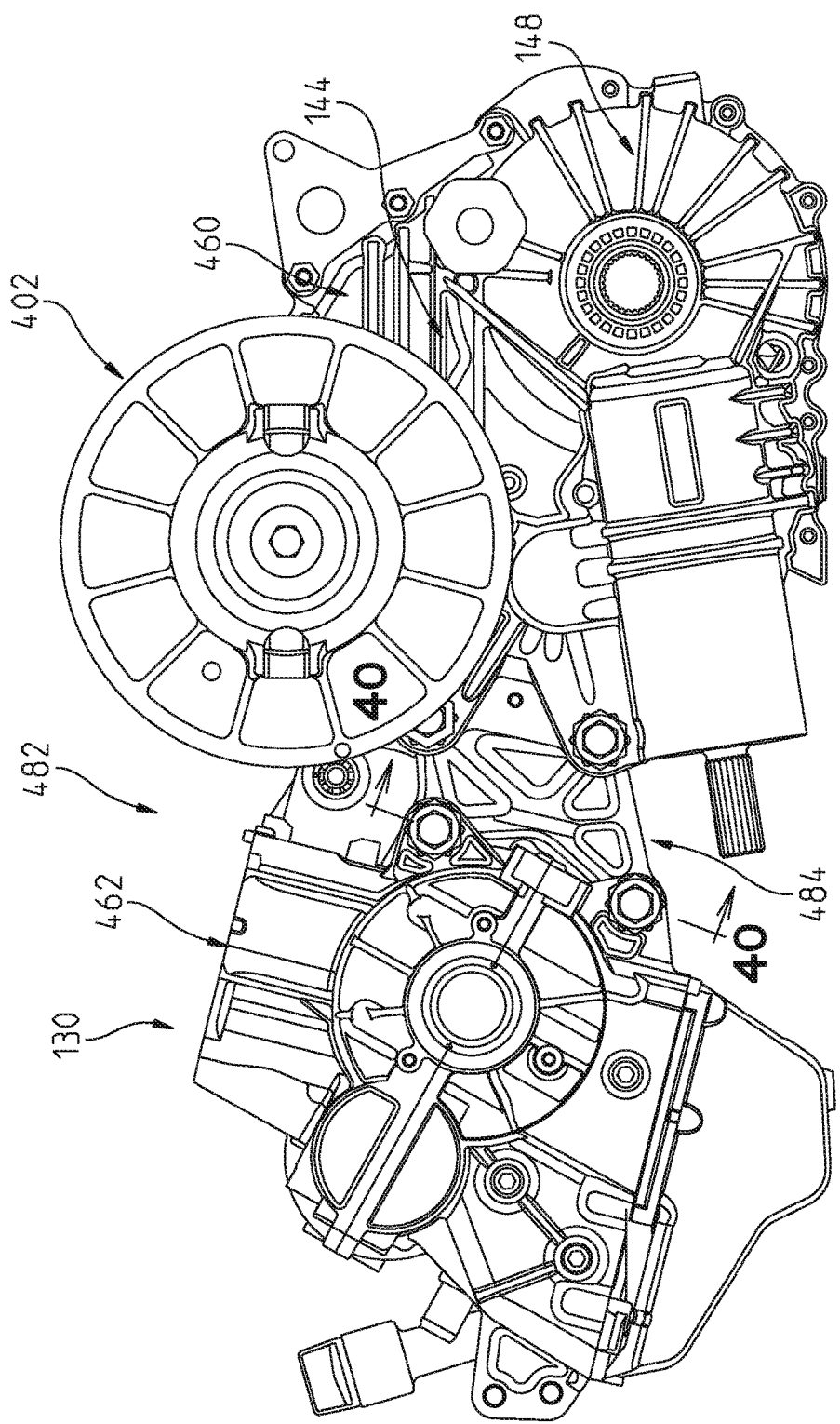
FIG. 37 illustrates the coupling of a housing of the power supply to a housing of the shiftable transmission with a first spacer.

Referring to FIG. 37, housing 460 is coupled to housing 462 through a spacer 484. As explained herein, spacer 484 is coupled to each of housing 460 and housing 462 through a plurality of fasteners. In one embodiment, spacer 484 is a cast piece. In one embodiment, spacer 484 maintains the centerline distance between the output shaft 138 of power source 130 and the input shaft 142 of shiftable transmission 144. When a different power source 130 or shiftable transmission 144 is provided for vehicle 100, a different spacer 484 may be used to maintain the centerline distance between the output shaft 138 of power source 130 and the input shaft 142 of shiftable transmission 144.

Referring to FIG. 37A, spacer 484 is represented. Spacer 484 includes a first portion 483 which is sized and arranged to couple to attachment features of housing 462 and a second portion 485 which is sized and arranged to couple to attachment features of common housing 460. Referring to FIG. 37B, another version of spacer 484 is represented, spacer 484'. Spacer 484' includes a first portion 486 which is sized and arranged to couple to attachment features of a housing 462' which differs from housing 462. In one embodiment, the difference between housing 462' and housing 462 is due to the changes in the power source 130. Spacer 484' also includes a second portion 487 which is sized and arranged to couple to attachment features of a housing 460' which differs from common housing 460. In one embodiment, the difference between housing 460' and common housing 460 is due to the changes in the shiftable transmission 144. By simply changing the spacer 484, various combinations of power source 130 and shiftable transmission 144 may be assembled. As shown in Table I, various spacers 484 may be used to form various combinations of power source 130 and shiftable transmission 144.

TABLE I

| Spacer (1$^{st}$ portion, 2$^{nd}$ portion) | Power Source Housing | Transmission Housing |
|---|---|---|
| 484 (483, 485) | 462 | 460 |
| 484' (486, 487) | 462' | 460' |
| 484" (483, 487) | 462 | 460' |
| 484'" (486, 485) | 462' | 460 |

Figure 38:
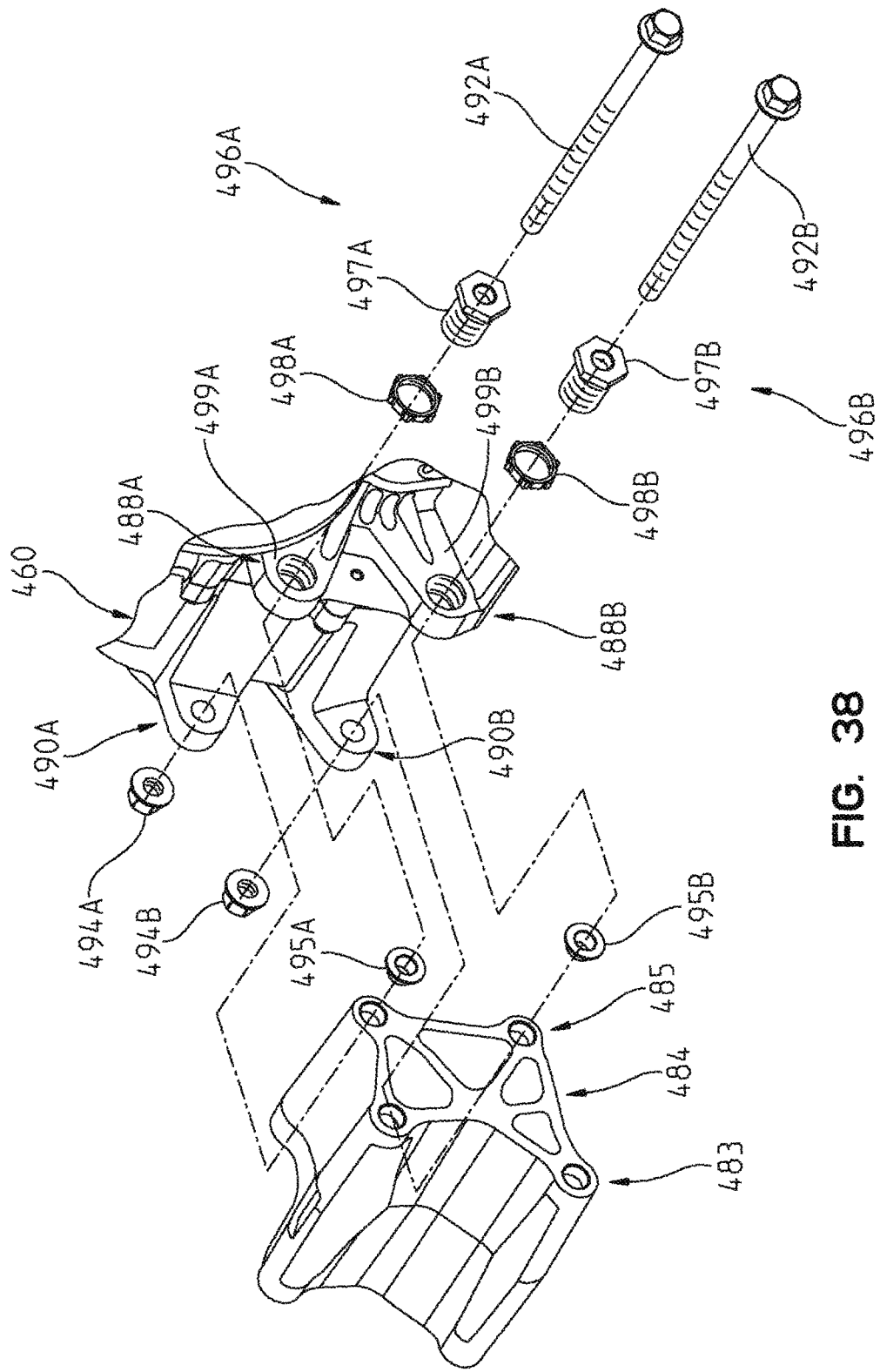
FIG. 38 illustrates the connection between the first spacer of FIG. 37 to the housing of the shiftable transmission.

Referring to FIG. 38, the connection between housing 460 and spacer 484 is shown. As shown in FIG. 38, housing 460 includes attachment features 488 and 490. Each set of attachment features 488 and 490 include openings which receive a bolt 492. Second portion 485 of spacer 484 also includes openings which receive bolt 492. Bolt 492 is secured in place with threaded nuts 494 which threadably couple to bolt 492. In one embodiment, other suitable fasteners or mating components are provided to couple second portion 485 of spacer 484 to housing 460.

In the illustrated embodiment, adjusters 496 are also included. Adjusters 496 includes a first member 497 having an opening to receive bolt 492 and a threaded exterior surface and a second member 498 having an opening to receive bolt 492 and an interior threaded surface which is threadably engaged with the threaded exterior surface of first member 497. A first end of first member 497 contacts a bushing 495 coupled to second portion 485 of spacer 484 and a second end of first member 497 contacts the head of bolt 492. The first end of first member 497 is threadably received in the opening of attachment features 488. Second member 498 contacts an outer surface 499 of attachment features 488. In one embodiment, second member 498 is a locking nut. With this arrangement, first member 497 is generally in contact with outer surface 499 of spacer 484 and removes any bending stress from attachment features 488.

Figure 39:
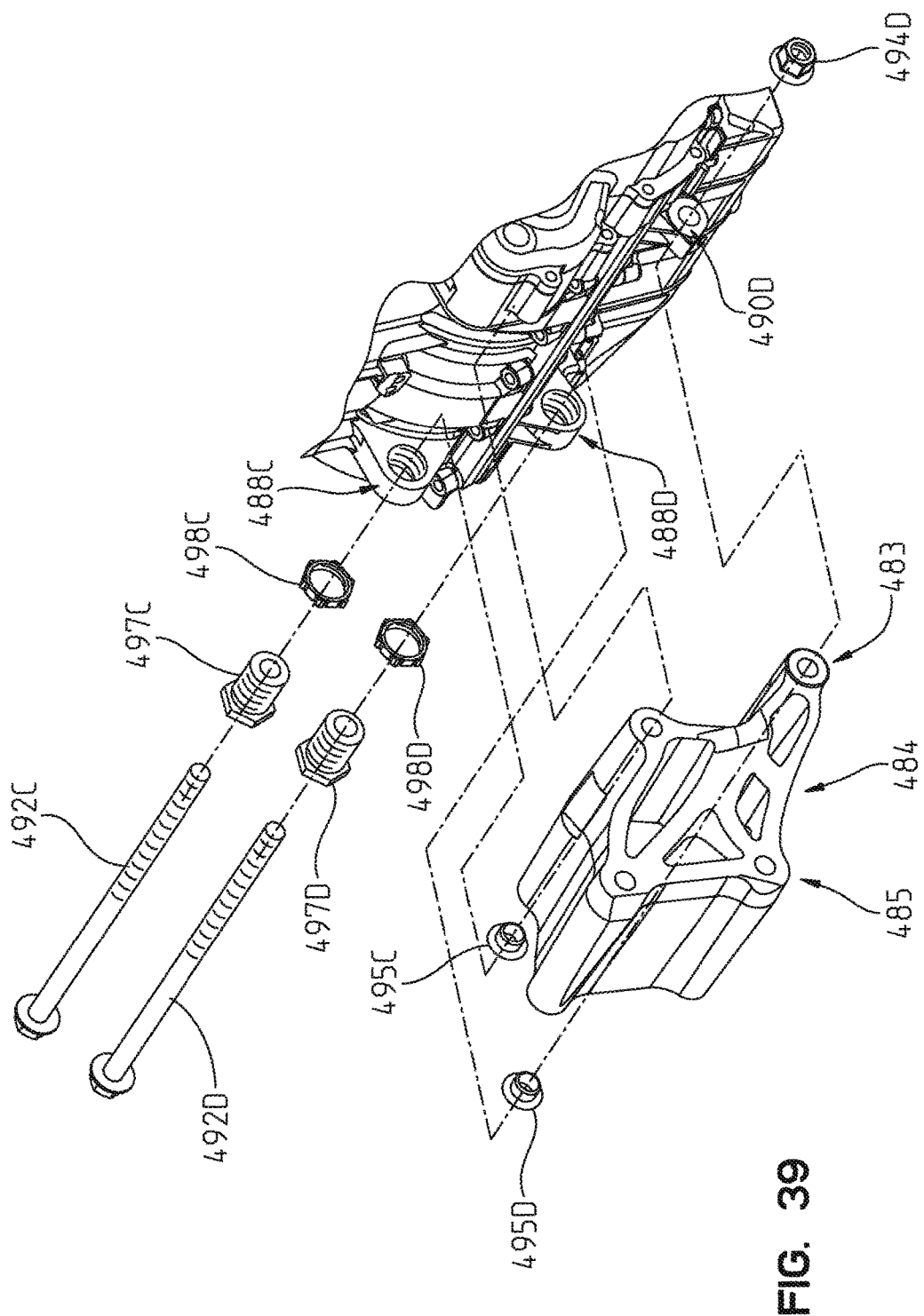
FIG. 39 illustrates the connection between the first spacer of FIG. 37 to the housing of the power supply.
Figure 40:
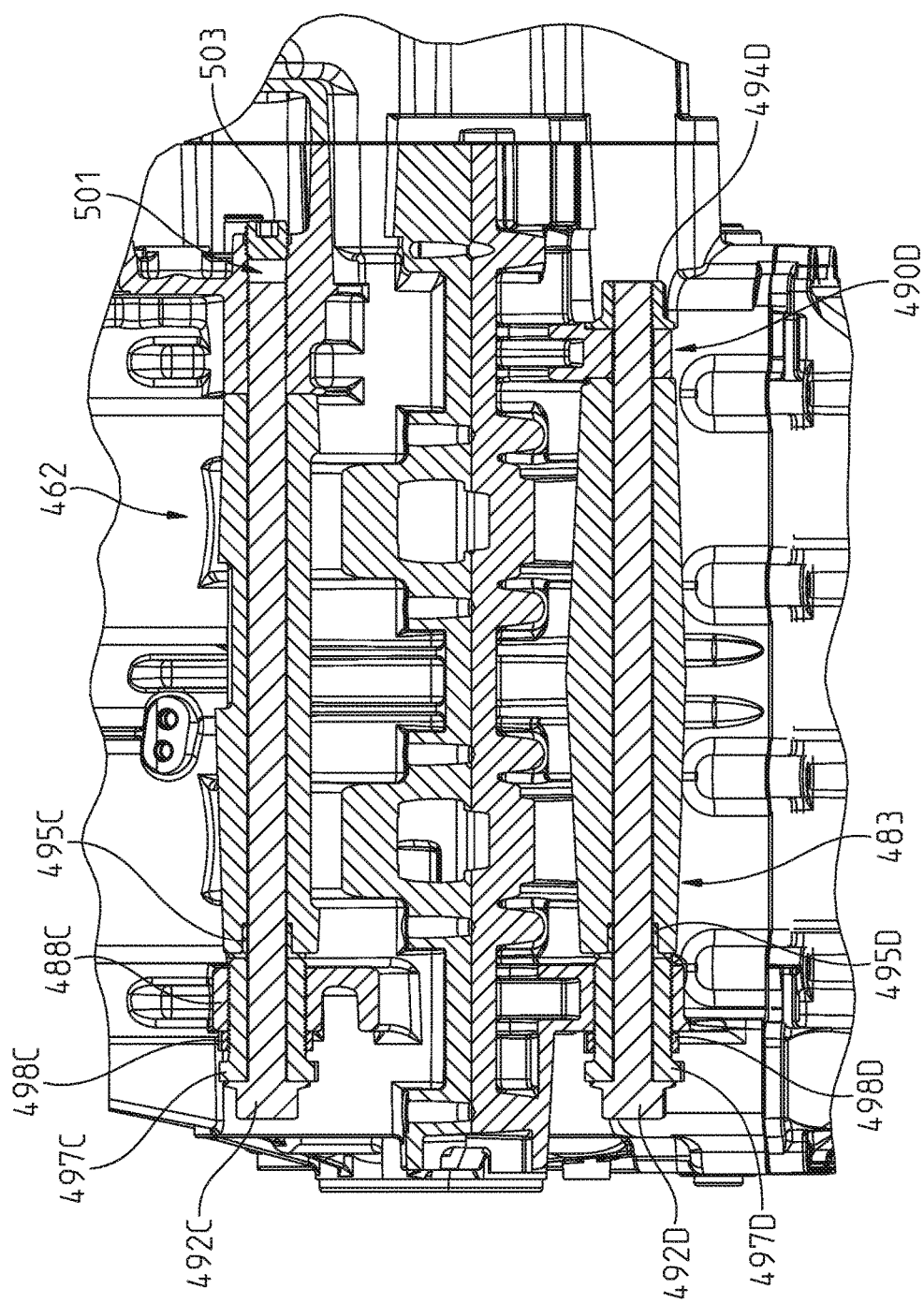
FIG. 40 is a section view along lines 40-40 in FIG. 37.

Referring to FIG. 39, the connections between housing 462 and first portion 483 of spacer 484 are generally the same as the connections between housing 460 and second portion 485 of spacer 484. However, as shown in FIG. 40, the upper connection between housing 462 and first portion 483 of spacer 484 does not include a threaded nut 494. Rather, bolt 492C is directly threaded into a bore 501 of housing 462. The bore 501 of housing 462 is plugged at its end with a plug 503. Plug 503 prevents fluid from being communicated from an interior of housing 462.

Spacer 484 connects housing 460 and housing 462 together independent of the connection between output shaft 138 of power source 130 and input shaft 142 of shiftable transmission 144. Neither of output shaft 138 of power source 130 nor input shaft 142 of CVT unit 140 pass through spacer 484.

Spacer 484 connects housing 460 and housing 462 together to form unit 482. As explained herein unit 482 is supported relative to frame 112 through three connections, one relative to housing 460 and two relative to housing 462. Each of housing 460 and housing 462 includes at least one connection, but less than three connections. In one embodiment, one or both of housing 460 and housing 462 includes at least three connections to frame 112.

In the illustrated embodiment, a single rear connection 450 and a pair of front connections 452 are provided. Housing 462 of power source 130 is coupled to brackets 456 of support member 454. In the illustrated embodiment, support member 454 is cylindrical member having brackets 456 welded thereto. Power source 130 is coupled to brackets 456 through fasteners. Support member 454 is coupled to frame 112 through coupling members 464 (see FIG. 29). In a similar manner, housing 460 is coupled to frame 112 through a coupling member 464 (see FIG. 30).

Each coupling member 464 includes a first base portion 466, a second base portion 468, and a connecting portion 470. Referring to FIG. 29, in the case of front connection points 452, first base portion 466 of coupling members 464 is coupled to frame 112 and second base portion 468 is coupled to the ends of support member 454. Connecting portion 470 couples first base portion 466 to second base portion 468. Connecting portion 470 is an elastomer or other type of material which permits second base portion 468 to move relative to first base portion 466 generally along its axis, but to generally maintain the position of second base portion 468 relative to first base portion 466 in radial directions. Additional details regarding coupling members 464 are provided in U.S. patent application Ser. No. 11/494,891, titled SIDE-BY-SIDE ATV, the disclosure of which is expressly incorporated by reference herein. Referring to FIG. 30, a bracket 474 is coupled to housing 460 and a bracket 478 is coupled to a rear frame member 480 of rear frame portion 254 of frame 112. Bracket 474 and bracket 478 are secured to housing 460 and rear frame member 480 through respective fasteners. First base portion 466 of coupling members 464 is coupled to bracket 478 through fasteners and second base portion 468 of coupling members 464 is coupled to bracket 474 through fastener 476.

Referring to FIG. 28, distance 520 represents the longitudinal extent of the mounting connections for power source 130, shiftable transmission 144, and rear drive unit 148. The dashed lines pass through the center of the respective coupling members 464. Distance 522 represents the longitudinal extent of rear independent suspensions 116. Line 524 passes through the pivot axis of radius arms 526 of rear independent suspensions 116. Line 528 passes through the center of control arms 530 and 532. As shown in FIG. 28, in the illustrated embodiment the longitudinal extent of the mounting locations for power source 130, shiftable transmission 144, and rear drive unit 148 is completely contained within the longitudinal extent of rear independent suspensions 116.

Further, in the illustrated embodiment the power source 130, shiftable transmission 144, and CVT unit 140 are positioned completely behind seating 211. In addition, in the illustrated embodiment output shaft 138 of power source 130 and output shaft 142 of CVT unit 140 both are oriented along a lateral extent of vehicle 100. Further, the half shafts 150 extending from rear drive unit 148 are laterally extending. This arrangement eliminates the need for any right angle drives between power source 130 and the wheels 104 of rear axle 110. This reduces the width of rear drive unit 148 which permits the use of longer half shafts 150 which in turn permits greater suspension travel for rear suspensions 116. A right angle drive is included to connect front drive unit 154 to shiftable transmission 144 through output shaft 152.

Figure 31:
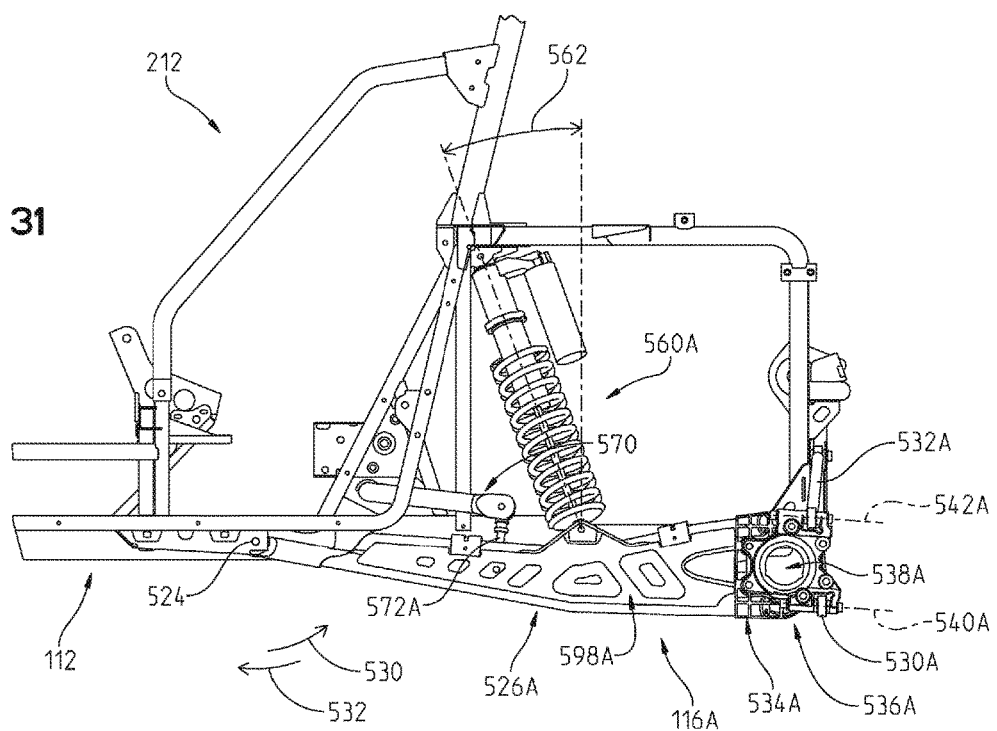
FIG. 31 illustrates a side view of the rear suspension of the vehicle of FIG. 1.

Referring to FIG. 31, rear independent suspensions 116 includes radius arms 526, control arms 530 and control arms 532. Radius arms 526 are rotatably coupled to frame 112 about line 524 in directions 530 and 532. In one embodiment, radius arms 526 are coupled to frame 112 through spherical bearings. As shown in FIG. 31, line 524 is positioned below the seating region of operator area 212. A rear portion 534 of radius arms 526 is coupled to a bearing carrier 536. In the illustrated embodiment, bearing carrier 536 is fixed relative to radius arms 526. Bearing carrier 536 includes an opening 538 through which one of the half shafts 150 is coupled to wheels 104.

Bearing carrier 536 is also coupled to one of control arms 530 and one of control arms 532. In the illustrated embodiment, control arms 530 and control arms 532 are rotatably coupled to bearing carrier 536 about axis 540 and axis 542, respectively. Referring to FIG. 32, control arms 530 and control arms 532 are further rotatably coupled to a support member 550 of frame 112 which is coupled to rear frame member 480 of frame 112. As illustrated in FIG. 32, control arms 530 and control arms 532 are coupled to the end of frame 112. By configuring rear independent suspensions 116 such that control arms 530 and control arms 532 may be coupled to the end of frame 112, an overall length of frame 112 may be reduced.

Figure 8:
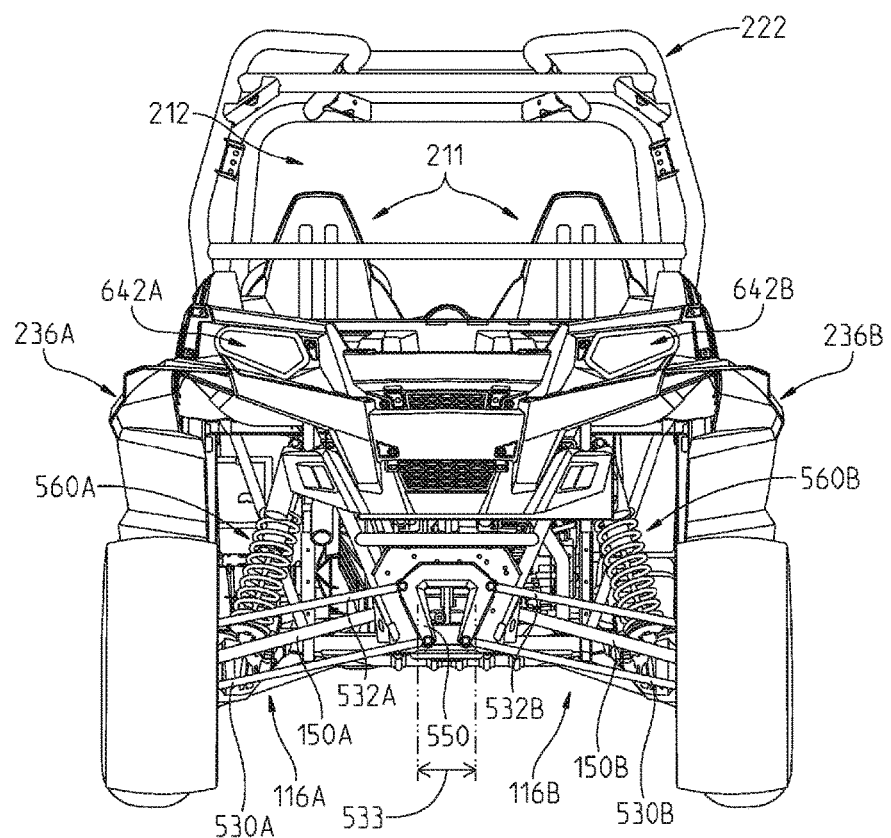
FIG. 8 illustrates a back view of the exemplary side-by-side vehicle of FIG. 1.

Further, referring to FIG. 8, by configuring rear independent suspensions 116 such that control arms 530 and control arms 532 may be coupled to the end of frame 112, the pivot axis of control arms 530 and control arms 532 relative to frame 112 may be positioned laterally within an envelope 533 of rear drive unit 148.

Returning to FIG. 31, a dampening member 560 is rotatably coupled to radius arms 526 and to an upper portion of frame 112. Dampening member 560 is rotatably coupled to radius arms 526 and to frame 112. Referring to FIG. 6, radius arms 526 generally angle outwards from vertical centerline plane 122. This arrangement of radius arms 526 accommodates a longer dampening member 560 and a more progressive suspension 116. In the illustrated embodiment, dampening member 560 is a shock.

As illustrated in FIG. 31, dampening member 560 is angled forward by having the connection point of dampening member 560 to frame 112 being forward of the connection point of dampening member 560 to radius arms 526. By angling dampening member 560 forward area is provided rearward of dampening member 560 to mount additional components. Exemplary components include portions of exhaust system 136, such as muffler 120, and portions of air intake system 134, such as airbox 180. In one embodiment, dampening member 560 is angled forward by about 20 degrees, as represented by angle 562.

As illustrated in FIG. 32, dampening member 560 is angled inward by having the connection point of dampening member 560 to frame 112 being inward of the connection point of dampening member 560 to radius arms 526. By angling dampening member 560 inward suspension 116 has a progressive motion ratio relative to wheel travel. In one embodiment, dampening member 560 is angled inward by about 15 degrees, as represented by angle 564.

The angling of dampening member 560 both forward and inward causes the top of dampening member 560 to tilt towards a rotation axis 650 (see FIG. 28 for passenger side suspension). Rotation axis 650 passes through the connection of radius arms 526 and frame 112 and the connection point of control arms 530. From a top view (see FIG. 28) a centerline axis 652 of dampening member 560 is angled relative to axis 650. FIG. 28 shows top view projections of both axis 650 and axis 652 on a horizontal plane. Axis 652 makes an angle 654 with a normal 656 of axis 650. In one embodiment, angle 654 has a value of about 30 degrees. In one embodiment, angle 654 has a value of up to about 30 degrees. In one embodiment, angle 654 has a value of up to about 20 degrees. In one embodiment, angle 654 has a value of up to about 10 degrees. In one embodiment, angle 654 has a value in the range of about 10 degrees and about 30 degrees. In one embodiment, angle 654 has a value of about 0 degrees.

The position of dampening member 560 relative to axis 650 results in rear suspension 116 having a progressive motion ratio, in the illustrated embodiment. The motion ratio is defined as the derivative of the dampening member travel to the wheel travel (change in dampening member travel over change in wheel travel). A progressive motion ratio exhibits a higher change in dampening member travel at a higher change in wheel travel. An exemplary plot of the motion ratio for the illustrated embodiment, is provided in FIG. 43.

The progressive nature of suspension 116 results in vehicle 100 being softer at normal ride heights and stiffer when suspension 116 is compressed. In one embodiment, the motion ratio for suspension 116 is in the range of about 0.5 to about 0.7. In one embodiment, the motion ratio for suspension 116 is in the range of about 0.6 to about 0.8. In one embodiment, the motion ratio for suspension 116 is in the range of about 0.5 to about 0.8. In one embodiment, the motion ratio for suspension 116 is in the range of about 0.52 to about 0.59.

As shown in FIG. 8, control arm 530 is longer than control arm 532. This results in a camber angle change as the wheel moves upward.

Referring to FIG. 15, body panel 236 includes a fender portion 552 which has an opening 554 therein. The fender portion 552 assists in keeping mud off of the occupants of operator area 212. Opening 554 receives air generally while vehicle 100 is traveling in a forward direction. The air generally impinges on surface 556 and is directed towards opening 554. The air passes through opening 554 and flows around dampening member 560 to remove heat from dampening member 560. Dampening member 560 is generally positioned proximate to opening 554.

Figure 33:
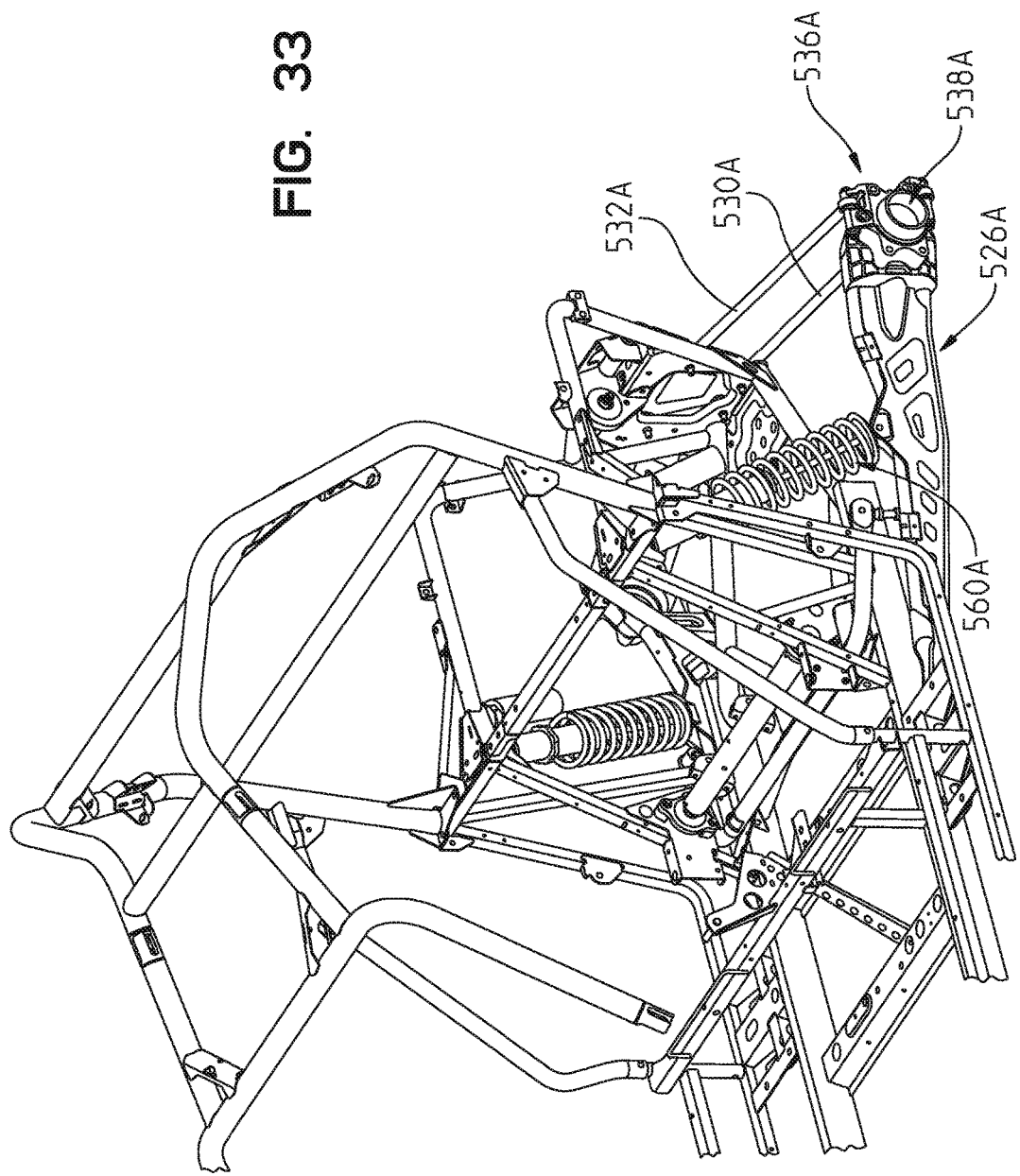
FIG. 33 illustrates a perspective view of the rear suspension of the vehicle of FIG. 1.
Figure 34:
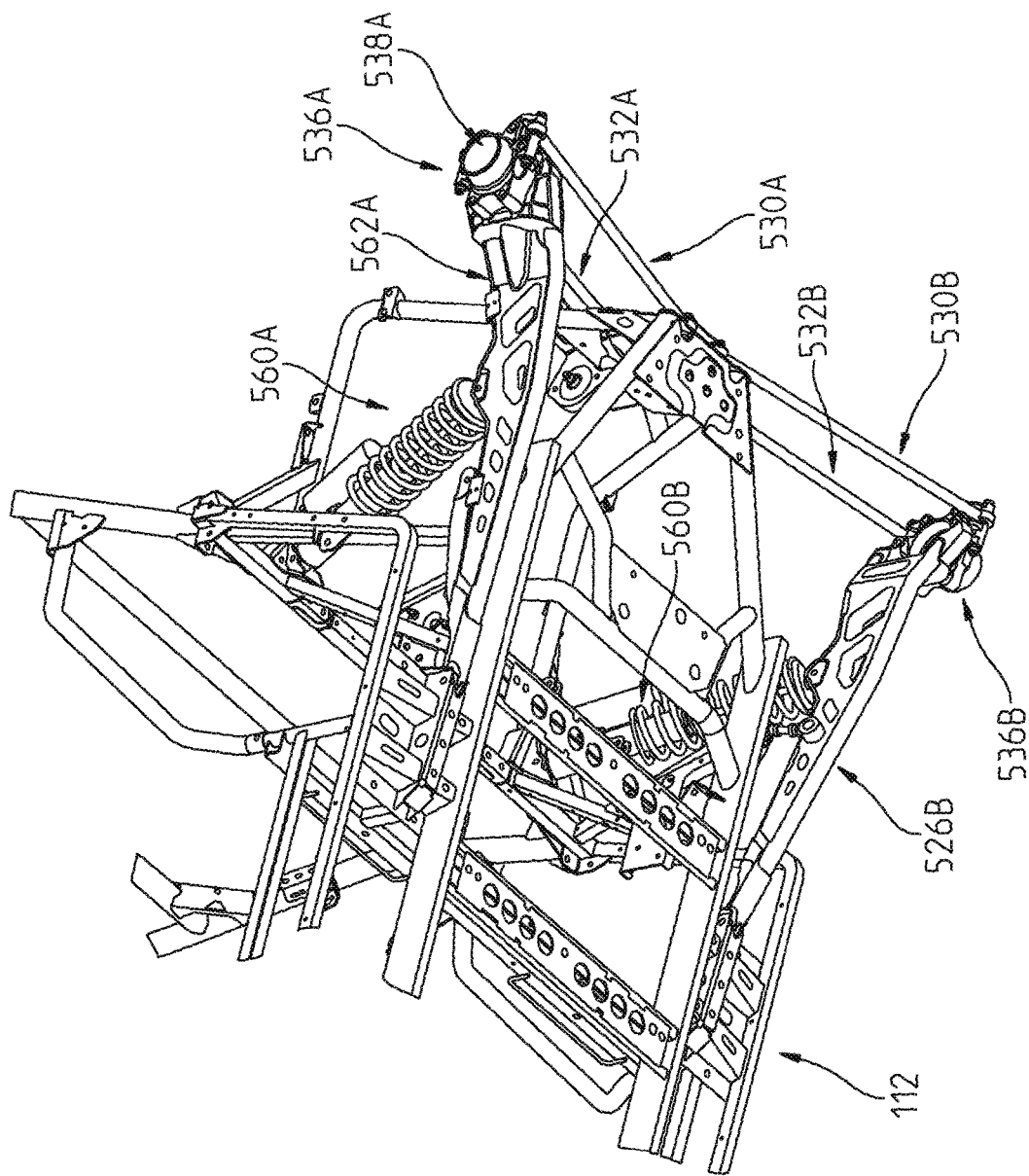
FIG. 34 illustrates a lower, perspective view of the rear suspension of the vehicle of FIG. 1.

Returning to FIGS. 31 and 33, radius arm 526A and radius arm 526B are coupled together through a sway bar 570. Sway bar 570 is rotatably coupled to frame 112. Sway bar 570 is further rotatably coupled to radius arm 526A and radius arm 526B through link 572A and link 572B, respectively. As shown in FIG. 28, sway bar 570 is coupled to frame 112 at a location longitudinally forward of power source 130. Sway bar 570 operates to tie rear suspension 116A to rear suspension 116B while still permitting the relative movement of radius arm 526A relative to radius arm 526B due to flexing of the arms of sway bar 570. By placing sway bar 570 in front of power source 130, sway bar 570 is closer to the pivot axis of radius arm 526A and radius arm 526B. This reduces the amount of flexion that sway bar 570 experiences during the operation of vehicle 100.

By having sway bar 570 coupled to frame 112 at a location forward of power source 130 and the remainder of rear independent suspensions 116 not overlapping power source 130, power source 130 may be placed lower on vehicle 100 resulting in a center of gravity 580 (see FIG. 3) of an unloaded vehicle 100 to be lower. In one embodiment, sway bar 570 is coupled to frame 112 at a location near the longitudinal placement of center of gravity 580. Referring to FIG. 3, center of gravity 580 of an unloaded vehicle 100 is positioned a distance 582 forward of rear axle 110 and a distance 586 above the rear axle 110 (a distance 587 above the ground). Center of gravity 580 is generally centered close to or on vertical centerline plane 122 of vehicle 100.

In the illustrated embodiment of FIG. 3, distance 584 is 81.5 inches and distance 582 is about 43% of distance 584 when vehicle 100 is unloaded (Setup 1). The change in the ratio of distance 582 to distance 584 for various vehicle setups are provided in Table II for the illustrated embodiment.

TABLE II

| (Setup 1) Vehicle unloaded | (Setup 2) Vehicle with 200 pound Driver | (Setup 3) Vehicle with 200 pound Driver and 200 pound Passenger | (Setup 4) Vehicle with Driver, Passenger, and cargo (total added weight 740 pounds) |
|---|---|---|---|
| Change in CG | — | less than 1% | 1% | 6% |

In one embodiment, the center of gravity 580 is generally aligned with a storage location of operator area 212 which reduces an amount of movement of the cargo within the storage compartment. In one example, the storage compartment is a cup holder.

The width of suspensions 116 permits an increased ground clearance without increasing the height of the center of gravity 580. In one embodiment, a ground clearance of an unloaded vehicle 100 is at least about 10 inches. In one embodiment, the ground clearance of an unloaded vehicle 100 is about 13.5 inches. In one embodiment, the ground clearance of an unloaded vehicle 100 is about 14 inches.

When vehicle 100 is at a normal ride height control arms 530 and control arms 532 are generally parallel to the ground. With control arms 530 and control arms 532 generally parallel to the ground, the vehicle 100 is more resistant to vehicle roll.

Figure 35:
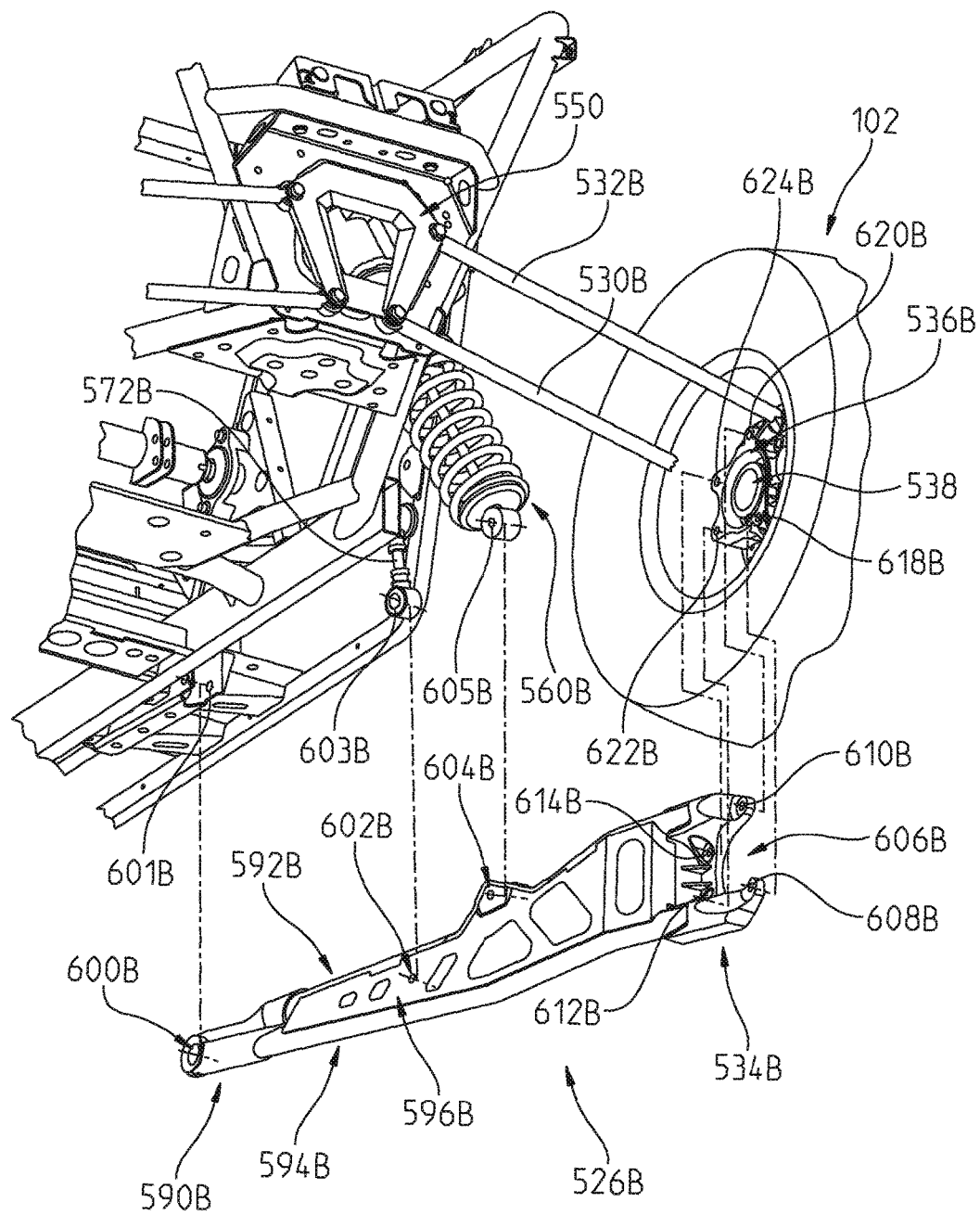
FIG. 35 illustrates a view of the rear suspension of the vehicle of FIG. 1 with a radius arm exploded.

Referring to FIG. 35, radius arm 526B is shown unassembled from vehicle 100. Radius arm 526B includes rear portion 534B, a front portion 590B, a connecting arm 592B, a connecting arm 594B, a first plate member 596B, and a second plate member 598B (see FIG. 4). Connecting arm 592B and connecting arm 594B are received in portions of opening 600B and secured thereto. In one embodiment, connecting arm 592B and 594B are welded to opening 600B. In a similar fashion, connecting arm 592B and connecting arm 594B are received in portions of rear portion 534B and secured thereto. In one embodiment, connecting arm 592B and 594B are welded to rear portion 534B. First plate member 596B and second plate member 598B are secured to connecting arm 592B and connecting arm 594B. In one embodiment, first plate member 596B and second plate member 598B are welded to connecting arm 592B and connecting arm 594B.

Front portion 590B is the portion of radius arm 526B which is rotatably coupled to frame 112 at line 524. Front portion 590B includes an opening 600B which receives a fastener as does opening 601B of frame 112 to couple radius arm 526B to frame 112. In one embodiment, a bearing is provided in opening 600B. First plate member 596B includes an opening 602B which receives a fastener as does opening 603B of link 572B to moveably couple radius arm 526B to sway bar 570 through link 572B. In one embodiment, a bearing is carried by link 572B. First plate member 596B includes an opening 604B which receives a fastener as does opening 605B of dampening member 560B to moveably couple radius arm 526B to dampening member 560B. In one embodiment, a bearing is carried by dampening member 560B.

Rear portion 534B includes openings 608B-614B which align with openings 618B-624B of bearing carrier 536B. Fasteners are used to couple rear portion 534B to bearing carrier 536B such that rear portion 534B is generally not moveable relative to bearing carrier 536B.

Figure 36:
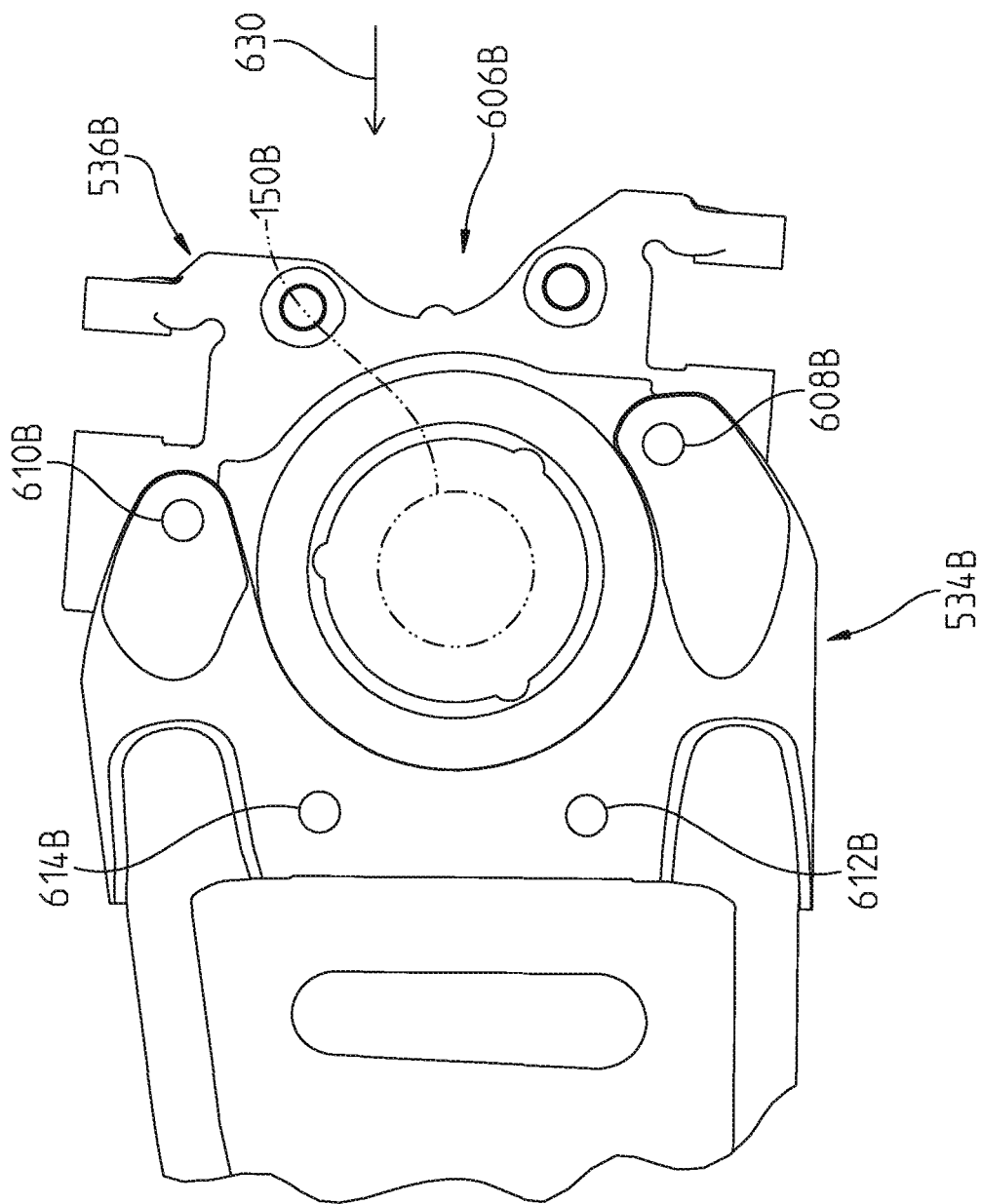
FIG. 36 illustrates an open end of the radius arm of the rear suspension of the vehicle of FIG. 1.

Rear portion 534B includes an open end 606B. Referring to FIG. 36, openings 608B and 610B are generally positioned to a rear side of drive shaft 150B and openings 612B and 614B are generally positioned to a front side of drive shaft 150B. By having rear portion 534B include open end 606B, it is possible to remove radius arm 526B from vehicle 100 without uncoupling drive shaft 150B from either wheels 104 or rear drive unit 148. To remove radius arm 526B from vehicle 100, the fasteners coupling rear portion 534B to bearing carrier 536B are removed. Front portion 590B is uncoupled from frame 112. First plate member 596B is uncoupled from link 572B and dampening member 560B. Radius arm 526B may then be translated in direction 630 allowing drive shaft 150B to pass through open end 606B.

Further, bearing carrier 536B does not need to be removed to remove radius arm 526B. In addition, bearing carrier 536B may be made of a lighter material than radius arm 526B. In one embodiment, bearing carrier 536 is made of aluminum.

Figure 5:
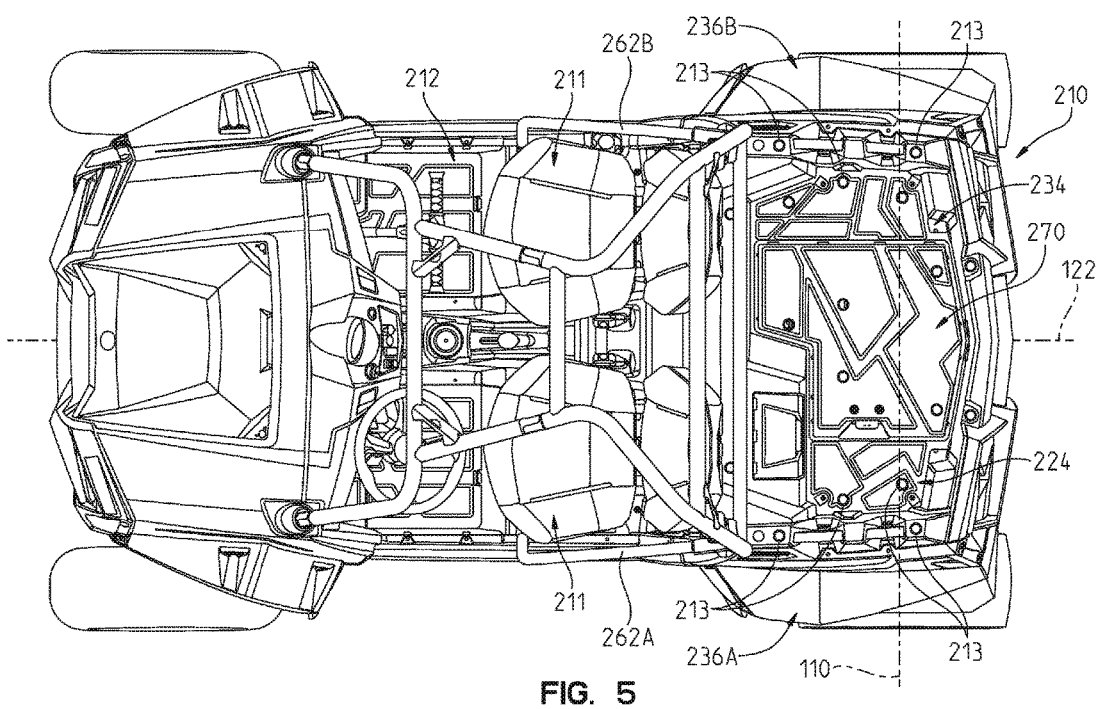
FIG. 5 illustrates a top view of the exemplary side-by-side vehicle of FIG. 1.

Referring to FIG. 5, tires 106 defines an outer envelope of vehicle 100. Tires 106 of front axle 108 are generally the first part of vehicle 100 to contact an obstacle. As such, vehicle 100 is able to travel up fairly steep grades and to maneuver over large obstacles. In one embodiment, a lateral width of vehicle 100 from the outside of a first tire 106 to the outside of a second tire 106 on the opposite side of vehicle 100 is about 64 inches. Further, by having tires 106 define the outer envelope of vehicle 100 the additional weight of an operator, a passenger, and cargo in cargo bed 234 does not generally affect the ride of vehicle 100 because the additional weight is within the front axle 108 and rear axle 110 of vehicle 100. In the illustrated embodiment, a wheel base of vehicle 100 is about 81 inches and a length of vehicle is about 106 inches resulting in the ratio of the wheelbase to vehicle length being about 76%.

Figure 7:
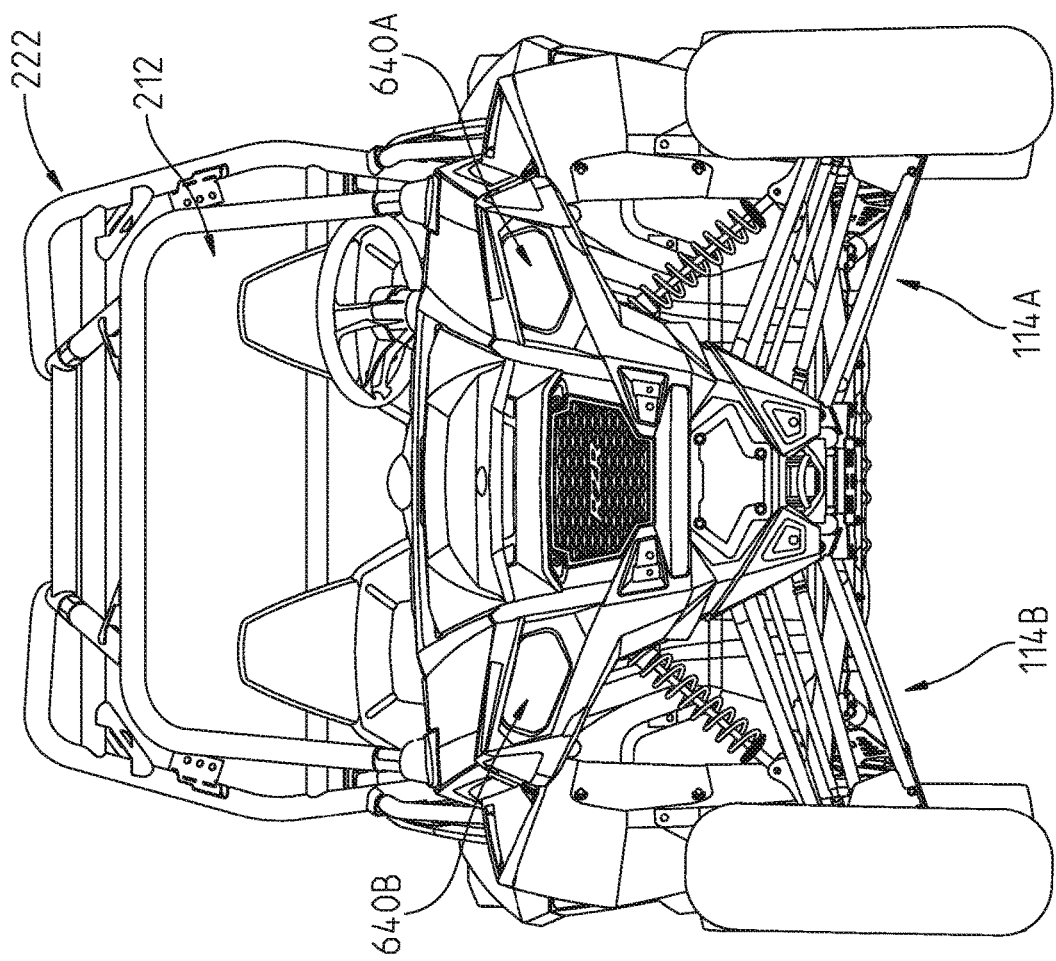
FIG. 7 illustrates a front view of the exemplary side-by-side vehicle of FIG. 1.

In one embodiment, vehicle 100 includes light emitting diode headlights 640A, 640B (see FIG. 7) and light emitting diode taillights 642A, 642B (see FIG. 8).

In one embodiment, vehicle 100 includes a network operatively connecting various components together. In one embodiment, the network is a CAN network. Exemplary CAN networks and vehicle components are disclosed in US Published Patent Application No. US20100090797, titled VEHICLE SECURITY SYSTEM, U.S. patent application Ser. No. 12/816,004, titled ELECTRIC VEHICLE, and U.S. patent application Ser. No. 11/218,163, titled CONTROLLER AREA NETWORK BASED SELF-CONFIGURING VEHICLE MANAGEMENT SYSTEM AND METHOD, the disclosures of which are expressly incorporated by reference.

Figure 44:
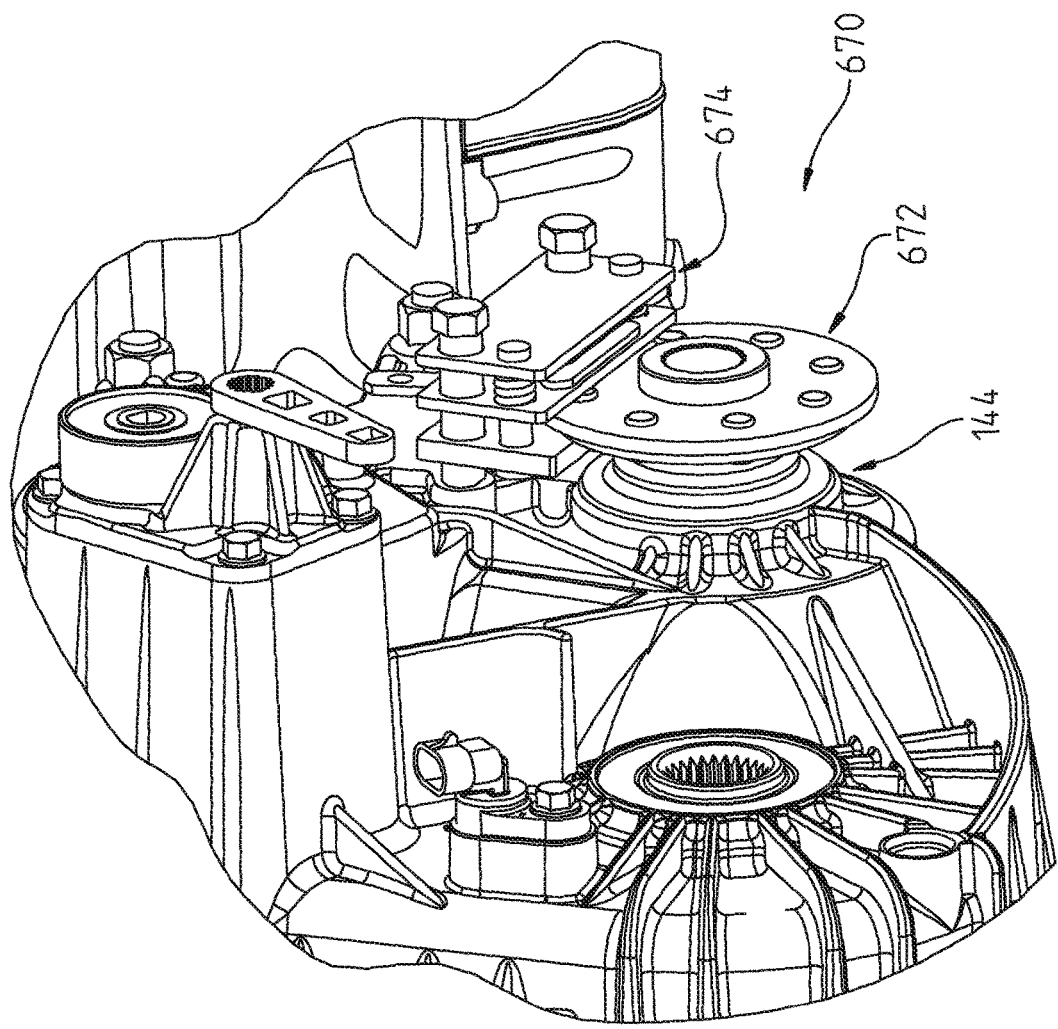
FIGS. 44 and 45 illustrates a parking brake coupled to the shiftable transmission of the vehicle of FIG. 1.
Figure 45:
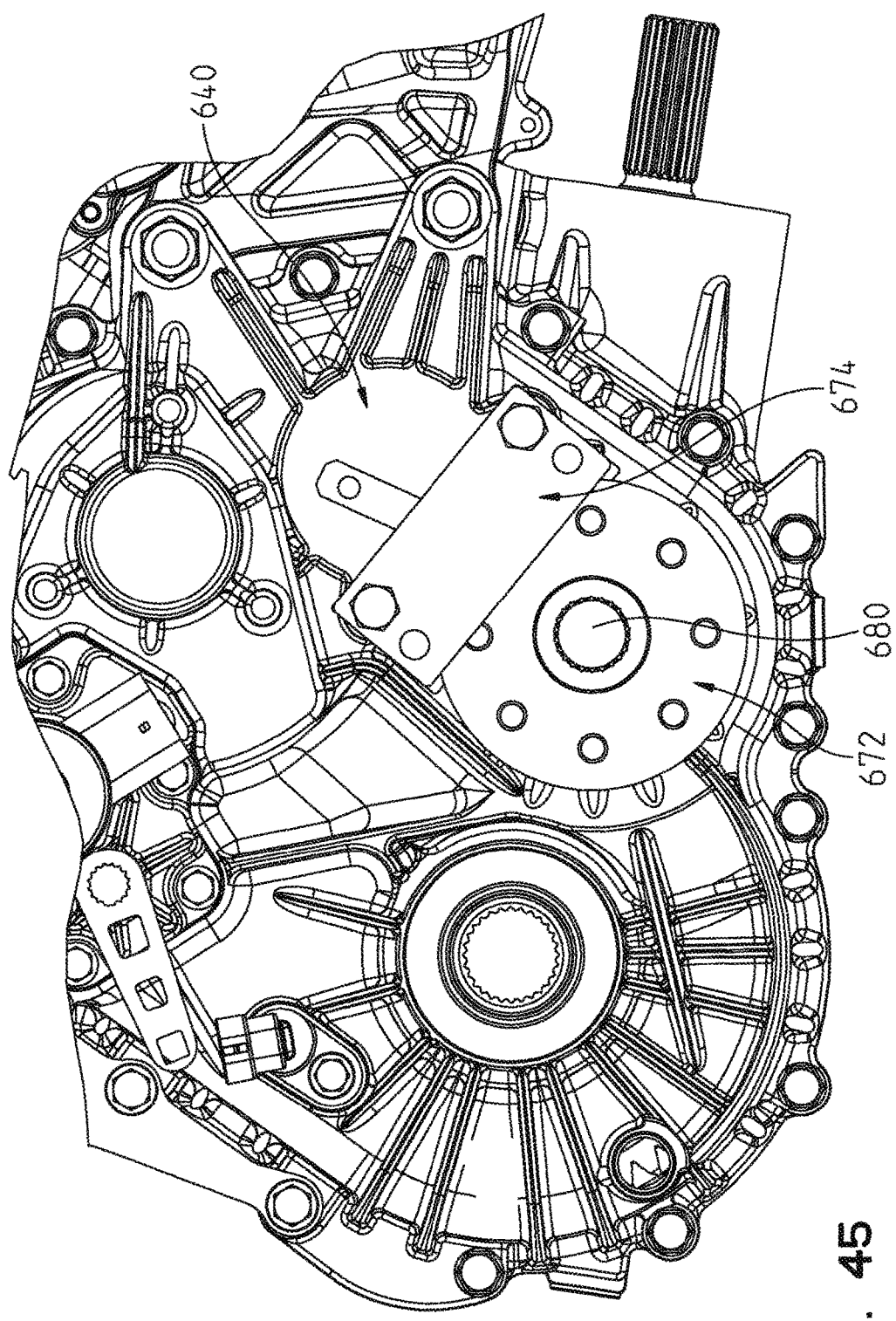

Referring to FIGS. 44 and 45, in one embodiment, a parking brake 670 of vehicle 100 is coupled to a shaft 680 of shiftable transmission 144 prior to rear drive 148. In one embodiment, a rotor 672 of parking brake 670 is coupled to the shaft 680 of shiftable transmission 144 on a right side of shiftable transmission 144 and a caliper 674 of parking brake 670 coupled to housing 460 of shiftable transmission 144.

Placing parking brake 670 on the shaft 680 of shiftable transmission 144 increases the life span of parking brake 670. Further, the amount of braking force is reduced due to the increased mechanical advantage of coupling the parking brake 670 to the shaft 680 of shiftable transmission 144 as compared to a drive shaft 152 (see FIG. 9) of vehicle 100. In one embodiment, parking brake 670 may also be used for dynamic braking in addition to being a parking brake.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A vehicle, comprising:
a frame;
a plurality of ground engaging members supporting the frame;
an internal combustion power source supported by the frame and operatively coupled to at least one of the plurality of ground engaging members to propel the vehicle;
a CVT supported by the frame, the CVT including a drive member, a driven member operatively coupled to the drive member, the drive member is operatively coupled to an output shaft of the internal combustion power source, the drive member is operatively coupled to the at least one of the plurality of ground engaging members through the driven member, the driven member being completely longitudinally rearward of the drive member;
an operator area supported by the frame, the operator area including seating and operator controls, the seating including a driver seat and a passenger seat positioned in a side-by-side arrangement, the plurality of ground engaging members including a first ground engaging member and a second ground engaging member both positioned rearward of the seating and a third ground engaging member and a fourth ground engaging member both positioned forward of the seating, the operator controls including a steering wheel operatively coupled to the third ground engaging member and the fourth ground engaging member, the steering wheel being positioned directly forward of the driver seat and to a first side of a vehicle longitudinal centerline plane;
a fuel tank positioned longitudinally in line with the passenger seat, a front wall of the fuel tank positioned completely forward of a rearward most extent of the seating, a top wall of the fuel tank positioned vertically offset from a seat bottom of the passenger seat, the fuel tank being operatively coupled to the internal combustion power source to provide fuel to the internal combustion power source;
a shiftable transmission supported by the frame and positioned rearward of the operator area, the shiftable transmission being operatively coupled to the internal combustion power source;
a cargo carrying portion supported by the frame and positioned rearward of the seating, the cargo carrying portion including a cargo bed having a floor and a plurality of walls extending above the floor, the floor of the cargo carrying portion being positioned above the internal combustion power source, the CVT, and the shiftable transmission;
a first half shaft operatively coupled to the shiftable transmission and the first ground engaging member to transfer power received from the internal combustion power source to the first ground engaging member through the shiftable transmission;
a second half shaft operatively coupled to the shiftable transmission and the second ground engaging member to transfer power received from the internal combustion power source to the second ground engaging member through the shiftable transmission;
a third half shaft coupled to the shiftable transmission and the third ground engaging member to transfer power received from the internal combustion power source to the third ground engaging member through the shiftable transmission;
a fourth half shaft coupled to the shiftable transmission and the fourth ground engaging member to transfer power received from the internal combustion power source to the fourth ground engaging member through the shiftable transmission; and a first rear suspension including a first plurality of suspension arms moveably coupling the first ground engaging member to the frame, the first rear suspension including
  a first suspension arm of the first plurality of suspension arms of the first rear suspension extending along a longitudinal direction of the vehicle, the first suspension arm of the first plurality of suspension arms of the first rear suspension having a forward portion rotatably coupled to the frame through a first connection and a rearward portion coupled to the first ground engaging member, the first connection being positioned completely rearward of a forward most extent of the seating, completely forward of the first ground engaging member, and completely forward of a rearward most extent of the seating;
  a first dampening member having a lower portion and an upper portion, the lower portion of the first dampening member being moveably coupled to the first suspension arm of the first plurality of suspension arms of the first rear suspension through a second connection positioned completely forward of the first half shaft, the upper portion of the first dampening member being moveably coupled to the frame independent of the first suspension arm of the first plurality of suspension arms of the first rear suspension through a third connection positioned forward of the second connection, the second connection being positioned completely rearward of the first connection;
  a second suspension arm of the first plurality of suspension arms of the first rear suspension, the second suspension arm of the first plurality of suspension arms of the first rear suspension being positioned completely rearward of the first half shaft, being moveably coupled to the frame independent of the first suspension arm of the first plurality of suspension arms of the first rear suspension through a fourth connection, and being moveably coupled to the first ground engaging member; and
  a third suspension arm of the first plurality of suspension arms of the first rear suspension, the third suspension arm of the first plurality of suspension arms of the first rear suspension being positioned completely rearward of the first half shaft, being moveably coupled to the frame independent of both the first suspension arm of the first plurality of suspension arms of the first rear suspension and the second suspension arm of the first plurality of suspension arms of the first rear suspension through a fifth connection, and being moveably coupled to the first ground engaging member independent of the second suspension arm of the first plurality of suspension arms of the first rear suspension; and
a second rear suspension including a second plurality of suspension arms moveably coupling the second ground engaging member to the frame, the second rear suspension including
  a first suspension arm of the second plurality of suspension arms of the second rear suspension extending along a longitudinal direction of the vehicle, the first suspension arm of the second plurality of suspension arms of the second rear suspension having a forward portion rotatably coupled to the frame through a sixth connection and a rearward portion coupled to the second ground engaging member, the sixth connection being positioned completely rearward of a forward most extent of the seating, completely forward of the second ground engaging member, and completely forward of a rearward most extent of the seating;
  a second dampening member having a lower portion and an upper portion, the lower portion of the second dampening member being moveably coupled to the first suspension arm of the second plurality of suspension arms of the second rear suspension through a seventh connection positioned completely forward of the second half shaft, the upper portion of the first dampening member being moveably coupled to the frame independent of the first suspension arm of the second plurality of suspension arms of the second rear suspension through an eighth connection positioned forward of the seventh connection, the seventh connection being positioned completely rearward of the sixth connection;
  a second suspension arm of the second plurality of suspension arms of the second rear suspension, the second suspension arm of the second plurality of suspension arms of the second rear suspension being positioned completely rearward of the second half shaft, being moveably coupled to the frame independent of the first suspension arm of the second plurality of suspension arms of the second rear suspension through a ninth connection, and being moveably coupled to the second ground engaging member; and
  a third suspension arm of the second plurality of suspension arms of the second rear suspension, the third suspension arm of the second plurality of suspension arms of the second rear suspension being positioned completely rearward of the second half shaft, being moveably coupled to the frame independent of both the first suspension arm of the second plurality of suspension arms of the second rear suspension and the second suspension arm of the second plurality of suspension arms of the second rear suspension through a tenth connection, and being moveably coupled to the second ground engaging member independent of the second suspension arm of the second plurality of suspension arms of the second rear suspension;
a first front suspension moveably coupling the third ground engaging member to the frame, the first front suspension including
  a first A-arm of the first front suspension rotatably coupled to the frame and to the third ground engaging member; and
  a third dampening member including a lower end and an upper end, the lower end being moveably coupled to the first A-arm of the first front suspension and the upper end being moveably coupled to the frame independent of the first A-arm of the first front suspension; and
a second front suspension moveably coupling the fourth ground engaging member to the frame, the second front suspension including
  a first A-arm of the second front suspension rotatably coupled to the frame and to the fourth ground engaging member; and
  a fourth dampening member including a lower end and an upper end, the lower end being moveably coupled to the second A-arm of the second front suspension and the upper end being moveably coupled to the frame independent of the second A-arm of the second front suspension;

wherein the CVT and the internal combustion power source are both positioned completely rearward of the seat bottom of the passenger seat, the first suspension arm of the first plurality of suspension arms of the first rear suspension being moveable relative to the first suspension arm of the second plurality of suspension arms of the second rear suspension and relative to the shiftable transmission, the first suspension arm of the second plurality of suspension arms of the second rear suspension being moveable relative to the shiftable transmission.

2. The vehicle of claim 1, wherein the second suspension arm of the first plurality of suspension arms of the first rear suspension is completely vertically lower relative to the third suspension arm of the first plurality of suspension arms of the first rear suspension and the fourth connection is located closer to the vehicle longitudinal centerline plane than the fifth connection and wherein the second suspension arm of the second plurality of suspension arms of the second rear suspension is completely vertically lower relative to the third suspension arm of the second plurality of suspension arms of the second rear suspension and the ninth connection is located closer to the vehicle longitudinal centerline plane than the tenth connection.

3. The vehicle of claim 2, wherein the first rear suspension further includes a fourth suspension arm of the first plurality of suspension arms of the first rear suspension, the fourth suspension arm being moveable relative to the frame and operatively coupled to the first ground engaging member, the fourth suspension arm extending laterally and being coupled to the frame at a location vertically below the fifth connection of the third suspension arm of the first plurality of suspension arms of the first rear suspension and vertically above the fourth connection of the second suspension arm of the first plurality of suspension arms of the first rear suspension.

4. The vehicle of claim 3, wherein the fourth suspension arm of the first plurality of suspension arms of the first rear suspension extends towards the vertical longitudinal centerline plane closer than the fourth connection of the second suspension arm of the first plurality of suspension arms of the first rear suspension and closer than the fifth connection of the third suspension arm of the first plurality of suspension arms of the first rear suspension.

5. The vehicle of claim 4, wherein the fourth suspension arm of the first plurality of suspension arms of the first rear suspension extends across the vertical longitudinal centerline plane and is a sway bar.

6. The vehicle of claim 4, wherein the second suspension arm of the first plurality of suspension arms of the first rear suspension is non-parallel relative to the third suspension arm of the first plurality of suspension arms of the first rear suspension when viewed from a top view above the first rear suspension.

7. The vehicle of claim 4, wherein the frame includes a first frame member having a plurality of openings, the first frame member spans the vehicle longitudinal centerline plane, each of the fourth connection, the fifth connection, the ninth connection, and the tenth connection includes an elongated fastener which passes through a respective one of the plurality of openings of the first frame member and wherein the elongated fastener of the fourth connection passes through an opening in the second suspension arm of the first plurality of suspension arms of the first rear suspension, the elongated fastener of the fifth connection passes through an opening in the third suspension arm of the first plurality of suspension arms of the first rear suspension, the elongated fastener of the ninth connection passes through an opening in the second suspension arm of the second plurality of suspension arms of the second rear suspension, the elongated fastener of the tenth connection passes through an opening in the third suspension arm of the second plurality of suspension arms of the second rear suspension.

8. The vehicle of claim 7, wherein the second suspension arm of the first plurality of suspension arms of the first rear suspension is moveably coupled to the first ground engaging member through an eleventh connection, the third suspension arm of the first plurality of suspension arms of the first rear suspension is moveably coupled to the first ground engaging member through a twelfth connection, and the fourth suspension arm of the first plurality of suspension arms of the first rear suspension is moveably coupled to the first ground engaging member through a thirteenth connection, the twelfth connection being independent of the eleventh connection, the thirteenth connection being independent of the eleventh connection, and the thirteenth connection being independent of the twelfth connection.

9. The vehicle of claim 7, wherein the eleventh connection includes a first elongated fastener which passes through a second opening in the second suspension arm of the first plurality of suspension arms of the first rear suspension and the twelfth connection includes a first elongated fastener which passes through a second opening in the third suspension arm of the first plurality of suspension arms of the first rear suspension and wherein the elongated fastener of the fourth connection, the elongated fastener of the fifth connection, the elongated fastener of the eleventh connection, and the elongated fastener of the twelfth connection each have a longitudinally extending axis.

10. The vehicle of claim 9, wherein both the eleventh connection and the twelfth connection are positioned laterally to a first side of the thirteenth connection.

11. The vehicle of claim 7, wherein both the eleventh connection and the twelfth connection are positioned laterally to a first side of the thirteenth connection.

12. The vehicle of claim 11, wherein the first half shaft is positioned vertically lower than the third suspension arm and the first half shaft is positioned vertically higher than the second suspension arm.

13. The vehicle of claim 7, wherein both the eleventh connection and the twelfth connection are positioned laterally to a first side of the second connection.

14. The vehicle of claim 1, wherein a boundary around the internal combustion engine, the CVT, and the shiftable transmission includes
 the first suspension arm of the first plurality of suspension arms of the first rear suspension on the first side of the vehicle longitudinal centerline plane;
 the first suspension arm of the second plurality of suspension arms of the second rear suspension on the second side of the vehicle longitudinal centerline plane;
 the first connection of the first suspension arm of the first plurality of suspension arms of the first rear suspension forward of the internal combustion engine, the CVT, and the shiftable transmission; and
 the second suspension arm of the first plurality of suspension arms of the first rear suspension and the second suspension arm of the second plurality of suspension arms of the second rear suspension rearward of the internal combustion engine, the CVT, and the shiftable transmission.

15. The vehicle of claim 14, further comprising a front drive shaft which is operatively coupled to the internal combustion power source and transfers power to the third half shaft and the fourth half shaft, the front drive shaft extending from within the boundary to outside of the boundary.

16. The vehicle of claim 1, wherein a boundary around the internal combustion engine, the CVT, and the shiftable transmission includes
- the first suspension arm of the first plurality of suspension arms of the first rear suspension on the first side of the vehicle longitudinal centerline plane;
- the first suspension arm of the second plurality of suspension arms of the second rear suspension on the second side of the vehicle longitudinal centerline plane;
- a sway bar coupled to the first rear suspension and to the second rear suspension forward of the internal combustion engine, the CVT, and the shiftable transmission; and
- the second suspension arm of the first plurality of suspension arms of the first rear suspension and the second suspension arm of the second plurality of suspension arms of the second rear suspension rearward of the internal combustion engine, the CVT, and the shiftable transmission.

17. The vehicle of claim 16, further comprising a front drive shaft which is operatively coupled to the internal combustion power source and transfers power to the third half shaft and the fourth half shaft, the front drive shaft extending from within the boundary to outside of the boundary.

* * * * *